United States Patent [19]

Kumada et al.

[11] Patent Number: 5,408,342
[45] Date of Patent: Apr. 18, 1995

[54] COLOR IMAGE PROCESSING APPARATUS, METHOD, AND PRINTER DRIVER

[75] Inventors: Shuichi Kumada; Toshihisa Okutsu, both of Yokohama, Japan

[73] Assignee: Canon Kabushiki Kaisha, Tokyo, Japan

[21] Appl. No.: 103,901

[22] Filed: Feb. 25, 1993

[51] Int. Cl.$^6$ ............................................... H04N 1/46
[52] U.S. Cl. ..................................... 358/518; 358/519
[58] Field of Search ................. 358/518, 504, 519–520

[56] References Cited

U.S. PATENT DOCUMENTS

| | | | |
|---|---|---|---|
| 4,481,532 | 11/1984 | Clark et al. | 358/519 |
| 5,053,866 | 10/1991 | Johnson | 358/518 |
| 5,200,817 | 4/1993 | Birnbaum | 358/518 |

*Primary Examiner*—Stephen Brinich
*Attorney, Agent, or Firm*—Fitzpatrick, Cella, Harper & Scinto

[57] ABSTRACT

A color image processing apparatus is provided with a color correction information memory to store input masking coefficients and $\gamma$ correction tables. The input masking coefficients can be loaded on the memory by external commands. The $\gamma$ correction tables include a table for correction values for the $\gamma$ values at pitches of 0.1 within a range of 1.0 to $\alpha$ ($>1.0$). When a $\gamma$ correction process is executed, the table to be used is selected by specifying the $\gamma$ value by an external command. With a color correction circuit, the $\gamma$ correction process and input masking process are executed using the $\gamma$ correction tables and input masking coefficients stored in the memory.

22 Claims, 47 Drawing Sheets

$$Y = K \times (\frac{X}{K})^\gamma$$

X : INPUT RGB VALUE (BEFORE GAMMA CORRECTION)
Y : OUTPUT RGB VALUE (AFTER GAMMA CORRECTION)
γ : GAMMA VALUE
 WHEN NO CORRECTION, γ = 1.0
K : CONSTANT (WHEN 8 BITS, 225.0)

FIG. 6

$$\begin{bmatrix} Rout \\ Gout \\ Bout \end{bmatrix} = \begin{bmatrix} a11 & a12 & a13 \\ a21 & a22 & a23 \\ a31 & a32 & a33 \end{bmatrix} \begin{bmatrix} Rin \\ Gin \\ Bin \end{bmatrix}$$

FIG. 7

| COMMAND NUMBER | $\gamma$-VALUE |
|---|---|

FIG. 8

| COMMAND NUMBER | a11 | a12 | a13 | a21 | a22 | a23 | a31 | a32 | a33 |
|---|---|---|---|---|---|---|---|---|---|

| COMMAND NUMBER | γ0 | γ1 | γ2 | ---------- | γ254 | γ255 |

| CORRECTION VALUE FOR 0 |
|---|
| CORRECTION VALUE FOR 1 |
| CORRECTION VALUE FOR 2 |
| ⋮ |
| CORRECTION VALUE FOR 254 |
| CORRECTION VALUE FOR 255 |

FIG. 27A

| COMMAND NUMBER |

FIG. 27B

| COMMAND NUMBER | MONITOR ID CHARACTER SEQUENCE |

FIG. 27C

| COMMAND NUMBER | $\gamma$-VALUE |

FIG. 27D

| COMMAND NUMBER | $a_{11}$ | $a_{12}$ | $a_{13}$ | $a_{21}$ | $a_{22}$ | $a_{23}$ | $a_{31}$ | $a_{32}$ | $a_{33}$ |

FIG. 28

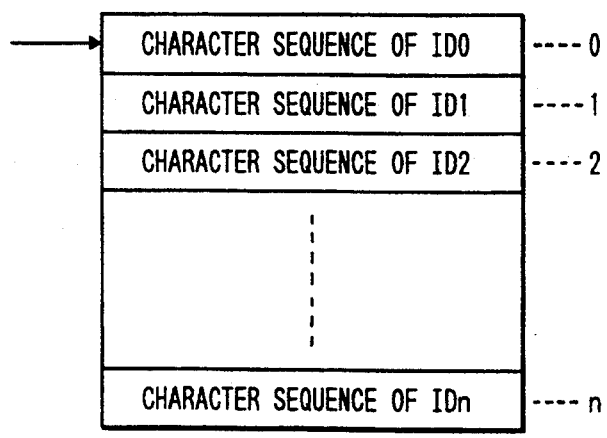

| CHARACTER SEQUENCE OF ID0 | ---- 0 |
| CHARACTER SEQUENCE OF ID1 | ---- 1 |
| CHARACTER SEQUENCE OF ID2 | ---- 2 |
| ⋮ | |
| CHARACTER SEQUENCE OF IDn | ---- n |

FIG. 29

| MONITIR ID CHARACTER SEQUENCE | $\gamma$-VALUE FOR EACH MONITOR | INPUT MASKING COEFFICIENT FOR EACH MONITOR |
|---|---|---|
| CHARACTER SEQUENCE OF ID0 | 1.0 | 1, 0, 0, 0, 1, 0, 0, 0, 1, |
| CHARACTER SEQUENCE OF ID1 | $\gamma_1$ | $a1_{11}, a1_{12}, a1_{13}, a1_{21}, a1_{22}, a1_{23}, a1_{31}, a1_{32}, a1_{33}$ |
| CHARACTER SEQUENCE OF ID2 | $\gamma_2$ | $a2_{11}, a2_{12}, a2_{13}, a2_{21}, a2_{22}, a2_{23}, a2_{31}, a2_{32}, a2_{33}$ |
| ⋮ | ⋮ | ⋮ |
| CHARACTER SEQUENCE OF IDn | $\gamma_n$ | $an_{11}, an_{12}, an_{13}, an_{21}, an_{22}, an_{23}, an_{31}, an_{32}, an_{33}$ |
| 'END' | | |

FIG. 30

| HEAD ADDRESS OF TABLE #2 OF γ=1.0 |
|---|
| HEAD ADDRESS OF TABLE #2 OF γ=1.1 |
| HEAD ADDRESS OF TABLE #2 OF γ=1.2 |
| ⋮ |
| HEAD ADDRESS OF TABLE #2 OF γ=α |

FIG. 31

| CORRECTION VALUE FOR 0 |
|---|
| CORRECTION VALUE FOR 1 |
| CORRECTION VALUE FOR 2 |
| ⋮ |
| CORRECTION VALUE FOR 254 |
| CORRECTION VALUE FOR 255 |

⟺ ID NUMBER = 1

⟺ ID NUMBER = 2

⟹ 1

⟹ 15

FIG. 42
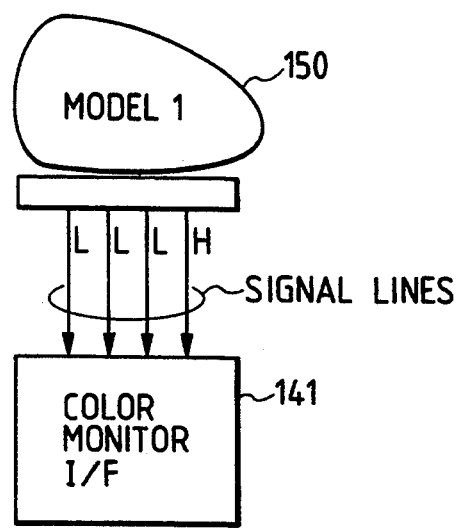
FIG. 43
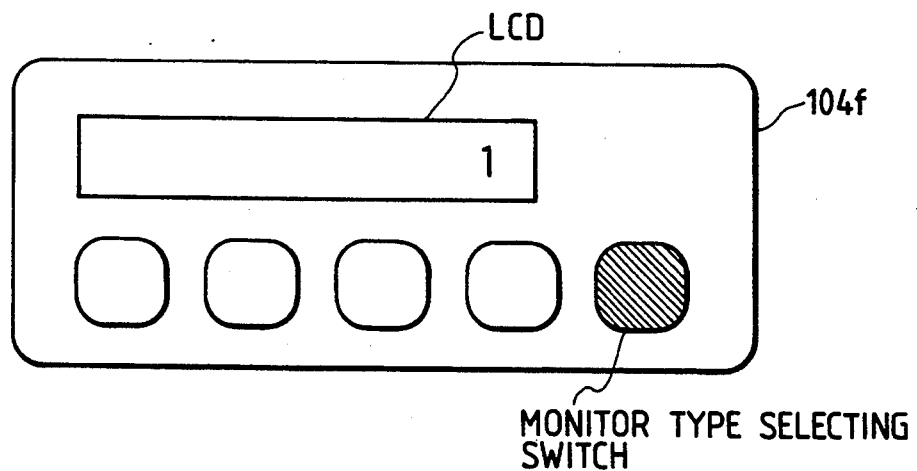
FIG. 44
| COMMAND NUMBER | $\gamma(0)$ | $\gamma(1)$ | $\gamma(2)$ | -------- | $\gamma(254)$ | $\gamma(255)$ |
|---|---|---|---|---|---|---|

FIG. 47

| MONITOR ID CHARACTER SEQUENCE | γ VALUE CORRECTION VALUE TABLE FOR EACH MONITOR | INPUT MASKING COEFFICIENT FOR EACH MONITOR |
|---|---|---|
| CHARACTER SEQUENCE OF ID0 | γ CORRECTION VALUE OF γ=1.0<br>γ1.0(0), γ1.0(1), γ1.0(2), ···, γ1.0(255) | 1, 0, 0, 0, 1, 0, 0, 0, 1 |
| CHARACTER SEQUENCE OF ID1 | γ CORRECTION VALUE OF γ=γ1<br>γ1(0), γ1(1), γ1(2), ···, γ1(255) | $a1_{11}, a1_{12}, a1_{13}, a1_{21}, a1_{22}, a1_{23}, a1_{31}, a1_{32}, a1_{33}$ |
| CHARACTER SEQUENCE OF ID2 | γ CORRECTION VALUE OF γ=γ2<br>γ2(0), γ2(1), γ2(2), ···, γ2(255) | $a2_{11}, a2_{12}, a2_{13}, a2_{21}, a2_{22}, a2_{23}, a2_{31}, a2_{32}, a2_{33}$ |
| CHARACTER SEQUENCE OF IDn | γ CORRECTION VALUE OF γ=γn<br>γn(0), γn(1), γn(2), ···, γn(255) | $an_{11}, an_{12}, an_{13}, an_{21}, an_{22}, an_{23}, an_{31}, an_{32}, an_{33}$ |
| 'END' | | |

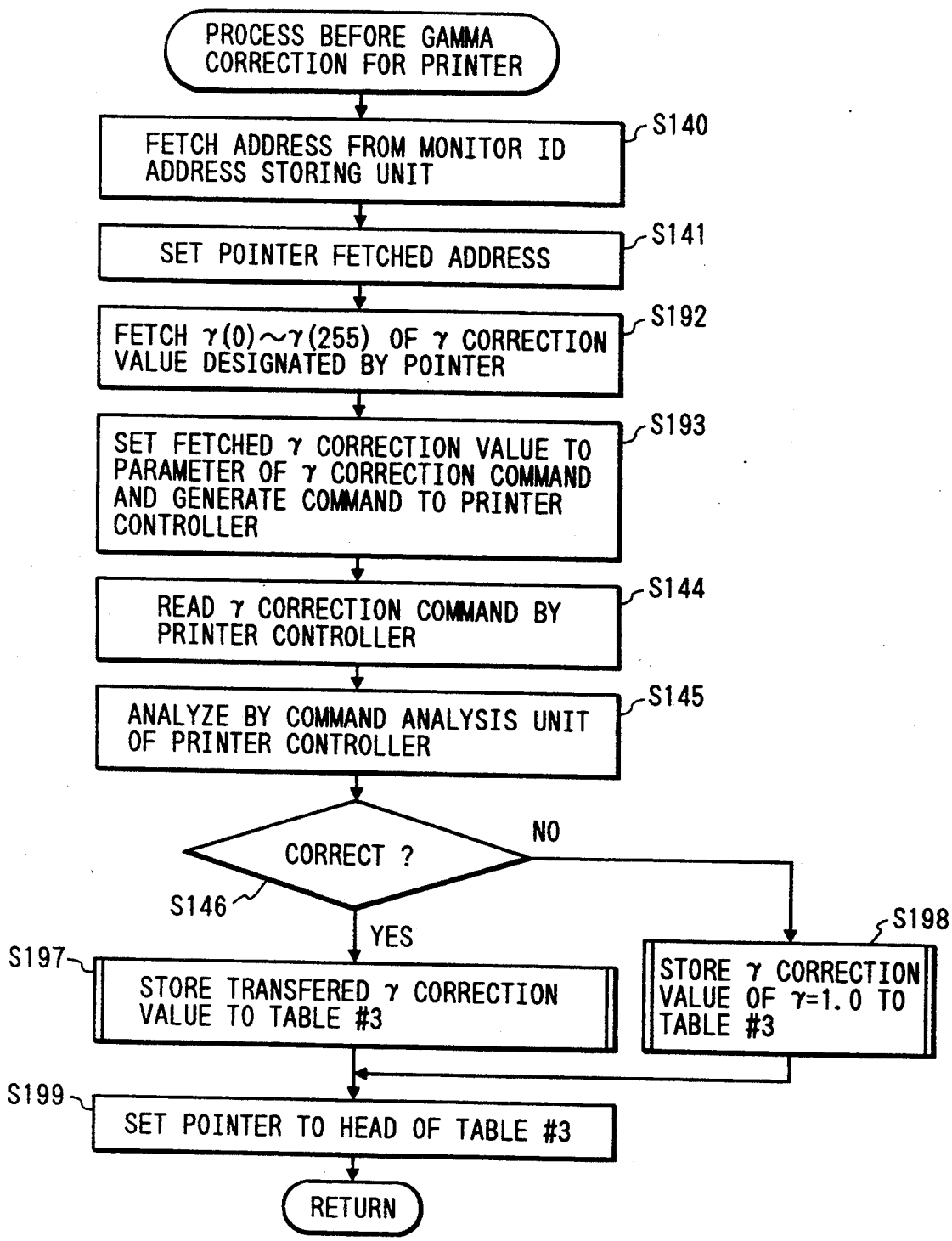

FIG. 53

| COMMAND NUMBER | γ-VALUE | INPUT MASKING COEFFICIENT | | | | | | | | |
|---|---|---|---|---|---|---|---|---|---|---|
| | | a11 | a12 | a13 | a21 | a22 | a23 | a31 | a32 | a33 |

FIG. 54

γ-VALUE FOR EACH MONITOR / INPUT MASKING COEFFICIENT FOR EACH MONITOR

| | | |
|---|---|---|
| 1.0 | 1, 0, 0, 0, 1, 0, 0, 0, 1 | INFORMATION OF MODEL 0 |
| γ1 | a1₁₁, a1₁₂, a1₁₃, a1₂₁, a1₂₂, a1₂₃, a1₃₁, a1₃₂, a1₃₃ | INFORMATION OF MODEL 1 |
| γ2 | a2₁₁, a2₁₂, a2₁₃, a2₂₁, a2₂₂, a2₂₃, a2₃₁, a2₃₂, a2₃₃ | INFORMATION OF MODEL 2 |
| ---- | ---- | |
| γn | an₁₁, an₁₂, an₁₃, an₂₁, an₂₂, an₂₃, an₃₁, an₃₂, an₃₃ | INFORMATION OF MODEL n |

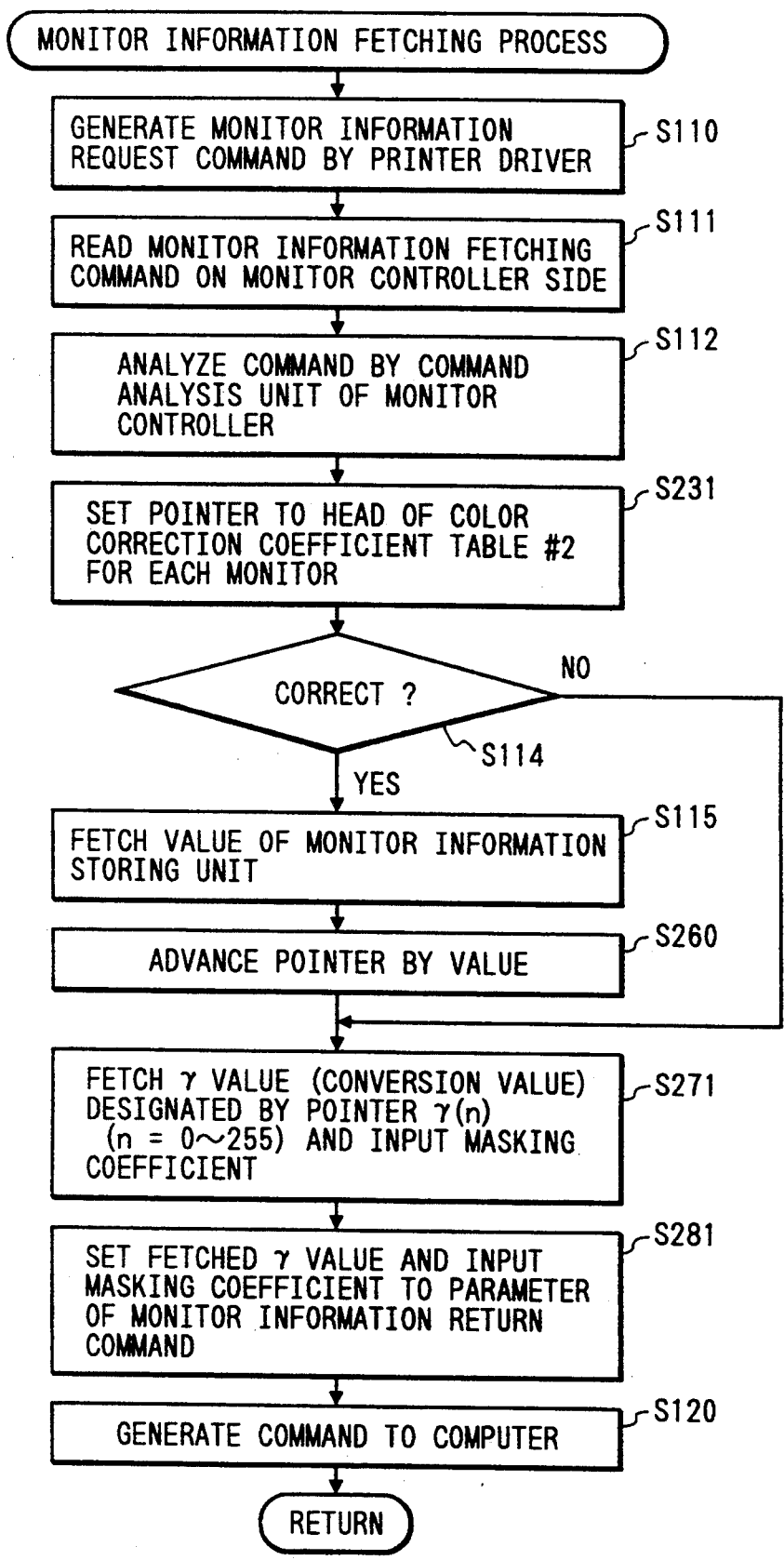

COLOR IMAGE PROCESSING APPARATUS, METHOD, AND PRINTER DRIVER

BACKGROUND OF THE INVENTION

1. Field of the Invention

The present invention relates to a color image processing apparatus, a method therefor, and a printer driver.

2. Related Background Art

For a color printing apparatus in general, a colorimetric color reproduction is used for reproducing the color of an inputted color image. The colorimetric color reproduction represents a case where the chromaticity of the colors of an original image and its reproduced image is equal, and the interrelated luminance thereof is also equal. In this case, the spectral reflection factors of these images are different. Thus, the reproduction will be conditionally isochromatic. This color reproduction method is one of the effective methods under a certain observational condition because it will suffice if only the colorimetric values X, Y, and Z (three stimulus values of an object color) obtainable by a spectrocolorimeter or the like are the same in an original image and its reproduced image.

For example, if an original image is a RGB luminance data which should be reproduced by ink materials or toners of Cy (cyanogen) Mg (magenta), Ye (yellow), and Bk (black), the conversion of the Cy, Mg, Ye, and Bk density data from the RGB luminance, namely, the color reproduction process, is dependent on the output characteristics of a printer (output method and the characteristics of toner or ink). In other words, if the characteristics of toner or ink are different, the color reproduction process will be different accordingly. Therefore, a Gamma correction and/or color masking process will be performed.

FIG. 2 is a block diagram showing the fundamental circuit of a color reproduction processing circuit of a color printer. A density conversion circuit 50 performs the logarithmic conversion of the RGB luminance of an inputted image and outputs the density data of Cy, Mg, and Ye. An under color-removal circuit 52 forms the Bk data from the Cy, Mg, and Ye density data from the density conversion circuit 50 and removes the under color. A masking circuit 54 performs the masking process for the Cy, Mg, and Ye density data in order to remove the mutual influence of the unwanted absorption characteristics of the ink materials or toners. A γ conversion circuit 56 performs the γ conversion of the Cy, Mg, and Ye density data output from the masking circuit 54 and the Bk data from the under color removal circuit 52, and adjusts the contrast and brightness.

In this respect, the processing parameters for the circuits 50 to 54 are set per printer, and are fixed values.

When a color image is output to a monitor and a printer, the output image on the monitor and the one on the printer appear in different color due to the difference in characteristics if the same image data are supplied to the color monitor and the printer. As a method for adjusting the color appearance of a printed image, there are known a Gamma correction method wherein an image data to be supplied to a printer is Gamma corrected in advance, and an input masking method wherein the image data are adjusted by a matrical operation.

As shown in FIG. 3, according to a Gamma correction method, the RGB luminance data are Gamma corrected by a Gamma correction circuit 58. Then, a color reproduction process is given by a color reproduction processing circuit 60 to the output from the Gamma correction circuit 58. The color reproduction processing circuit 60 is structured as shown in FIG. 2. FIG. 4 illustrates the input and output characteristics of the Gamma correction circuit 58 and its operational expression.

As shown in FIG. 5, according to an input masking method, the RGB luminance data are processed by an input masking of the masking circuit 62. Then, a color reproduction process is given to the output from the input masking circuit 62. The color reproduction processing circuit 64 is structured as shown in FIG. 2 in the same manner as the color reproduction processing circuit 60. The operational expression for the input masking circuit 62 is shown in FIG. 6. In FIG. 6, reference marks Rin, Gin, and Bin designate input; Rout, Gout, and Bout, output and a11, a12, a13, a21, a22, a23, a31, a32, and a33 conversion coefficient, respectively.

Gamma correction and/or input masking process such as these have hitherto been executed on the side of an apparatus which outputs image data (a computer, for example). A printer driver, which is a printer control software for a computer, serves to execute the Gamma correction and/or input masking correction, for example. A problem is encountered here that this processing load is heavy for the printer driver.

Particularly, not only various monitor apparatuses which are connectable are on the market, but also various color printers are on the market at present. As a result, the printer driver is inevitably required to bear a heavier load, leading to a slow down of its processing speed. Also, when a color image is displayed on a display monitor or printed out onto a recording sheet, the output image on the monitor and the printed image appear in different color due to the coloring characteristics Genuine to the apparatuses if the same image data are output to the color monitor display and a printer as they are.

Therefore, as a method to adjust the color appearance of a printed image, there have been known a γ correction method to give a γ correction in advance to the image data which are output to a printer, and an input masking method to adjust them by a matrical operation.

Nevertheless, according to the above-mentioned conventional example, a user must select and set a γ value or an input masking coefficient in order to perform a color correction for the printer output in accordance with the characteristics of the monitor display apparatus when the menu setting is executed for a printer driver. As a result, the user must check and reset the γ value or input masking coefficient which corresponds to the characteristics of the monitor display whenever the connectable monitor display apparatuses are replaced. Thus, the problem of an inefficient operativity is encountered.

Particularly, when various connectable monitor display apparatuses are currently available on the market, a user must bear a heavy burden in terms of the adjustment that he should make for the output characteristics in consideration of the characteristics of the display apparatus obtained from the market.

SUMMARY OF THE INVENTION

It is an object of the present invention to provide a color image processing apparatus capable of solving each individual problem or all the problems mentioned above.

It is another object of the present invention to provide a printer driver capable of solving each individual problem or all the problems mentioned above.

In order to achieve these objects, a printing apparatus according to a preferable embodiment of the present invention is provided with a first correction means to chromatically correct inputted chrominance signals in accordance with given chromatic correction parameters; a second chromatic correction means to correct the chrominance signals chromatically corrected by the first chromatic correction means in accordance with the printing characteristics; and parameter setting means to select and modify the chromatic correction parameters to be used for the aforesaid first correction means in accordance with the commands from the outside without any selection and modification of the chromatic correction parameters to be used for the aforesaid correction means.

It is still another object of the present invention to provide a color image processing apparatus capable of adjusting the color appearance of an image output on a monitor and an image output on a printer.

It is a further object of the present invention to provide a printer driver capable of adjusting the color appearance of an image output on a monitor and an image output on a printer.

It is still a further object of the present invention to provide a color image processing system capable of obtaining a high quality image with an easy operation.

It is another object of the present invention to provide a color image processing system having a new structure.

These and other objects and advantages of the present invention will be more fully apparent from the detailed description of the embodiments set forth below taken in conjunction with the drawings.

BRIEF DESCRIPTION OF THE DRAWINGS

FIG. 6 is an operational expression for the input masking process.

FIG. 7 is a format for a Gamma correction command.

FIG. 8 is a format for a set up command for an input masking coefficient.

FIGS. 27A to 27D are views showing various command formats used for the second embodiment.

FIG. 28 is a view showing the inner structure of the monitor ID character sequences.

FIG. 29 is a view showing the inner structure of a color correction coefficient table #1 for each of the monitors.

FIG. 30 is a view showing the inner structure of a γ correction table #1.

FIG. 31 is a view showing the inner structure of a γ correction table #2.

FIG. 42 is a view showing an example wherein a monitor ID is obtained from the output signals from a color monitor.

FIG. 43 is a view showing an example wherein a monitor ID is obtained from an input from the operation panel 104f of the monitor controller 140.

FIG. 44 is a view showing a command format used for a third embodiment.

FIG. 47 is a view showing the inner structure of a color correction coefficient table #2 for each monitor.

FIG. 48 is a flowchart showing the preparatory process for a Gamma correction for a printer according to the third embodiment.

FIG. 53 is a view showing the format of a monitor information returning command according to the fourth embodiment.

FIG. 54 is a view showing the inner structure of a color correction coefficient table #1 for each monitor according to the fourth embodiment.

FIG. 64 is a view showing the inner structure of a color correction coefficient table #2 for a printer according to the fifth embodiment.

FIG. 65 is a flowchart showing a monitor information fetch process according to the fifth embodiment.

DETAILED DESCRIPTION OF THE PREFERRED EMBODIMENTS

Hereinafter, with reference to the accompanying drawings, the description will be made of the embodiments according to the present invention.

Figure 1:
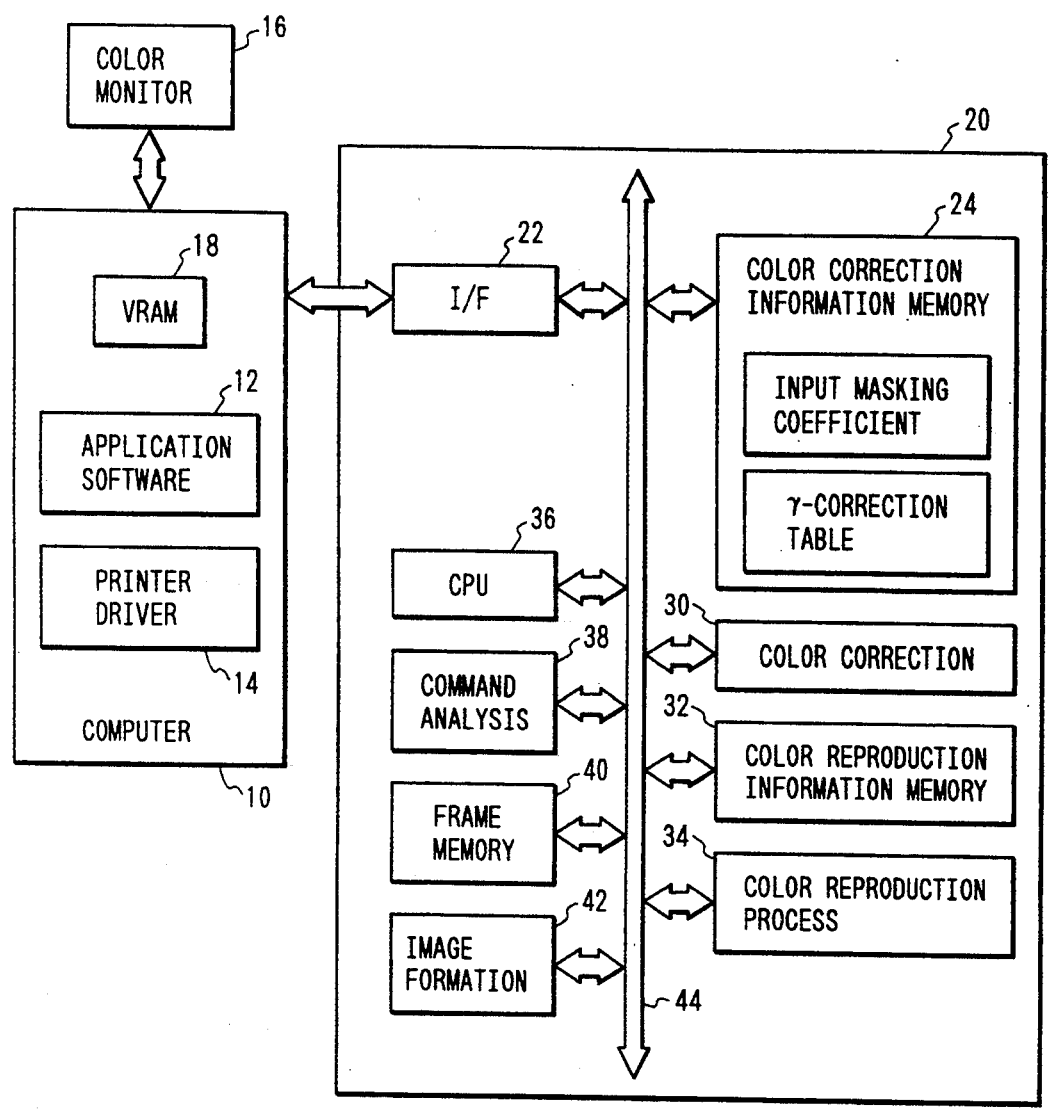
FIG. 1 is a block diagram showing the structure of an embodiment according to the present invention.
Figure 2:
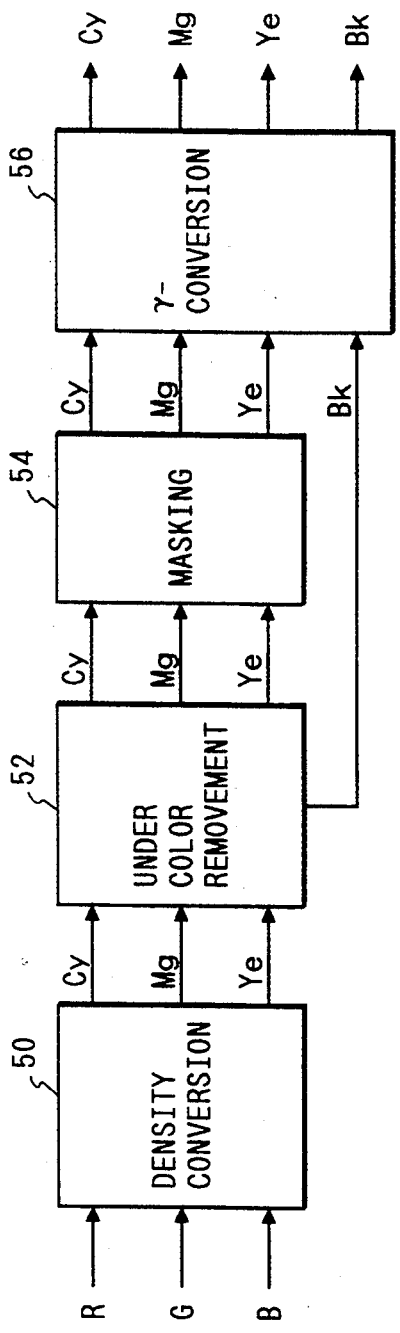
FIG. 2 is a block diagram showing the fundamental structure for a color reproduction process in a color printer.
Figure 3:
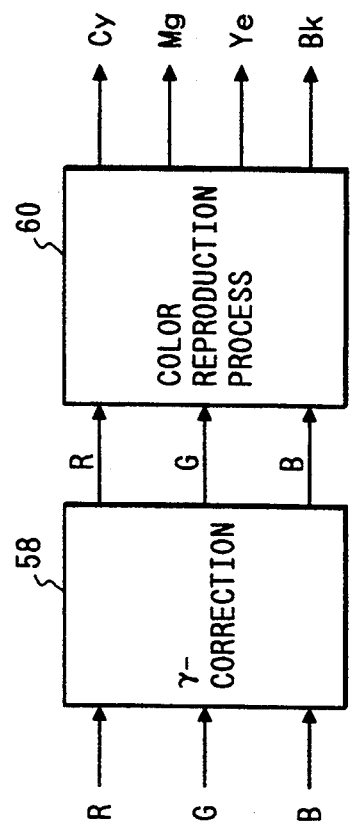
FIG. 3 is a block diagram schematically showing the structure for a Gamma correction to be performed in advance.
Figure 4:
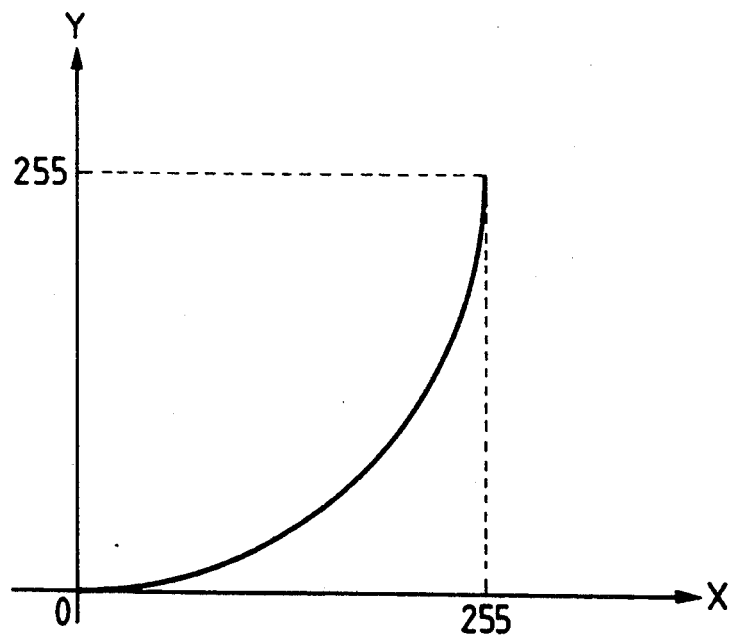
FIG. 4 is a graph showing the characteristics of the Gamma correction.
Figure 5:
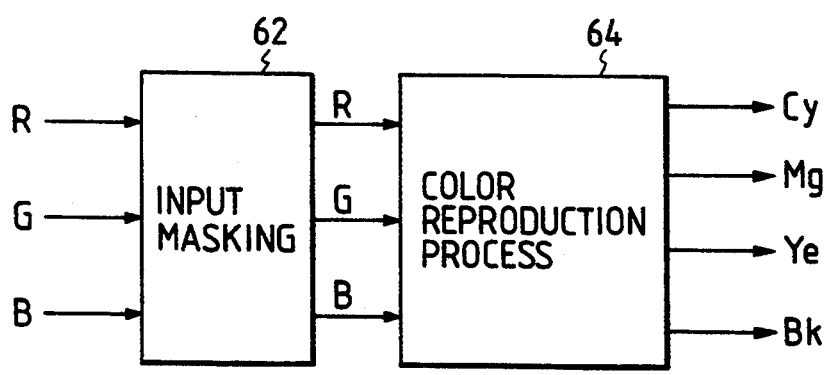
FIG. 5 is a block diagram schematically showing the structure for an input masking process to be performed in advance.

FIG. 1 shows an embodiment according to the present embodiment wherein it is connected to a computer. A reference numeral 10 designates a computer and 20, a color printer according to the present embodiment. In the computer 10, an application software 12 and a printer driver software 14 applicable to the connecting color printer 20 are stored in its main memory or an auxiliary storing apparatus. Also, to the computer 10, an image monitor 16 is connected. An image output to a monitor and/or printer is supplied from a video memory (VRAM) of the computer 10 to the monitor 16 and the color printer 20, respectively. In this respect, according to the present embodiment, the image data supplied from the computer 10 to the image monitor 16 and the color printer 20 is assumed to be eight bits of RGB type, respectively.

In the image monitor apparatus 20, a reference numeral 22 designates an interface to receive image data and commands from the computer 10; 24, the chromatic correction image memory which stores input masking coefficients and γ correction tables; 30, the color correction circuits which chromatically correct the inputted image using the input masking coefficients and. γ correction tables stored in the color correction information memory 24; 32, a color reproduction information memory storing color reproduction information; and 34, a color reproduction processing circuit to correct given color data for a color printer using the color reproduction information stored in the color reproduction memory 32 in accordance with the characteristics of color agents of the color printer. In a color reproduction circuit of the kind, the socalled output masking circuit is included to remove the effect of the asymmetric color components of the coloring agents.

A reference numeral 36 designates a CPU comprising a microcomputer, ROM and RAM; 38, a command analyzing circuit to analyze the command given to the computer 10; 40, a frame memory; 42, an image formation circuit to form a permanently visible image on a recording sheet, such as the image formation by an ink jet recording by causing liquid droplets to be ejected by thermal energy; and 44, a data bus to connect the above-mentioned circuits with each other.

FIG. 7 illustrates the format for the Gamma correction commands to be transmitted from the computer 10 to the color printer 20. The format consists of a command number to represent a Gamma correction command, and a Gamma value.

FIG. 8 illustrates the format for the input masking coefficient set up commands to be transmitted from the computer 10 to the color printer 20. The format consists of a command number to represent an input masking coefficient set up command, and an input masking coefficient aij (i, j=1 to 3).

Figure 9:
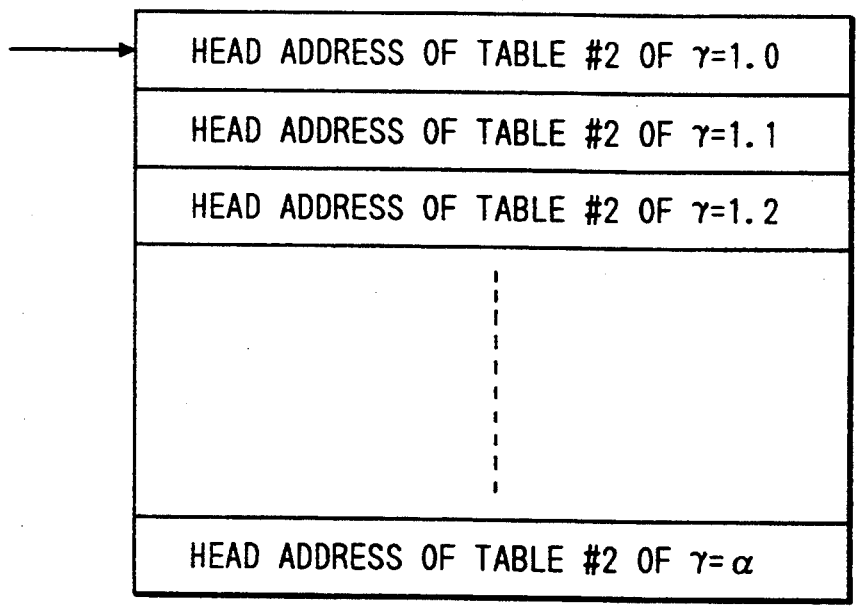
FIG. 9 is a structural diagram showing a Gamma table #1.
Figure 10:
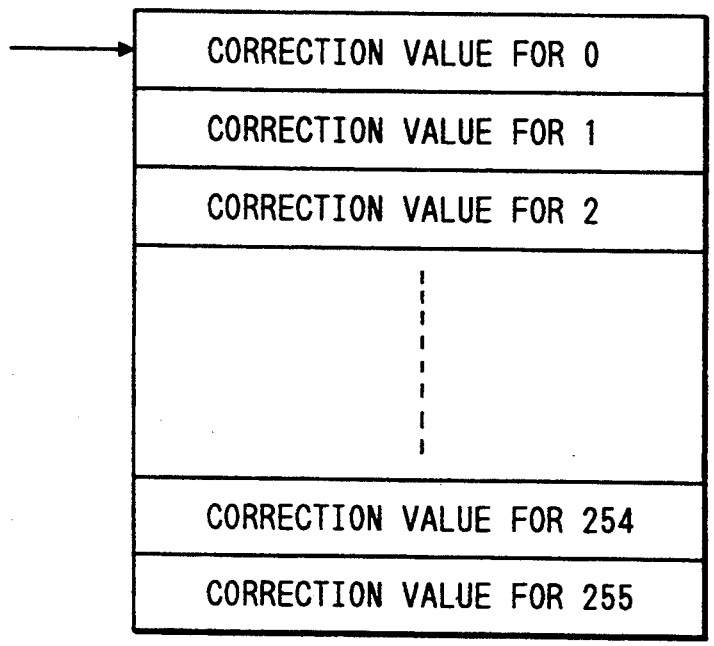
FIG. 10 is a structural diagram showing a Gamma table #2.

In the present embodiment, two kinds of Gamma correction tables #1 and #2 are stored in the memory 24. In the second Gamma correction table #2, there are stored the correction values (converted values) corresponding to the inputted values 0 to 255 (in a case of eight bits) at intervals of 0.1 within a range of $\gamma = 1.0$ to a ($>1.0$), respectively. In the first Gamma correction table #1, the head address for each of the Gamma values of the second Gamma correction table #2 is stored. The structure of the first Gamma correction table #1 is illustrated in FIG. 9 and that of the second Gamma correction table #2 is illustrated in FIG. 10.

Figure 11:
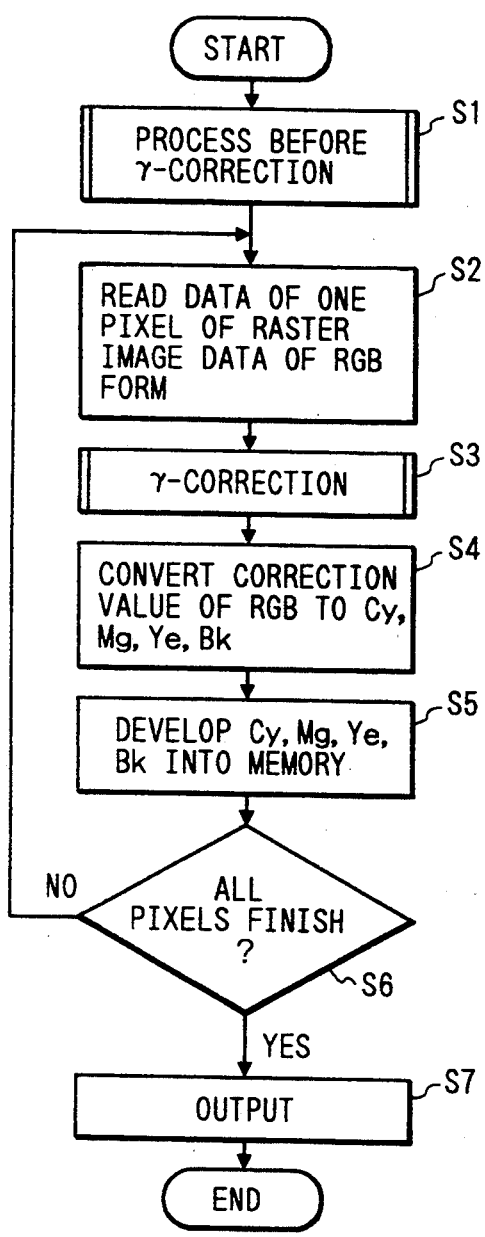
FIG. 11 is a main flowchart for a Gamma correction.
Figure 12:
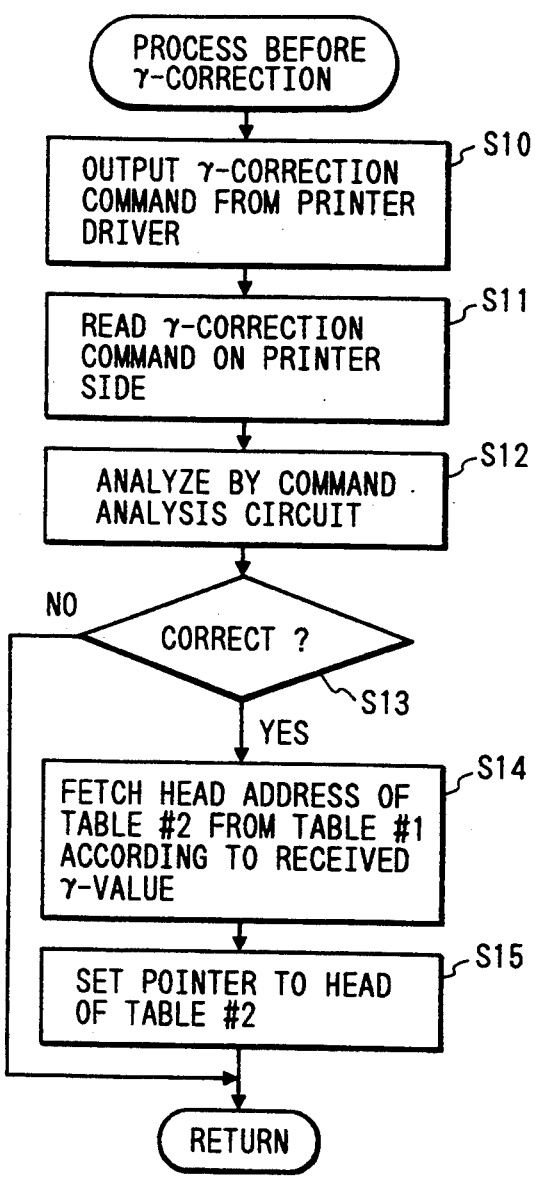
FIG. 12 is a detailed flowchart showing a preparatory process (S1) of the Gamma correction represented in FIG. 11.

FIG. 11 is a flowchart showing the operation when only a Gamma correction is required. At first, a preparatory process for the Gamma correction is conducted (S1). The detailed flowchart for the Gamma correction preparatory process (S1) is shown in FIG. 12. The printer driver 14 of the computer 10 outputs a Gamma command represented in FIG. 7 (S10). The interface 22 of the printer 20 reads the Gamma correction command (S11). The command thus received is analyzed by the command analyzing circuit 38 (S12). If the Gamma command is not correct (S13), that is, the $\gamma$ value is beyond a given range, for example, the process is terminated. When the Gamma command thus received is a correct one (S13), the $\gamma$ value to follow the command number (see FIG. 7) is collated with the table #1 of the $\gamma$ correction tables to fetch the head address of the table #2 (S14). Then, a pointer is set to the head address of the table #2 (S15).

Figure 13:
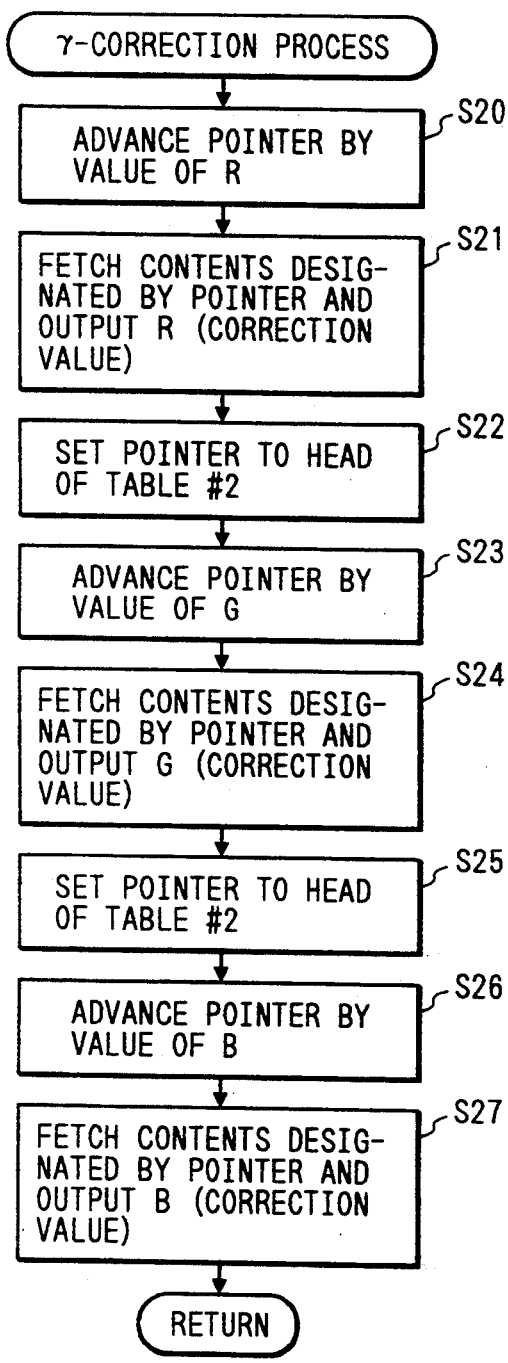
FIG. 13 is a detailed flowchart showing the Gamma correction process (S3) represented in FIG. 11.

Subsequent to the Gamma correction command, a luster image data is transferred from the computer 10 to the printer 20 in the form of RBG. After the $\gamma$ correction preparatory process (S1), the color correction circuit 30 reads one pixel data of the luster image data in the form of RGB from the data bus 44 (S2) to execute the Gamma correction process (S3). FIG. 13 illustrates the Gamma correction process in detail.

In FIG. 13, the pointer of the table #2 advances by the value of R (S20) to read the contents indicated by the pointer on the table #2 (S21). This will be the correction value for the R. The pointer is returned to the head address of the table #2 (S22). The pointer advances by the value of G (S23) to read the contents indicated by the pointer on the table #2 (S24). This will be the correction value for the G. Again, the pointer is returned to the head address of the table #2 (S25). It advances by the value of B (S26) to read the contents indicated by the pointer on the table #2 (S27). This will be the correction value for the B.

The RGB correction values thus obtained by the Gamma correction process (S3) are converted into each data of Cy, Mg, Ye, and Bk by the color reproduction processing circuit 34 by referring to the color reproduction information memory 32 (S4) to develop them into the frame memory 40 (S5). The steps S2 to S5 are executed for all the pixels (S6). When the Gamma correction is executed for all the pixels (S6), the image data stored in the image formation circuit 42 are supplied to the memory 40 to print the image on a recording sheet (S7).

Figure 14:
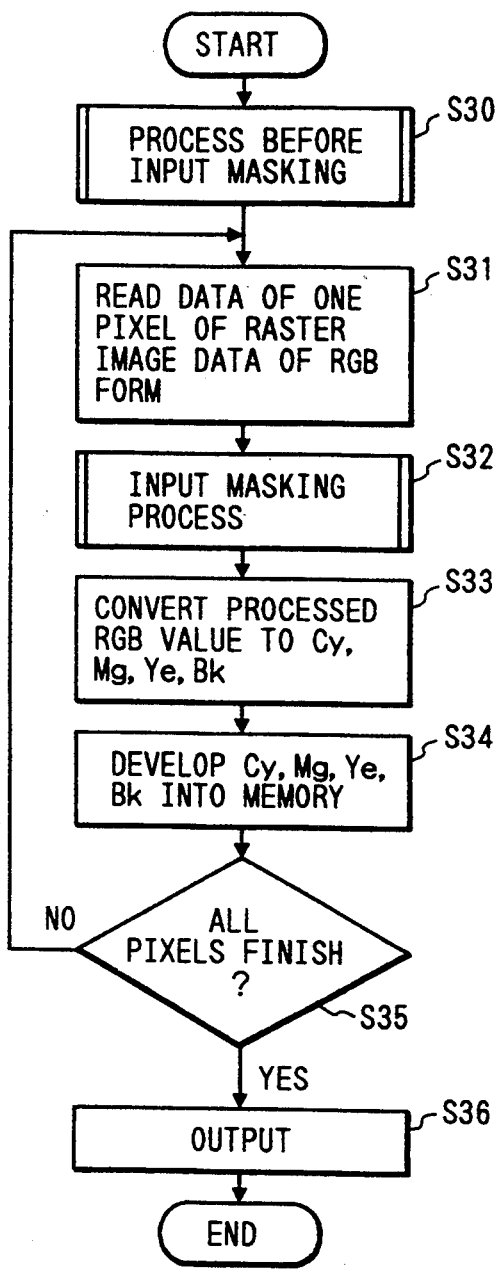
FIG. 14 is a main flowchart for an input masking process.
Figure 15:
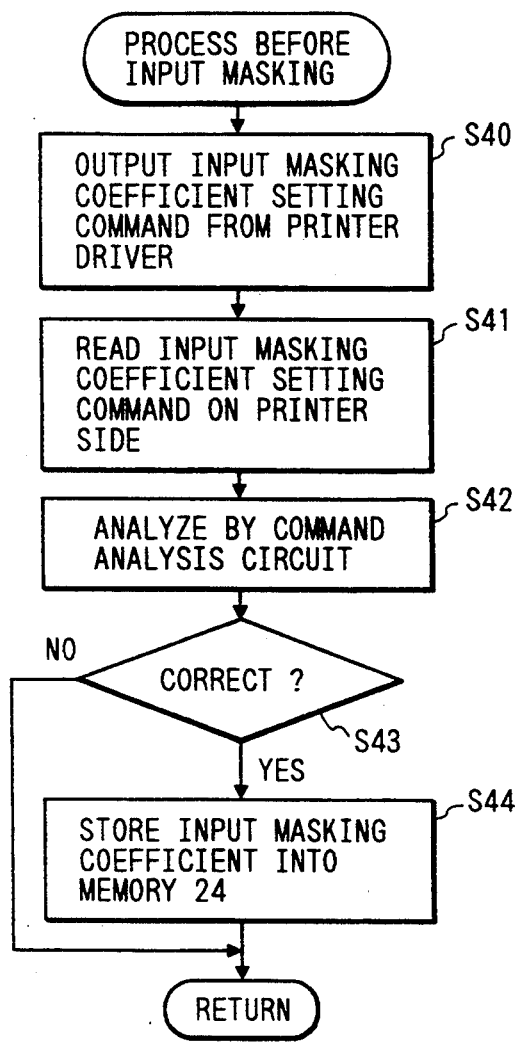
FIG. 15 is a detailed flowchart showing a preparatory process (S30) of the input masking in FIG. 14.

FIG. 14 is a flowchart illustrating the operation when only an input masking process is executed (S30). FIG. 15 is a detailed flowchart illustrating an input masking preparatory process (S30). The printer driver 14 of the computer 10 outputs an input masking coefficient set up command shown in FIG. 8 (S40). The interface 22 of the printer 20 reads the input masking coefficient set up command (S41). The command thus received is analyzed by the command analyzing circuit 38. If the input masking coefficient set up command is not correct (S43), that is, if its parameter value is beyond a given range, for example, the process is terminated. When the input masking coefficient set up command is a correct one (S43), the parameter to the command number (see FIG. 8) is stored in the input masking coefficient storing area of the color correction information memory 24 (S44).

Figure 16:
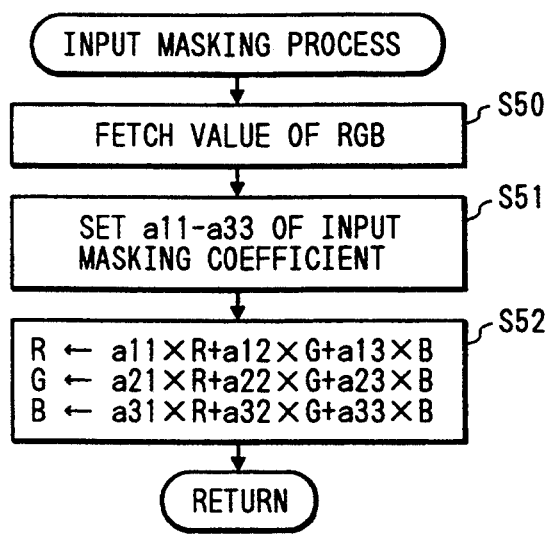
FIG. 16 is a detailed flowchart showing the input masking process (S32) represented in FIG. 14.

From the computer 10 to the printer 20, a luster image data is transferred in the form of RGB subsequent to the input masking coefficient set up command. After the preparatory process (S30), the color correction circuit 30 reads one pixel data of the luster image data in the form of RGB from the data bus 44 (S31) to execute the input masking process (S32). FIG. 16 illustrates the details of the input masking process.

In FIG. 16, an RGB value is fetched (S50) to set the input masking coefficient aij (i, j=1 to 3) stored in the memory 24 (S51) to execute the masking operation shown in FIG. 6 (S52).

Again the flow returns to FIG. 14, and the RGB correction values thus obtained by the input masking process (S32) are converted into each data of Cy, Mg, Ye, and Bk by the color reproduction processing circuit 34 by referring to the color reproduction information memory 32 (S33) to develop them into the frame memory 40 (S34). The steps S31 to S34 are executed for all the pixels (S35). When the input masking process is executed for all the pixels (S35), the image data stored in the image formation circuit 42 are supplied to the memory 40 to print the image on a recording sheet (S36).

Figure 17:
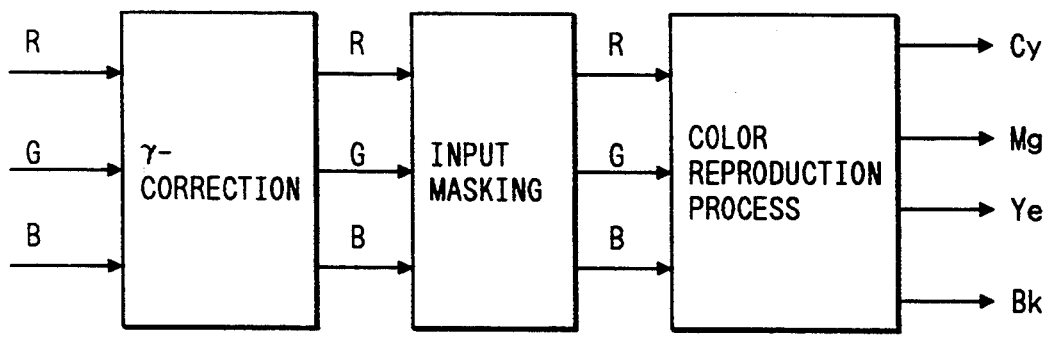
FIG. 17 is a diagram showing an equivalent circuit for an input masking process subsequent to a Gamma correction.

According to the flowcharts shown in FIG. 11 to FIG. 16, the Gamma correction and input masking process are executed separately, but it is of course possible to execute them together. FIG. 17 illustrates this in terms of an equivalent circuit, and its flowchart will be as shown in FIG. 18.

Figure 18:
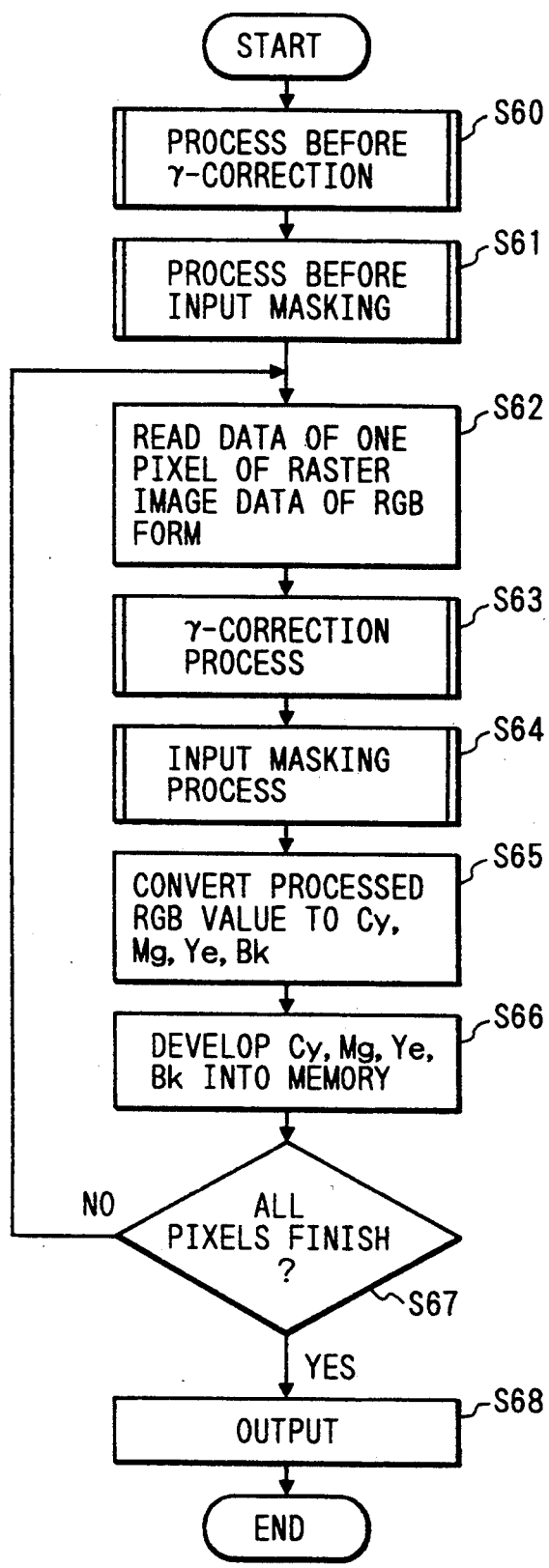
FIG. 18 is the main flowchart showing a case where an input masking process is performed after a Gamma correction.

FIG. 18 will be described. At first, the Gamma correction preparatory process shown in FIG. 12 is executed (S60) and the input masking preparatory process shown in FIG. 15 is executed (S61). Then, the color correction circuit 30 reads one pixel data of the luster image data in the form of RGB transferred from the computer 10 (S62) to execute the Gamma correction process shown in FIG. 13 (S63). Thus, the input masking process shown in FIG. 16 will be executed with respect to the correction value obtained by the Gamma correction process (S64). The RGB correction values thus obtained by the input masking process (S64) are converted into each data of Cy, Mg, Ye, and Bk by the color reproduction processing circuit 34 by referring to the color reproduction information memory 32 (S65) to develop them into the frame memory 40 (S66). The steps S62 to S66 are executed for all the pixels (S67). When the input masking process is executed for all the pixels (S67), the image data stored in the image formation circuit 42 are supplied to the memory 40 to print the image on a recording sheet (S68).

It may be possible to arrange so that the Gamma value for each input is supplied from the computer 10 to the color printer 20 in order to modify the Gamma correction characteristics arbitrarily. Hereinafter, the main part of such an embodiment will be described.

Figures 19, 20:
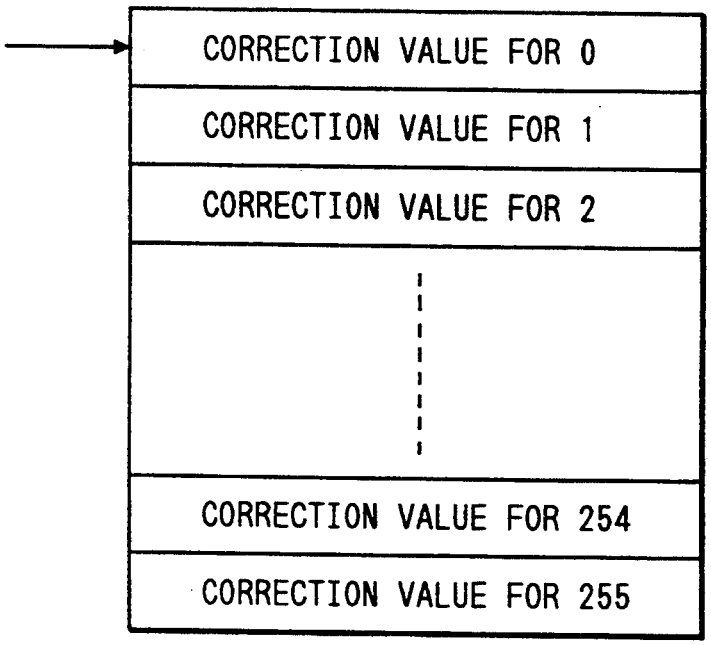
FIG. 19 is another format for a gamma correction command.
FIG. 20 is a structural diagram of a Gamma correction table #3 represented in FIG. 19.

FIG. 19 illustrates the command formula for this embodiment, which consists of the command number to identify that it is a Gamma correction command, and the correction value (converted value $\gamma n = (n = 0-255)$) of the inputted value of 0 to 255 (in the case of eight bits). In the memory 24 of the printer 20, the correction values by the command shown in FIG. 19 are stored. These are defined as a $\gamma$ correction table #3, the contents of which are represented in FIG. 20.

Figure 21:
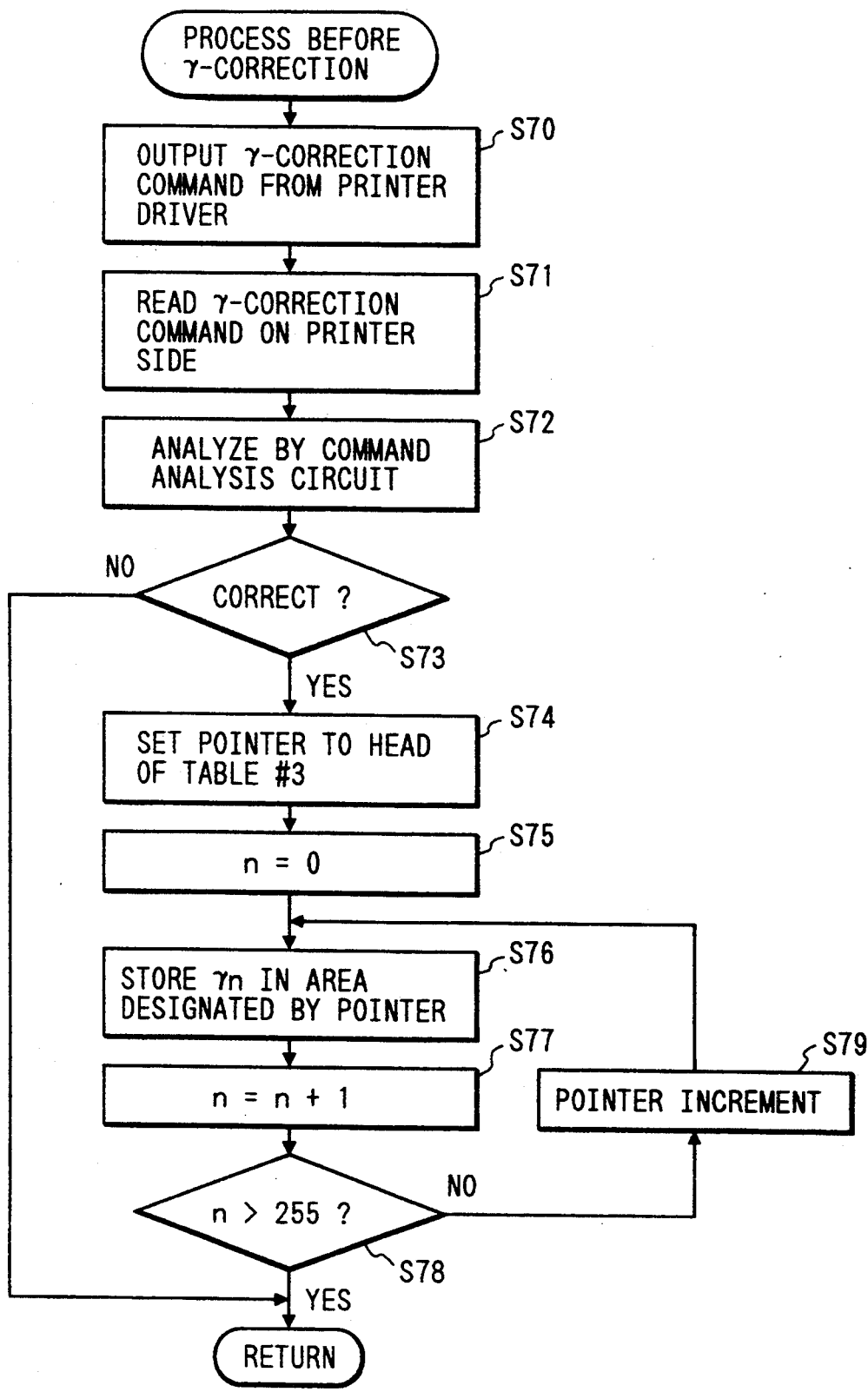
FIG. 21 is a flowchart showing a preparatory process for the Gamma correction represented in FIG. 19.

FIG. 21 is a flowchart showing the Gamma correction preparatory process in this case. To this flowchart, a routine is added to fetch the Gamma correction values defined by the command shown in FIG. 19 into the memory 24. In other words, the printer driver 14 of the computer 10 outputs the Gamma correction command shown in FIG. 19 (S70), and the interface 22 of the printer 20 reads the Gamma correction command (S71). The command thus received is analyzed by the command analyzing circuit 38 (S72). If the Gamma correction command is not correct (S73), that is, the number of the correction values is not 256, for example, the process will be terminated.

When the Gamma correction command is a correct one (S73) the pointer is set at the head of the Gamma correction table #3 (S74), and zero is assigned to the loop variable n (S75) thereby to store the value at $\gamma n$ in an area indicated by the pointer. Then, the n is incremented (S77). Thus, S76 and S77 are repeated until the n exceeds 255 (S78). In this way, the correction values $\gamma n$ (n=0 to 255) defined by the command shown in FIG. 19 are stored in the $\gamma$ correction table #3 in the memory 24.

Figure 22:
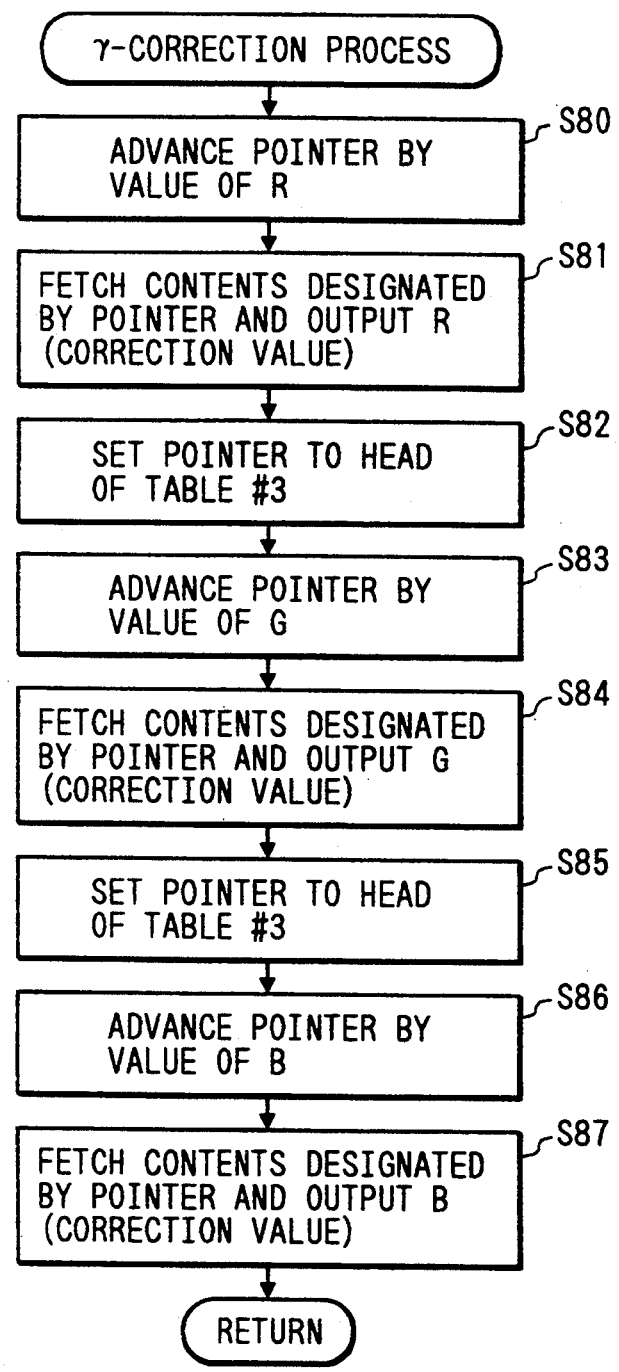
FIG. 22 is a flowchart showing the Gamma correction represented in FIG. 19.

FIG. 22 is a flowchart for the Gamma correction process. The pointer is set at the head of the table #3, and the pointer advances by the value of R (S80) to read the contents indicated by the pointer on the table #3 (S81). This will be the correction value of R. The pointer returns to the head address of the table #2 (S82). Then, the pointer advances by the value of G (S83) to read the contents indicated by the pointer on the table #3 (S84). This will be the correction value of G. Again the pointer returns to the head address of the table #2 (S85). Then, the pointer advances by the value of B (S86) to read the contents indicated by the pointer on the table #3 (S87). This will be the correction value of B.

The masking process and gamma correction process in each of the above-mentioned embodiments can be implemented both in the hardware and software. These can be implemented partly by the software or by the hardware as a matter of course. The processing sequences are not confined to the described examples, either. In the present embodiment, the input masking process can be controlled without changing the processing condition of the color reproduction processing circuit. Consequently, not only it becomes easier for the printer driver to execute the control, but also it is possible to simplify the printer driver itself.

As readily understandable from the description set forth above, the color correction capability is controlled by the external command according to the present embodiment. Therefore, the Gamma correction and input masking processes can be controlled from the outside; thus making the adjustment operations easier. It also becomes easier to adjust colors for the image to be displayed on a color monitor.

<Second Embodiment>

[Description of the structure of a color printing system (FIG. 23 and FIG. 24)]

Figure 23:
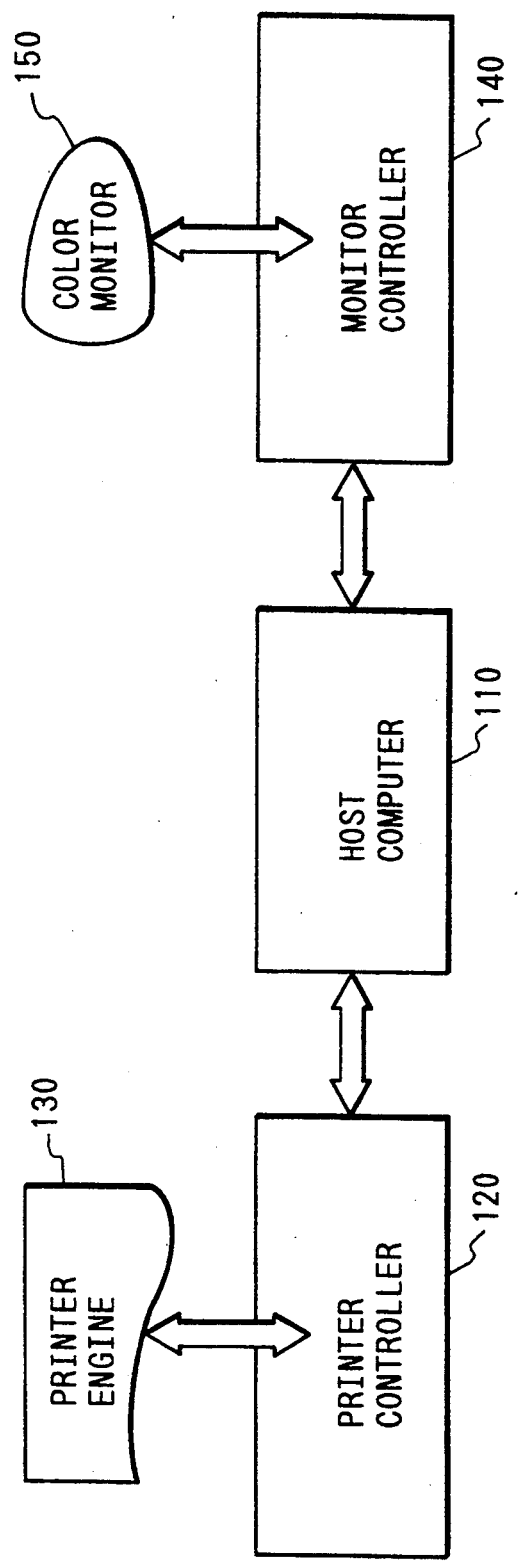
FIG. 23 is a block diagram schematically showing the structure of a color printing system according to a second embodiment which is typical of the present invention.

FIG. 23 is a block diagram schematically showing the structure of a color printing system which is typical of the embodiments according to the present invention. In FIG. 23, a reference numeral 110 designates a host computer (hereinafter referred to as host); 120 a printer controller; 130, a printer engine; 140, a monitor controller; and 150, a color monitor (hereinafter referred to as monitor).

The host 110 outputs printing data, printing commands, and others to the printer controller 120 to give a bit map development to a color image data for the recording process to be executed by the printer engine 130. Also, the host 110 outputs display data and display commands to the monitor controller 140 to cause the monitor 150 to execute the required displays and also to receive the commands issued by the monitor controller 140 for analyses. The printer engine 130 outputs the data developed by the printer controller 120 on a recording sheet in the form of a permanently visible image. The monitor 150 outputs the data developed by the monitor controller 140 in the form of a visible image.

In the present embodiment, the image data to be supplied from the host 110 to the printer controller 120 and the monitor controller 140 are assumed to be in the form of RGB each having eight bits.

Figure 24:
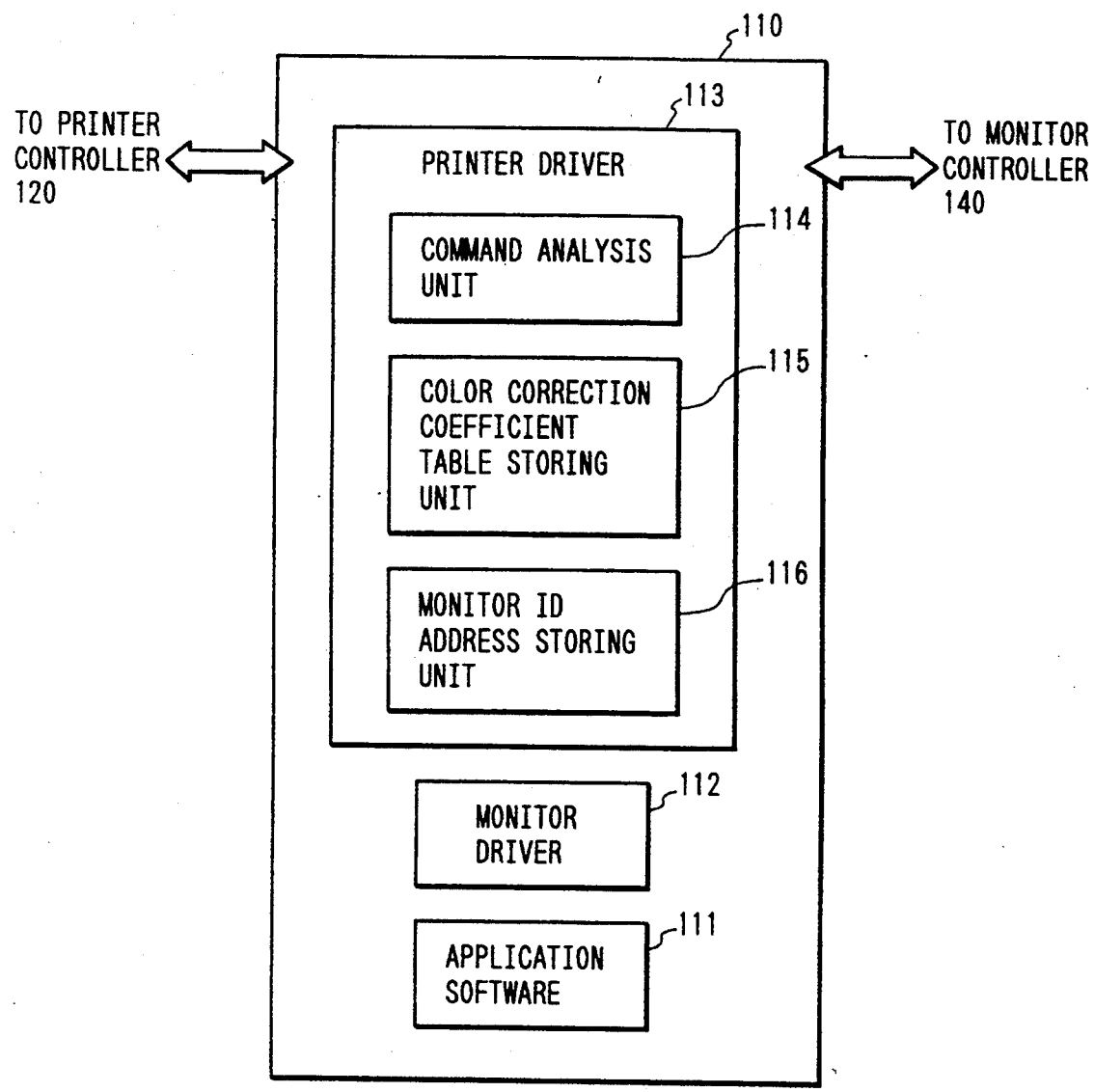
FIG. 24 is a block diagram showing the structure of a host computer 110 according to the second embodiment.

FIG. 24 is a block diagram schematically showing the detailed structure of the host 110. As shown in FIG. 24, the host 110 is operated by an operating system (not shown: hereinafter referred to as OS) and is provided with device drivers such as a monitor driver 112 to execute an application software (hereinafter referred to as application) 111, and operate the monitor controller 140 which is connected to the host 110, and a printer driver 113 to operate the printer controller 120 which is connected to the host 110. The printer driver 113 comprises a command analyzing unit 114 to analyze the commands transferred from the monitor controller 140, a color correction coefficient table storing unit for each monitor 115 to store the color correction information tables in accordance with the characteristics of the monitor 150; and a monitor ID address storing unit 116 to store the addresses of the color correction coefficient table for each monitor 115 among others.

Figure 25:
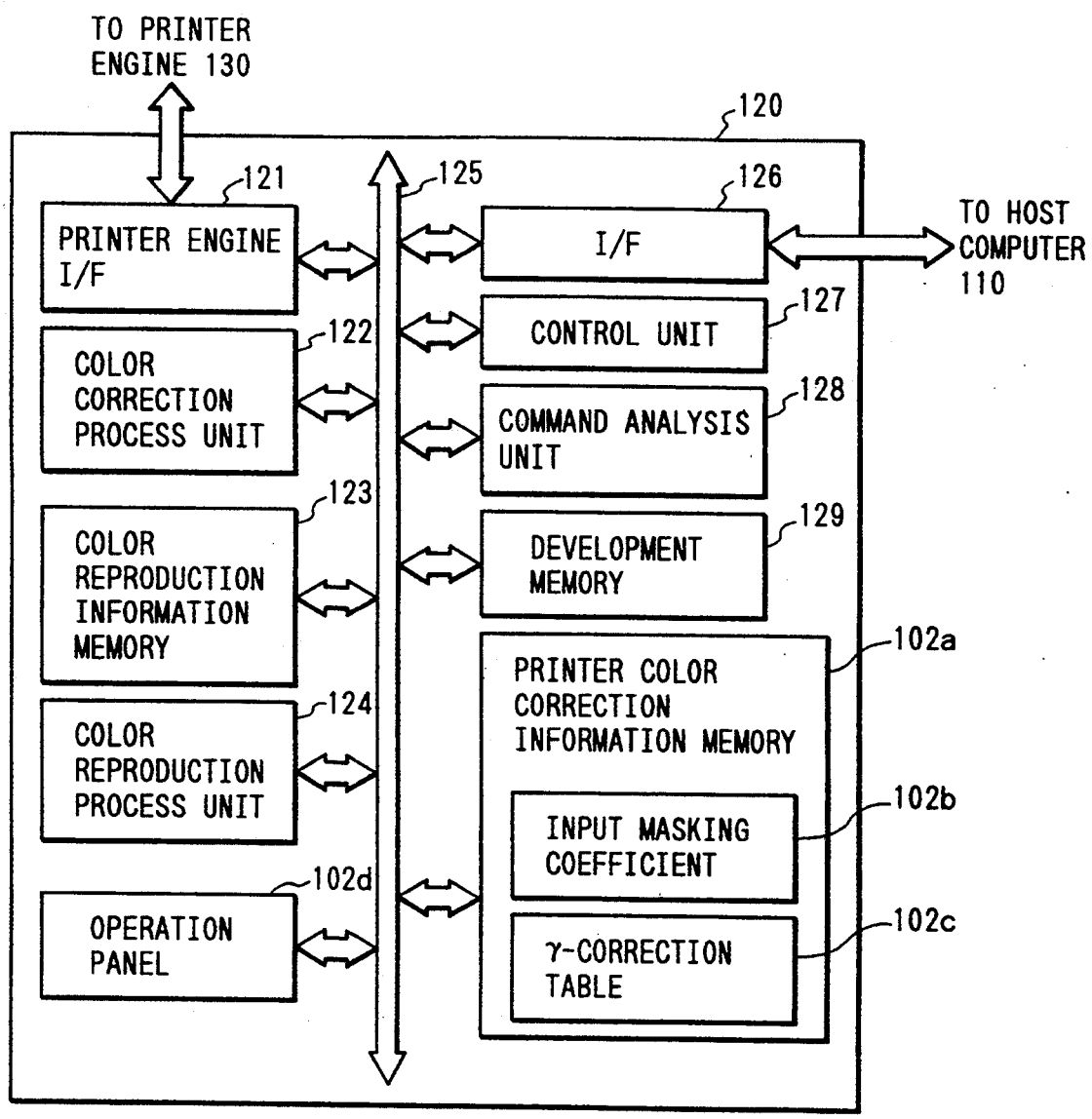
FIG. 25 is a block diagram showing the structure of a printer controller 120 according to the second embodiment.

FIG. 25 is a block diagram showing the detailed structure of the printer controller 120.

The printer controller 120 has a microprocessor system (not shown: hereinafter referred to as MPU) including ROMs and RAMs, which comprises a printer engine interface (hereinafter referred to as P interface) 121 to send and receive data to and from the printer engine 130; a color correction processing unit 122 to actually execute the color correction process; a color reproduction information memory 123 to store the information which is required at the time of a color reproduction process; a color reproduction processing unit 124 to actually execute the color reproduction process; a data bus 125; a host interface (hereinafter referred to as H interface) 126 to send and receive data to and from the host 110; a controlling unit 127 to control the entire systems of the controller; a command analyzing unit 128 to analyze the printing data and printing commands transferred from the host 110; a development memory 129 to develop the color image formed through the color correction process and color reproduction process into the bit map of the four color components of Cy (Cyanogen), Ma (Magenta), Ye (Yellow), and Bk (Black); a color correction information memory 102a to store the information required at the time of color correction process for an input masking coefficient storing unit 102b and γ correction table 102c; and an operation panel 102d.

Figure 26:
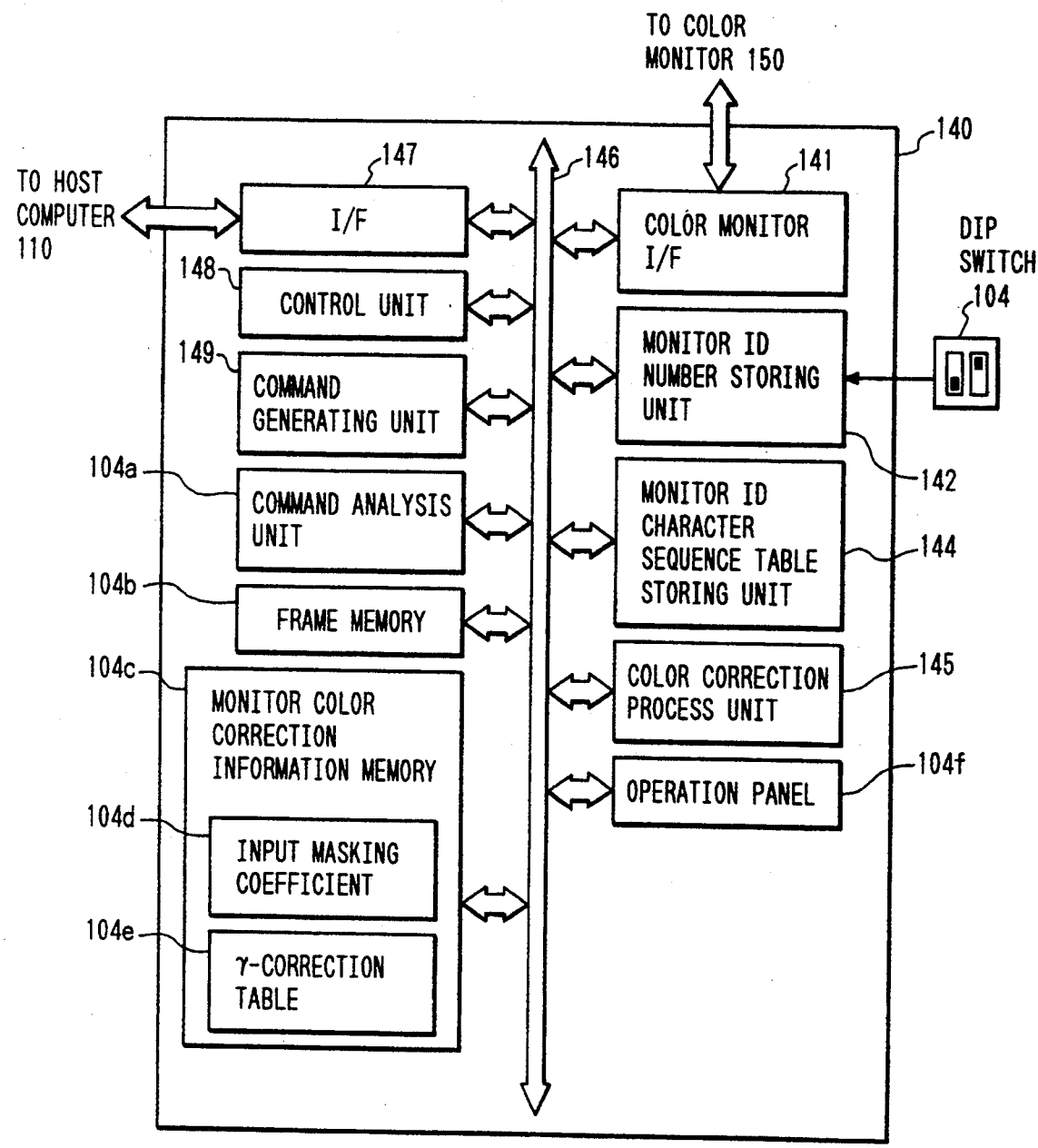
FIG. 26 is a block diagram showing the structure of a monitor controller 140 according to the second embodiment.

FIG. 26 is a block diagram illustrating the detailed structure of the monitor controller 140.

The monitor controller 140 has an MPU (not shown) including ROMs and RAMs and is provided with a color monitor interface (hereinafter referred to as M interface) 141 to send and receive signals to and from the monitor 150; a monitor ID number storing unit 142 to store the ID number to specify the model of the color monitor which is connected to the M interface 141; a dip switch 143 to input the ID number of the color monitor; a monitor ID character sequence table storing unit 144 to store the monitor ID character sequence table; a color correction processing unit 145 to actually execute the color correction process; a data bus 146; a host interface (hereinafter referred to as H interface) 147 to send and receive data to and from the host 110; a controlling unit 148 to control the entire systems of the controller; a command issuing unit 149 to issue commands to the host 110; a command analyzing unit 104a to analyze the display data and display commands transferred from the host 110; a frame memory 104b to develop the color image data formed through the color correction process; a color correction information memory 104c to store the information required at the time of color correction process for the input masking coefficient storing unit 104d and γ correction table 104e; and an operation panel 104f.

[Description of various commands (FIG. 27)]

Here, with reference to FIG. 27, the description will be made of the various commands issued from each of the constituents of the system structured as above.

FIG. 27A is a view showing the structure of a command to request the monitor information to be issued by the printer driver 113 of the host 110. As shown in FIG. 27A, such a command is composed of the command number with which to discriminate the command from the others.

FIG. 27B is a view showing the structure of a monitor information returning command to be issued by the command issuing unit 149 of the monitor controller 140. As shown in FIG. 27B, such a command is composed of the command number with which to discriminate the command from others, and the parameters of the monitor ID character sequence to specify the monitor model.

FIG. 27C is a view showing the structure of a Gamma correction command to be issued by the printer driver 113 of the host 110. As shown in FIG. 27C, such a command is composed of the command number with which to discriminate the command from others, and the parameters of the γ value.

FIG. 27D is a view showing the structure of an input masking coefficient set up command to be issued by the printer driver 113 of the host 110. As shown in FIG. 27D, such a command is composed of the command number with which to discriminate the command from the others, and the parameters of the input masking coefficient $a_{ij}$ (i, j=1 to 3) which is described in conjunction with the prior art.

[Description of various tables (FIG. 28 to FIG. 31)]

Here, the description will be made of the tables used by each constituent of the systems structured as above.

FIG. 28 is a view showing the structure of the monitor ID character sequence table stored in the monitor ID character sequence table storing unit 144 of the monitor controller 140. As shown in FIG. 28, the monitor ID character sequence table stores the monitor ID character sequence to specify the model of the monitor 150 to be connected to the monitor controller 140. In the present embodiment, there exist the monitor ID character sequences for (n+1) models. In the zeroth column, the character sequence to specify the model of the monitor ID0 is stored; in the first column, the monitor ID1, . . . , and the nth column, the monitor IDn in that order.

FIG. 29 is a view showing the structure of the color correction coefficient table #1 for each monitor stored in the storing unit 115 for the color correction coefficient table for each table of the printer driver 113 of the host 110. As shown in FIG. 29, the color correction coefficient table #1 for each monitor stores the monitor ID character sequence, γ value, input masking coefficient with which to cause the printer to execute the required color correction in accordance with the characteristics of the monitor. According to the present embodiment, the monitor ID character sequence, γ value, input masking coefficient are stored for information regarding the monitor ID0, monitor ID1, monitor ID2, . . . , and monitor IDn in that order in accordance with each model of the (n+1) monitors.

Of these data, the color correction coefficient for the monitor ID0 stored in the head of the table is assumed to be arranged as shown in FIG. 29, that is, the γ value=1.0, and each of the input masking coefficient values is $a0_{11}=1$, $a0_{12}=0$, $a0_{13}=0$, $a0_{21}=0$, $a0_{22}=1$, $a0_{23}=0$, $a0_{31}=0$, $a0_{32}=0$, $a0_{33}=1$. Also, the last column of the table, a character sequence to show the termination of the table is set ('END' in the example shown in FIG. 29).

FIG. 30 and FIG. 31 are views showing the inner structure of the γ correction table #1 and γ correction table #2 in the γ correction table 102c of the printer controller 120, respectively.

As shown in FIG. 31, there are stored in the γ correction table #2, the values (correction values) used for the conversion of such values into the RGB correction values (each component being eight bits and valued 0 to 255) in accordance with the RGB values (each component being eight bits and valued 0 to 255). In other words, the correction values (converted values) for the RGB values of 0 to 255 each are stored, and the tables are prepared for the number of the γ values (1.0 to γ, γ being a decimal value shifted by 0.1).

In the γ correction table #1 shown in FIG. 30, the head addresses of the γ correction table #2 are stored in accordance with the γ values (γ=1.0 to α per shifting of 0.1).

[System environment set up (FIGS. 32A to 33B)]

Here, the description will be made of the parameters to be set for the operation of the system structured as above.

Figure 32A:
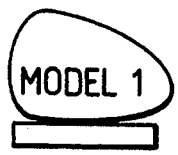
FIGS. 32A and 32B are views showing the correlation between the monitor models and ID numbers.
Figure 32B:
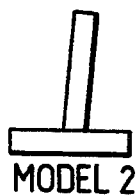

FIGS. 32A and 32B are views showing an example of the correlation between the ID number to be set and the monitor model. As shown in FIGS. 32A and 32B, an ID number is set as ID number=1 for the model 1 (its display being a CRT type) and ID number=2 for the model 2 (its display being a LCD type), for example.

Figure 33A:
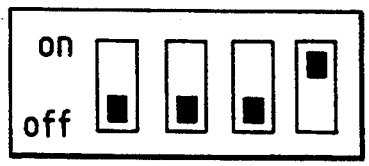
FIGS. 33A and 33B are views showing the correlation between the combination of dip switch on/off and the value to be inputted by such combination.
Figure 33B:
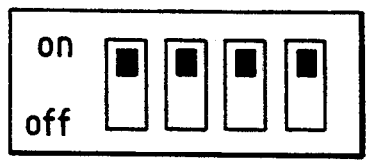

FIGS. 33A and 33B are views showing a state where monitor ID numbers are set by dip switch 143. In FIGS. 33A and 33B, the on state of the dip switch 143 means a binary 1 and its off state means a binary 0. In the example shown in FIGS. 33A and 33B, it is possible to input the four digit binary numbers (sixteen numbers) by the combinations of the four-switch on and off. FIG. 33A illustrates a case where the dip switch 143 is set for a monitor corresponding to the ID number=1 which is connected to the monitor controller 140. In this case, the dip switch 143 represents a binary "0001", namely, "1" by decimal notation. FIG. 33B illustrates a case where the dip switch 143 is set for the monitor corresponding to the ID number =15 which is connected to the monitor controller 140. In this case, the dip switch 143 represents a binary "1111", namely, "15" by decimal notation. The values inputted by the dip switch 143 are stored by the controlling unit 148 in the monitor ID number storing unit 142.

[Description of the color image output process (FIG. 34 and FIG. 35)]

Hereinafter, with reference to flowcharts shown in FIGS. 34 and 35, the description will be made of the color image output process to be executed by the system structured as above.

Figure 34:
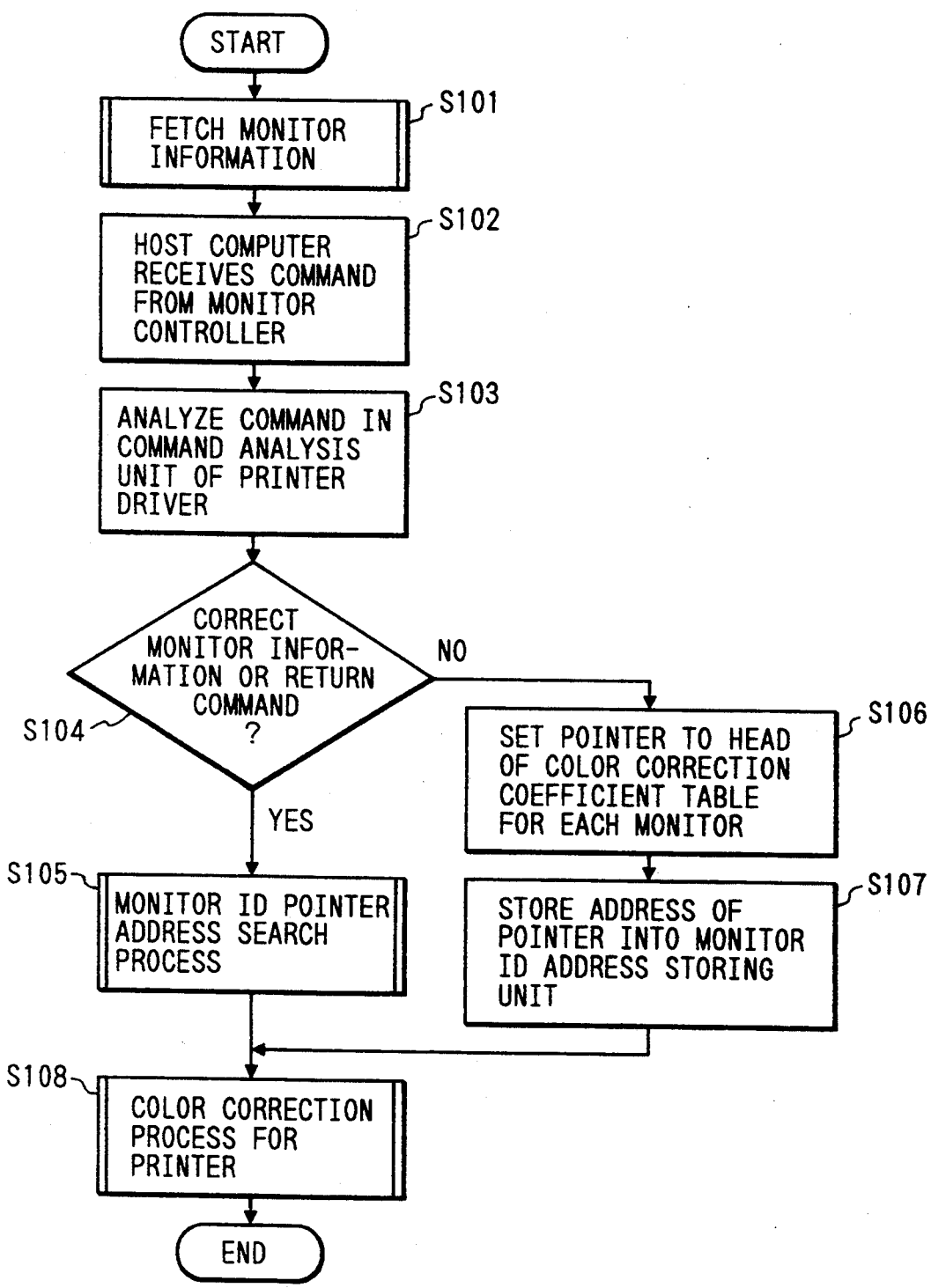
FIG. 34 is a flowchart showing the outline of the color printer output process to match the monitor characteristics according to the second embodiment.

(1) Outline of the color image output process (FIG. 34)

FIG. 34 is a flowchart showing the outline of the color printing output process in accordance with the apparatus characteristics of a monitor on the basis of the model information of the monitor 150 connected to the monitor controller 140.

At first in step S101, the host 110 executes a process to fetch a monitor ID sequence representing the model of a monitor connected to the monitor controller 140. Then, in step S102, a command issued by the command issuing unit 149 of the monitor controller 140 is read to the host 110 through the H interface 147. In continuation, in step S103, the command thus read in the step S102 is analyzed in the command analyzing unit 114 of the printer driver 113.

In step S104, the process examines whether the command analyzed in the step S103 is a correct monitor information returning command or not. Here, if, for example, the analyzed command is found to be incorrect such as no monitor ID character sequence being attached, the process will proceed to a step S106. On the other hand, if the analyzed command is found to be correct, the process will proceed to a step S105.

In the step S105, the monitor ID character sequences are searched on the color correction coefficient table #1 for each monitor shown in FIG. 29. Thus, a process is executed to store in the monitor ID address storing unit 116 a pointer address which matches the monitor ID character sequence of the monitor information returning command thus read. Also, in the step S106, the pointer is set at the head of the color correction coefficient table #1 for each monitor shown in FIG. 29. The process will proceed to step S107 to store the pointer address set in the step S106 in the monitor ID address storing unit 116.

Lastly, in step S108, the printer controller 120 executes the color correction process and outputs the image which matches the chromatic characteristics of the monitor on a recording sheet.

On the basis of the monitor model information thus obtained, the chromatic characteristic information of the monitor is output to the printer controller for the execution of the color correction process; hence making it possible to print on a recording sheet an image which matches the chromatic characteristics of the monitor.

Figure 35:
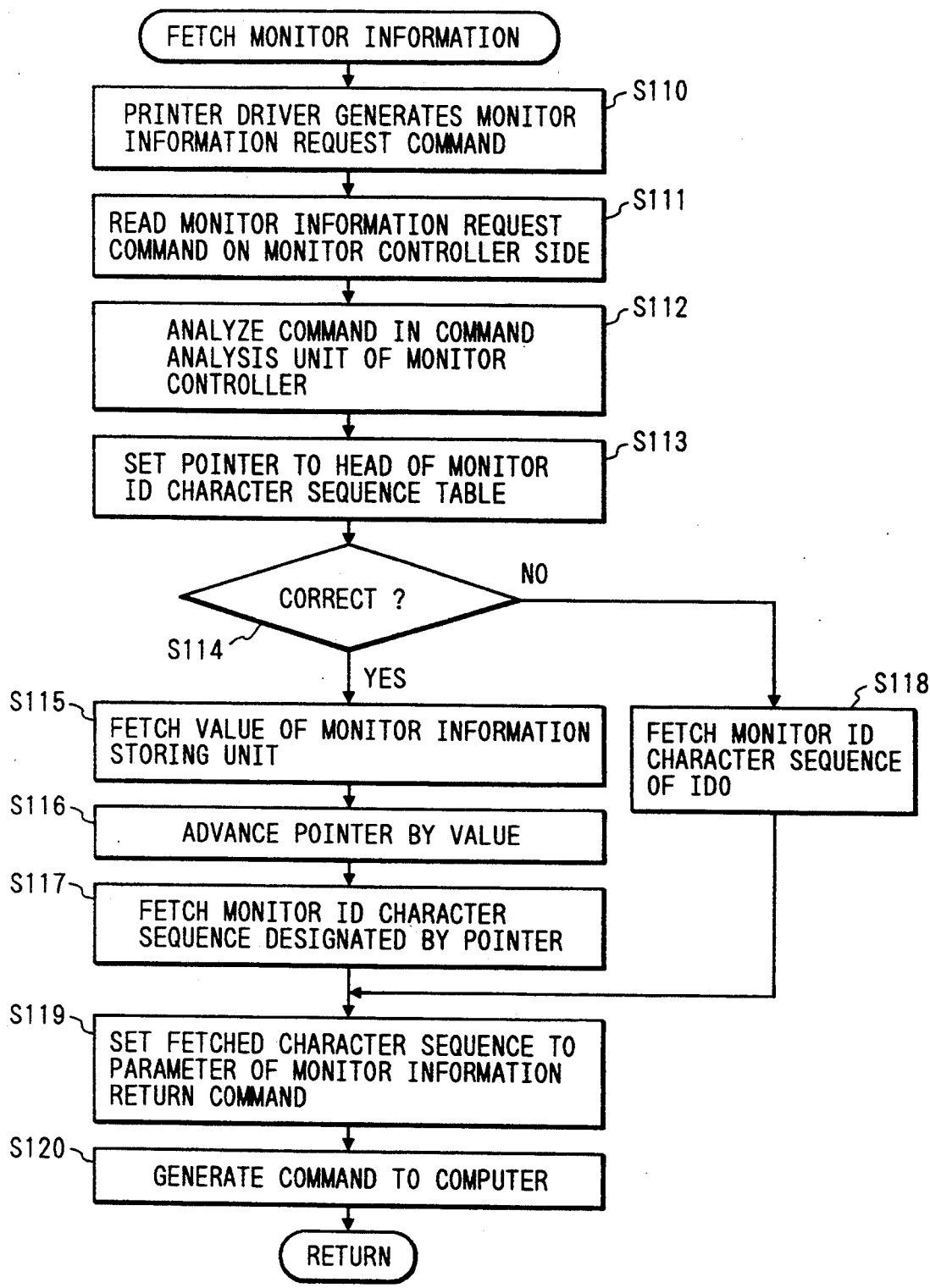
FIG. 35 is a flowchart showing the monitor information fetch process according to the second embodiment.

(2) Monitor information fetching process (FIG. 35)

Subsequently, with reference to FIG. 35, the detailed description will be made of a monitor information fetching process to be executed in the step S101.

At first, in step S110, the printer driver 113 of the host 110 issues to the monitor controller 140 a monitor information requesting command shown in FIG. 27A. Then, in step S111, the monitor information requesting command issued in the step S110 is read through the H interface 147 of the monitor controller 140.

In step S112, the monitor information requesting command thus read in the step S111 is analyzed by the command analyzing unit 104a in the monitor controller 140, and further in step S113, the pointer is set at the head of the monitor ID character sequences stored in the monitor ID character sequence table storing unit 144.

In step S114, whether the command analyzed in the step S112 is correct or not is examined. Here, if the command is found to be an incorrect command for the monitor information request such as having unwanted parameters, the process will proceed to step S118. On the other hand, if the command is found to be correct, the process will proceed to step S115.

Now, in the step S115, the process will fetch the values in the monitor ID number storing unit 142. Here, the values stored in the monitor ID number storing unit 142 are given in accordance with the model of the color monitor to be connected to the monitor controller as already described in conjunction with FIG. 11 and are the number inputted from the dip switch 143. In step S116, the pointer of the monitor ID character sequence table advances by the portion equivalent to the value fetched in the step S115. Then, continuously in step S117, the monitor ID character sequence indicated by the pointer is fetched. On the other hand, in step S118, the monitor ID character sequence for the model 0 indicated by the pointer will be fetched.

In step S119, the monitor ID character sequence fetched in the step S117 or the step S118 is set in the parameters of the monitor information returning command shown in FIG. 27B. Lastly, in step S120, the process will issue the monitor information returning command prepared in the step S119 to the host 110 through the H interface 147 using the command issuing unit 149 of the monitor controller 140; thus terminating the process.

In this way, a monitor information requesting command is issued from the printer driver 113 of the host 110 to the monitor controller 140, and then, a monitor ID character sequence corresponding to a monitor 150 connected to the monitor controller 140 which has read such monitor information requesting command is set in the parameter of a monitor information returning command. Again, the command issuing process to the host 110 will be executed. Hence, it is possible for the printer driver 113 of the host 110 to obtain the information with which to specify the model of a monitor which is connected to the monitor controller 140.

Figure 36:
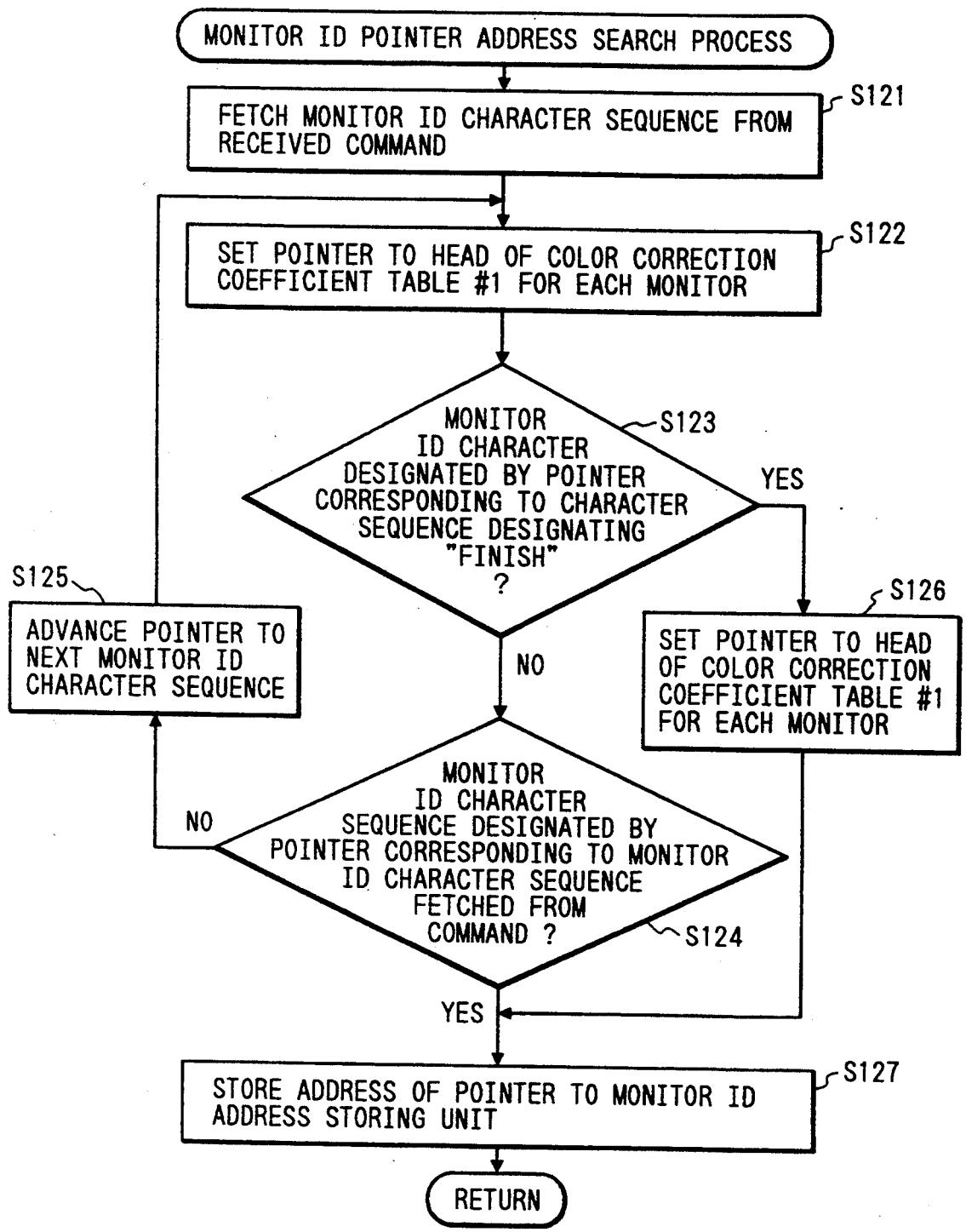
FIG. 36 is a flowchart showing the monitor ID pointer address search process according to the second embodiment.

(3) Monitor ID pointer address searching process (FIG. 36)

Here, with reference to a flowchart showing FIG. 36, the description will be made of the details of the monitor ID pointer address searching process executed in the step S105.

At first, in step S121, a monitor ID character sequence is fetched from the monitor information returning command (FIG. 20B) which has been analyzed in the step S103 in FIG. 34. Then, in step S122, the pointer is set at the head of the color correction coefficient table #1 (FIG. 29) for each monitor stored in the storing unit 115 of the printer driver 113 for the color correction coefficient table for each monitor.

Now, in step S123, a comparison is made between the fetched monitor ID character sequence and the character sequence of the monitor ID character sequence indicated by the pointer, which represents the termination of the table ('END' in the example of FIG. 29). Here, if the two character sequences are matched, the process will proceed to step S126 to set the pointer at the head of the color correction coefficient table #1 for each monitor, and proceed to step S127. On the other hand, if the two character sequences are not matched, the process will proceed to step S124.

In the step S124, a further comparison is made between the monitor ID character sequence indicated by the pointer and the monitor ID character sequence fetched from the monitor information returning command in the step S121. Here, if these two character sequences are not matched, the process will proceed to step S125 to cause the pointer to advance to the next monitor ID character sequence in the color correction coefficient table #1 for each monitor. Then, the process will return to the step S122. On the other hand, if these two character sequences are matched, the process will proceed to step S127.

Lastly, in the step S127, the pointer address is stored in the monitor ID address storing unit 116. The process is terminated.

In this way, the address, at which is stored the color correct information of the model of the monitor which is matched with the monitor ID character sequence set in the parameter of the monitor information returning command thus received, is searched from the monitor ID character sequences of the color correction coefficient table #1 for each monitor, and such address is stored in the monitor ID address-storing unit 116.

(4) Color correction process for a printer (FIG. 37 to FIG. 41)

Here, with reference to flowcharts shown in FIG. 37 to FIG. 41, the further description will be made in detail of the color correction process for a printer executed in the step S108.

Figure 37:
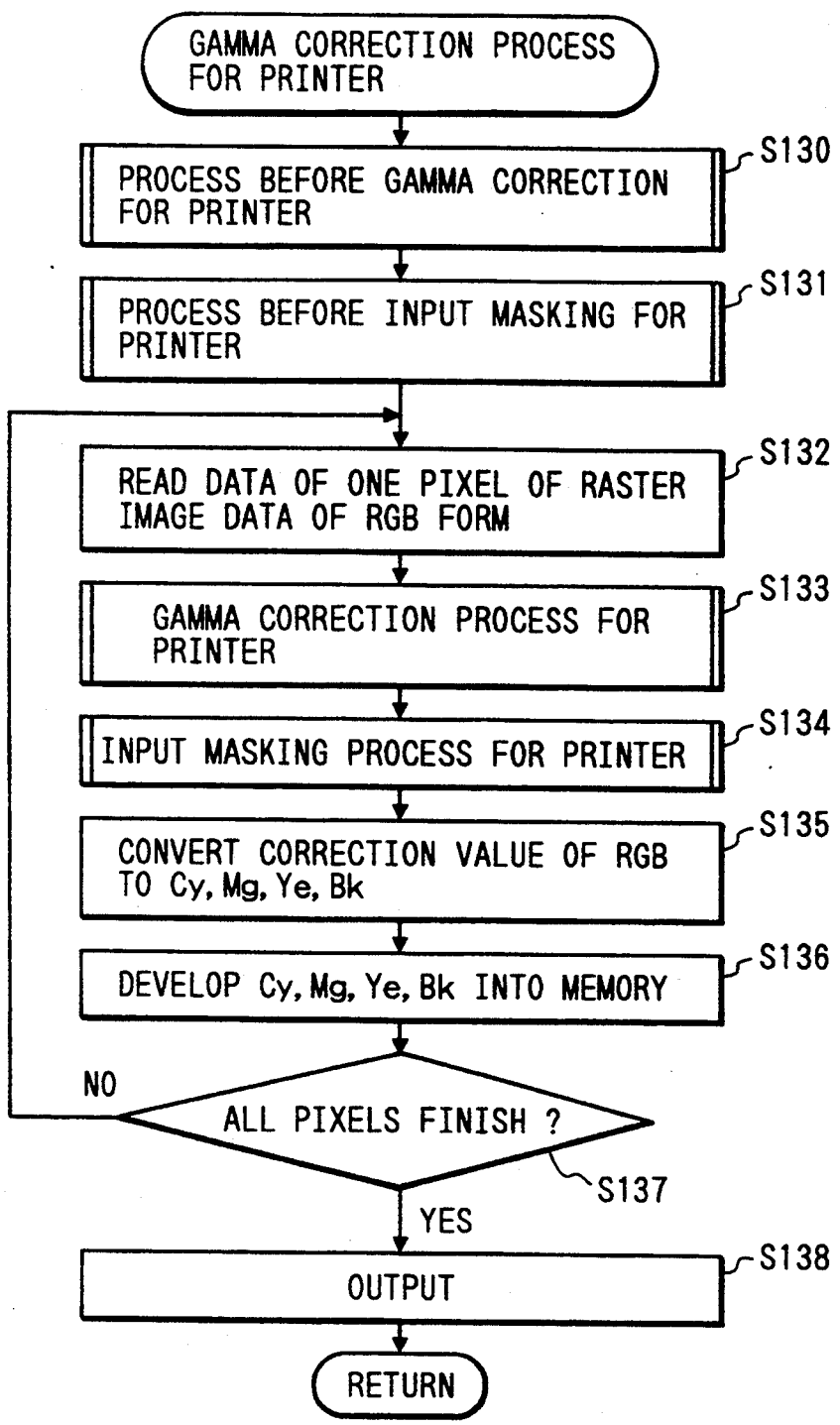
FIG. 37 is a flowchart showing the color correction process for a printer according to the second embodiment.

Outline of the color correction process (FIG. 37)

At first, the outline of the color correction process will be described with reference to the flowchart shown in FIG. 37.

FIG. 37 is the flowchart showing the color correction process for a printer in the step S108 in FIG. 34. In this precess, the γ correction process and the input making process described in conjunction with the prior art are executed with the luster image data of a RGB luminance type (each color component of the RGB per pixel is expressed in eight bits) to output the image data in color.

In step S130, a preparatory process is conducted for the γ correction of the printer controller, the details of which will be described later with reference to a flowchart shown in FIG. 38. In step S131, a preparatory process is conducted for the input masking of the printer controller, the detailed of which will be described later with reference to a flowchart shown in FIG. 39. In step S132, one pixel data of the luster image data of the RGB luminance type will be read.

Then, in step S133, the process executes the γ correction process for the printer controller, the details of which will described later with reference to a flowchart shown in FIG. 40. Further in step S134, the input masking process is executed for the printer controller, the details of which will be described later with reference to a flowchart shown in FIG. 41.

In step S135, the correction values of the RGB luminance data corrected in the steps S133 and S134 are converted by the color reproduction processing unit 124 of the printer controller 120 into the density data each for Cy, Mg, Ye, and Bk. In step S136, the bit map memory is developed in the development memory 129 of the printer controller 120 for each color component of Cy, Mg, Ye, and Bk on the basis of each value of the Cy, Mg, Ye, and Bk color components.

In step S137, whether the process for all the pixel data of the luster image data are terminated or not is examined. Here, if it is determined that the process is yet to be terminated, the process will return to the step S132. If it is determined that the process is terminated, the process will proceed to step S138.

Lastly, in the step S138, the developed bit mat is transferred to the printer engine 130 through the P interface 121 to perform the color printing. The printed sheet is discharged.

Figure 38:
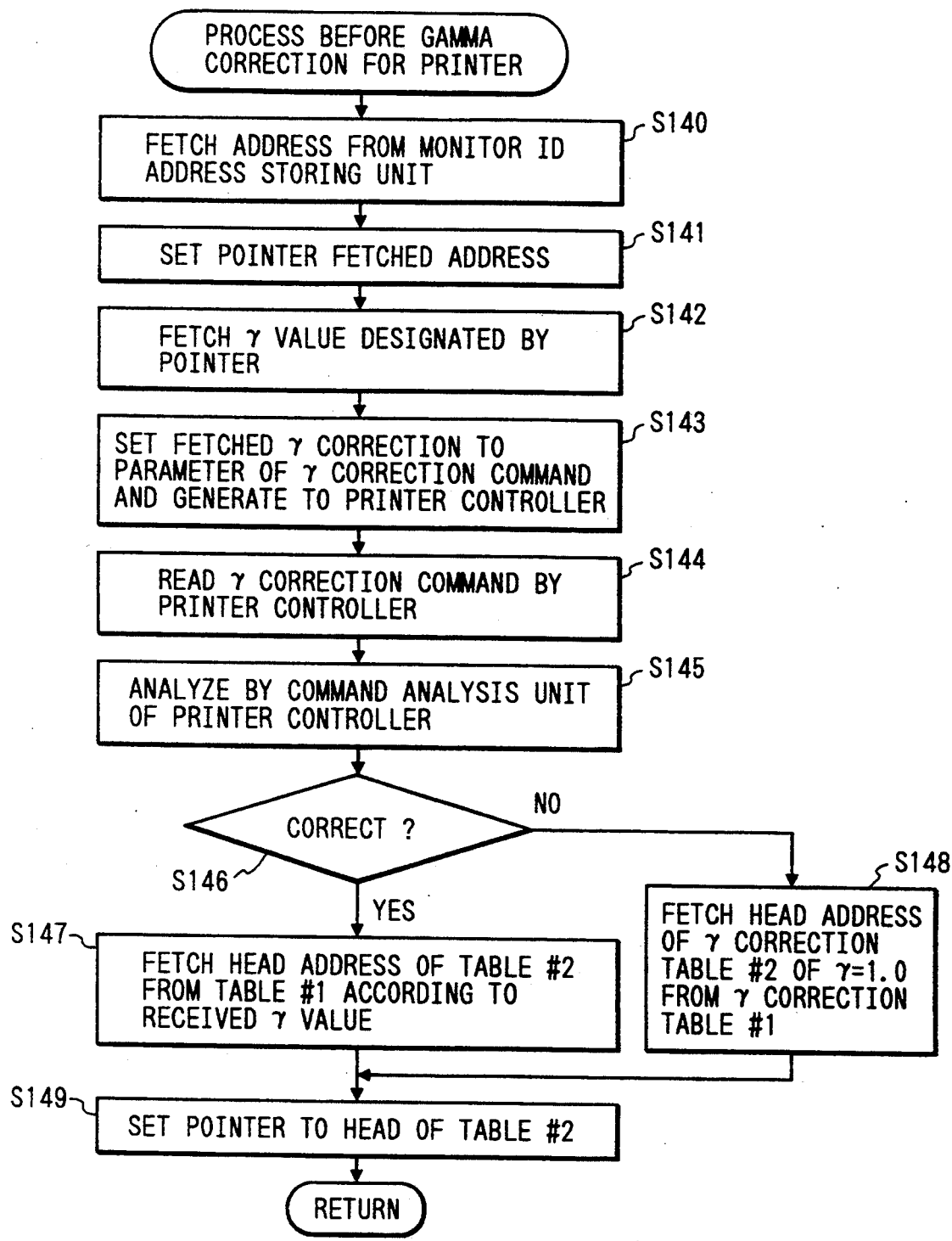
FIG. 38 is a flowchart showing the preparatory process for the gamma correction for a printer according to the second embodiment.

In this way, the γ correction process and the input masking process are given to the luster image data of the RGB luminance type to output the color image. γ correction preparatory process (FIG. 38)

Here, with reference to a flowchart shown in FIG. 31, the γ correction preparatory process will be described in detail.

In step S140, the address at which the monitor ID is stored is fetched from the monitor ID address storing unit 116 of the printer driver 113. In step S141, the pointer is set at the address thus fetched in the step S140. (The pointer is set at either one of the monitor model information on the color correction coefficient table #1 for each monitor (FIG. 29)). In step S142, the γ value indicated by the pointer is fetched.

Subsequently, in step S143, the γ value fetched in the step S142 is set in the parameters of the γ correction command (FIG. 27C) and the corresponding command is issued from the printer driver 113 to the printer controller 120. In step S144, the printer controller 120 reads the γ correction command issued in the step S143 through the H interface 126, and further in step S145, the γ correction command thus read is analyzed in the command analyzing unit 128 of the printer controller 120.

Now, in step S146, whether the analyzed command is a correct γ correction command or not is examined. Here, if the command is found to be a correct γ correction command, the process will proceed to step S147 to address the pointer at the head of the γ correction table #1 (FIG. 30) and then fetch the γ value from the analyzed γ correction command. The pointer is caused to advance to the address storing portion corresponding to such a value, and the contents indicated by the pointer (head address of the γ correction table #2 (FIG. 31)) is fetched. On the other hand, if the command analyzed in the step S145 is found to be an incorrect γ correction command (such as the parameter value being beyond the range), the process will proceed to step S148 to set the pointer at the head of the γ correction table #1 (FIG. 30) to fetch the head address of the γ correction table #2 (FIG. 31) where γ=1.0. After the execution in the step S147 or in the step S148, the process will proceed to step S149.

In the step S149, the pointer is set at the head address of the γ correction table #2 fetched in the step S147 or in the step S148; hence terminating the process.

In this way, a γ correction command is issued from the printer driver 113 of the host 110 to the printer controller 120. Then, in the printer controller 120, the γ correction command is analyzed. Thus, it becomes possible to access the table for the modification of the γ correction.

Figure 39:
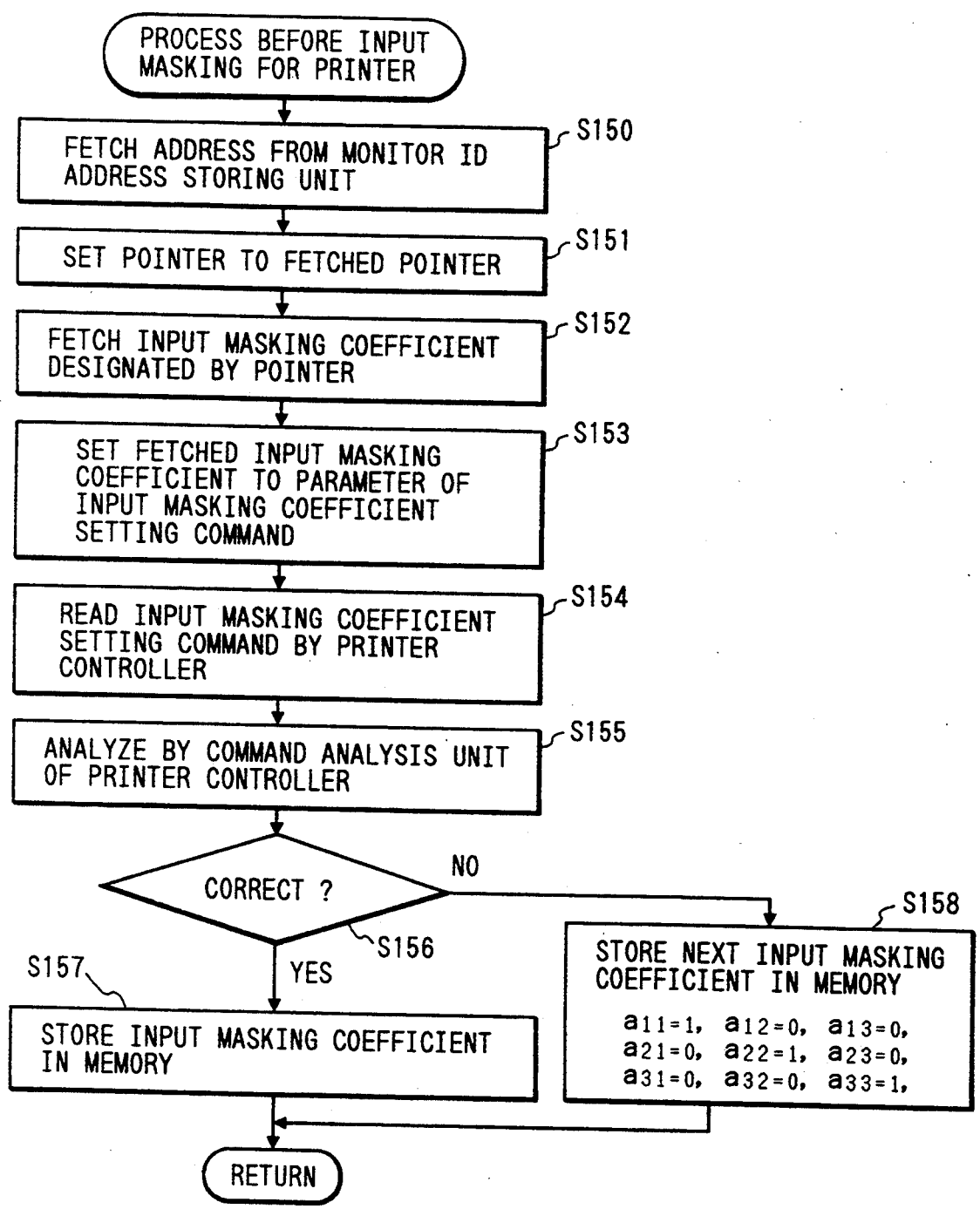
FIG. 39 is a flowchart showing the preparatory process for the input masking for a printer according to the second embodiment.

Input masking preparatory process (FIG. 39)

Here, with reference to a flowchart shown in FIG. 39, the input masking preparatory process will be described.

At first, in step S150, the address at which the monitor ID is fetched from the monitor ID address storing unit 116 of the printer driver 113. In step S151, the pointer is set at the address fetched in the step S150 (that is, the pointer is set at either one of the monitor model information of the color correction coefficient table #1 for each monitor (FIG. 29)). In step S152, the input masking coefficient indicated by the pointer is fetched.

In step S153, the input masking coefficient thus fetched is set in the parameters of the input masking coefficient set up command (FIG. 27D). Such a command is issued from the printer driver 113 to the printer controller 120. In step S154, the printer controller 120 reads the issued input masking coefficient set up command through the H interface 126, and further in step S155, the input masking coefficient set up command thus read is analyzed in the command analyzing unit 128 of the printer controller 120.

Now, in step S156, whether the analyzed command is a correct input masking coefficient set up command or not is examined. Here, if the command is not found to be a correct input masking coefficient set up command (such as the parameter value being beyond the range), the process will proceed to step S158 to set each value of the input masking coefficients to be $a_{11}=1$, $a_{12}=0$, $a_{13}=0$, $a_{21}=0$, $a_{22}=1$, $a_{23}=0$, $a_{31}=0$, $a_{32}=0$, and $a_{33}=1$ and store them in the input masking coefficient storing unit 102b; hence terminating the process. On the other hand, if the analyzed command is found to be a correct input masking coefficient set up command, the process will proceed to a step S157 to fetch the input masking coefficient $a_{ij}$(i, j, =1 to 3) from the analyzed input masking coefficient set up command and store it in the input masking coefficient storing unit 102b; hence terminating the process.

Figure 40:
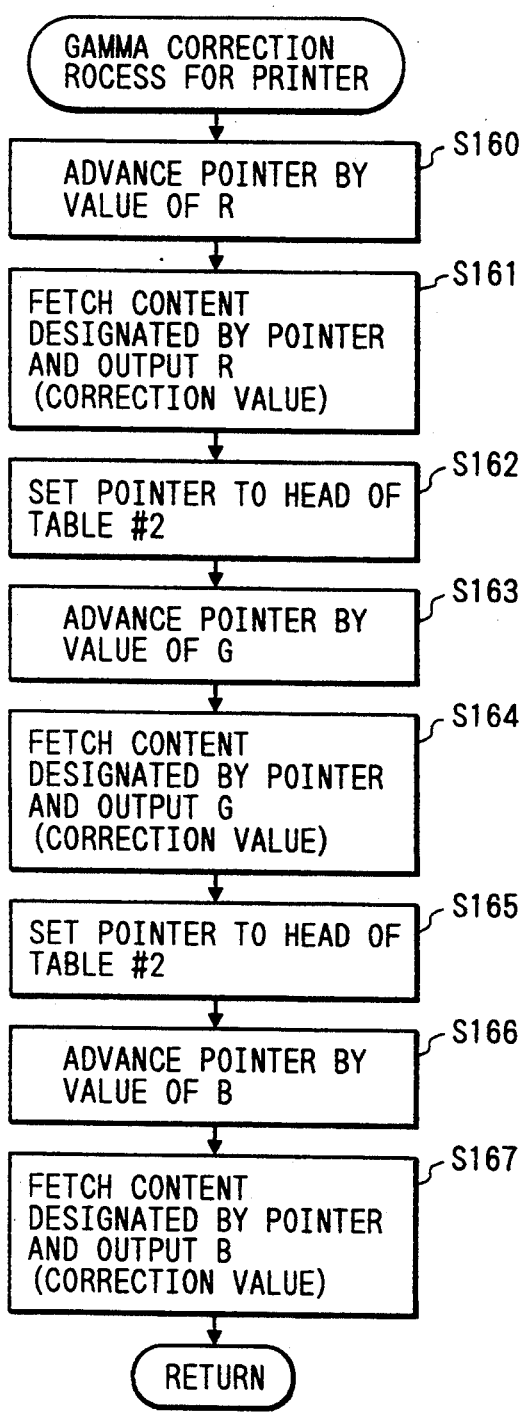
FIG. 40 is a flowchart showing the Gamma correction process for a printer according to the second embodiment.

In this way, the input masking coefficient set up command is issued from the printer driver 113 of the host 110 to the printer controller 120. The input masking command set up command is analyzed in the printer controller 120. The input masking coefficient is stored in the input masking coefficient storing unit 102b.

γ correction process (FIG. 40)

Here, with reference to a flowchart shown in FIG. 40, a γ correction process will be described.

At first, in step S160, an R component of the RGB color components read in the step S132 is fetched to cause the pointer indicating the head of the γ correction table #2 (FIG. 31) to advance by the value of the R component (express in eight bits with a value of 0 to 255). In step S161, the contents of the address indicated by the pointer is fetched from the γ correction table #2. This will be the correction value of the R. In step S162, the pointer will be returned to the head of the γ correction table #2 (FIG. 31) for the next process.

In the next step S163, a G component of the RGB color components read in the step S132 is fetched to cause the pointer indicating the head of the γ correction table #2 (FIG. 31) to advance by the value of the G component (express in eight bits with a value of 0 to 255). In step S164, the contents of the address indicated by the pointer is fetched from the γ correction table #2. This will be the correction value of the G. In step S165, the pointer will be returned to the head of the γ correction table #2 (FIG. 31) for the next process.

Likewise, in step S166, a B component of the RGB color components read in the step S132 is fetched to cause the pointer indicating the head of the γ correction table #2 (FIG. 31) to advance by the value of the B component (express in eight bits with a value of 0 to 255). In step S167, the contents of the address indicated by the pointer is fetched from the γ correction table #2. This will be the correction value of the B.

Thus, the corrected values of the RGB components to which the γ correction process has been given respectively are obtained for one pixel.

Figure 41:
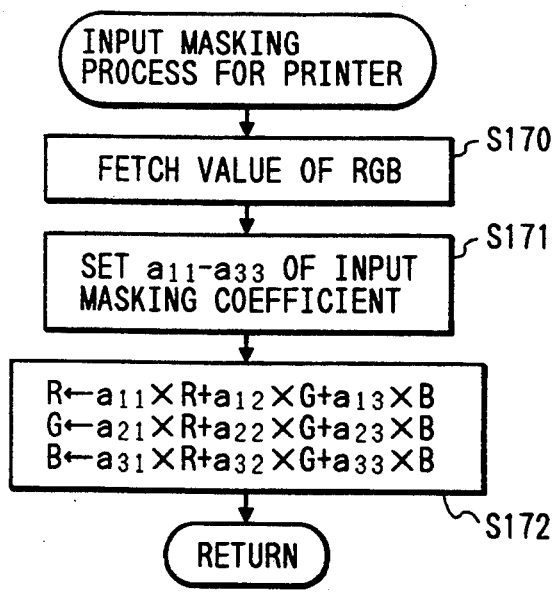
FIG. 41 is a flowchart showing the input masking process for a printer according to the second embodiment.

Input masking process (FIG. 41)

Here, with reference to a flowchart shown in FIG. 41, an input masking process will be described.

In step S170, the correction values of the RGB color components obtained respectively in the S161, S164, and S167 are fetched. In step S171, the input masking coefficient stored in the step S157 or S158 is fetched from the input masking coefficient storing unit 102b, and is set in the $a_{ij}$ (i, j=1 to 3). In step S172, a matrical operation described in conjunction with the prior art is executed to give the input masking process. The corrected value of each of the RGB color components is thus obtained to terminate the process.

In this way, the corrected values of the RGB components to which the input masking process has given respectively are obtained for one pixel.

According to the present embodiment, therefore, the model information of the monitor apparatus to be connected is read from the monitor controller, and on the basis of such information, the corresponding color correction coefficient is read by searching the color correction coefficient table. Thus, it is possible to execute the γ correction process and the input masking process.

In this respect, the description has been made in the present embodiment that the monitor-ID to discriminate a connecting monitor apparatus from others is obtained by the on/off combination of the dip switch 143 provided for the monitor controller 140, but the present invention is not confined thereto. For example, it may be possible to obtain such monitor ID by receiving a specific signal output from the monitor 150 through the M interface 141.

FIG. 42 is a view showing an example to show a state where an output signal from the monitor 150, which will be used as its monitor ID is being input into the M interface 141. As shown in FIG. 42, there are four output signal leads for the monitor 150. These four signal leads are connected to the input ports of the M interface 141 of the monitor controller 140. Here, assuming that each of the four signal leads can transmit the signals of "high (H)" state or "low (L)" state, it is possible to obtain sixteen signal patterns by the four signal leads. In this respect, the signal of the "H" state corresponds to a binary 1 while the signal of the "L" states corresponds to a binary 0, and also, the controlling unit 148 of the monitor controller 140 reads the current states of the signal leads connected to the M interface 141 to store its values in the monitor ID number storing unit 142.

According to an example shown in FIG. 42, the monitor 150 outputs a signal of "LLLH" by the four signal leads. In other words, it represents that a binary value of "0001" which is "1" by decimal notation is inputted into the M interface 141.

Also, it may be possible to structure the apparatus so that a monitor ID is stored in the monitor ID number storing unit by selecting and inputting the monitor ID number from the operation panel 104f of the monitor controller 140.

FIG. 43 is a view showing an example of the operation panel 104f of the monitor controller 140. Here, a monitor model selection switch is operated (by depressing numerical buttons, for example) to change the monitor ID numbers to be displayed. The selectively displayed monitor ID number is inputted. The controlling unit 148 of the monitor controller 140 fetches the monitor ID number inputted from the operation panel 104f to store such value in the monitor ID number storing unit 142. FIG. 43 illustrates that the monitor model selection switch is operated and "1" is inputted as the value of a monitor ID number. On the LCD, the selected monitor ID number "1" is displayed.

<Third Embodiment>

In the second embodiment, the color correction process is executed on the basis of the $\gamma$ value corresponding to the monitor model, but in the present embodiment, the description will be made of a case where the $\gamma$ correction characteristics are arbitrarily modified by supplying a $\gamma$ correction value per input of the image data from the host 110 into the printer controller 120.

Here, in the present embodiment, too, it is assumed that the same system as in the first embodiment is used. Therefore, the same reference numerals are given to the respective parts of the apparatus shared by the first embodiment, and here, the description will be made of only the parts genuine to the present embodiment. Also, regarding the flowcharts described for the present embodiment, the description of those processing steps shared by the first embodiment will be omitted. Only the processes characteristic of the present embodiment will be described.

[Description of commands (FIG. 44)]

FIG. 44 is a view illustrating a $\gamma$ correction command format in accordance with the present embodiment. As shown in FIG. 44, the command consists of a command number to indicate that it is a $\gamma$ correction command, and the $\gamma$ correction value (converted value) $\gamma$ (n) (n=0 to 255) for an inputted value ("0" to "255"). [Description of various tables (FIG. 45 to FIG. 47)]

Figure 45:
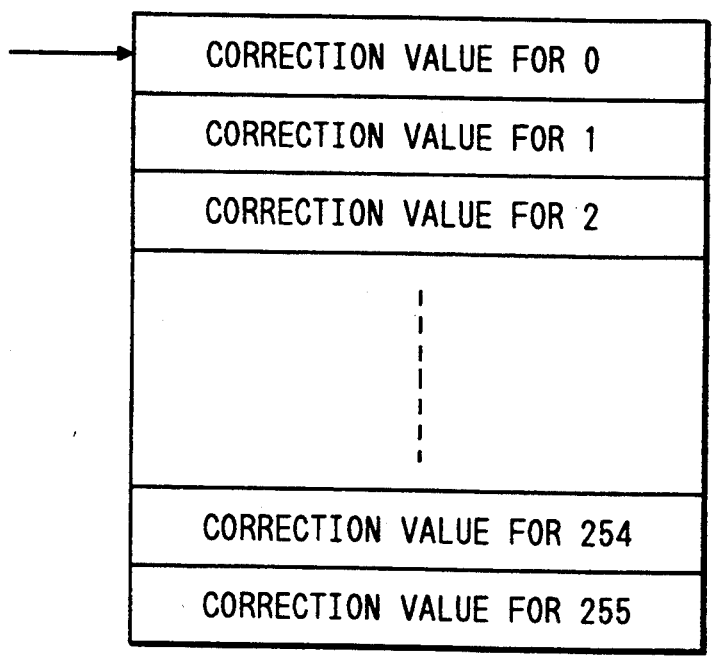
FIG. 45 is a view showing the inner structure of a γ correction table #3.

FIG. 45 is a view showing the inner structure of the $\gamma$ correction table #3 to be stored in the printer color correction memory 102a of the printer controller 120. As shown in FIG. 45, a $\gamma$ correction value (converted value) $\gamma$ (n) (n=0 to 255) by the $\gamma$ correction command is stored in the table.

Figure 46:
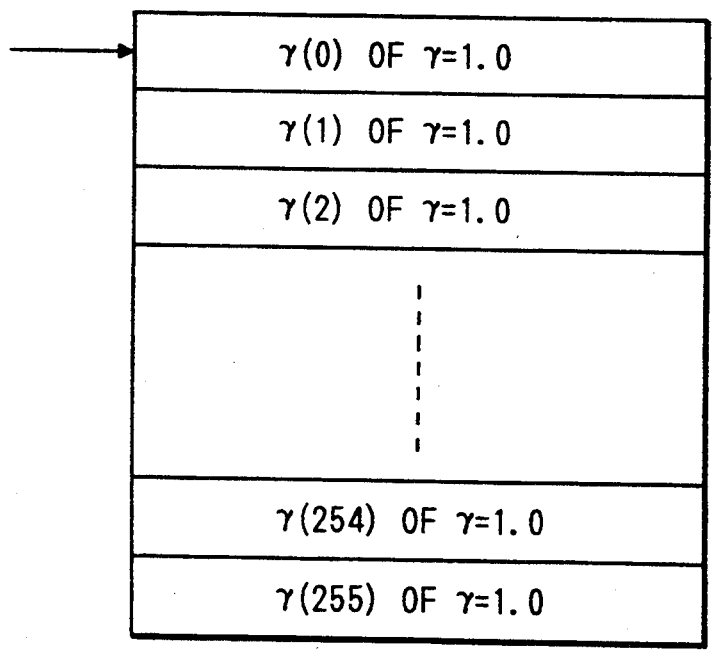
FIG. 46 is a view showing the inner structure of a γ correction table #4.

FIG. 46 is a view showing the inner structure of the $\gamma$ correction table #4 to be stored in the printer color correction memory 102a of the printer controller 120. As shown in FIG. 46, a $\gamma$ correction value (converted value) $\gamma$ (n) (n=0 to 255) where $\gamma$=1.0 is stored in the table.

FIG. 47 is a view showing the inner structure of the correction coefficient table #2 for each monitor to be stored in the storing unit 115 of the printer driver 113 for the color correction coefficient table for each monitor. In the color correction coefficient table #2 for each monitor, there are stored the monitor ID character sequences, $\gamma$ correction values (converted values) $\gamma$ (n) (n=0 to 255), and input masking coefficients to execute the color correction for a printer in accordance with the characteristics of a monitor. At the head of the table, the information of the monitor ID0 is stored. Then, the monitor ID character sequences, $\gamma$ correction values (converted values) $\gamma$ (n) (n=0 to 255), and input masking coefficients are stored in accordance with the respective monitor models for the required number of models (n+1) for the monitor ID1, monitor ID2, . . . , monitor IDn in that order. Of these data, the correction value (converted value) $\gamma$ (n) (n=0 to 255) set for the monitor ID0 at the head of the table is a correction value of $\gamma$=1.0, and the input masking coefficients are the values of $a0_{11}=1$, $a0_{12}=0$, $a0_{13}=0$, $a0_{21}=0$, $a0_{22}=1$, $a0_{23}=0$, $a0_{31}=0$, $a0_{32}=0$, $a0_{33}=1$, namely, the set values at which no color correction process will be executed.

For the remaining monitors ID1 to IDn, the values corresponding to the characteristics of the respective monitors are set for the $\gamma$ correction values (converted values) $\gamma$ (n) (n=0 to 255), and input masking coefficients. Then, in the last column of the table, a character sequence to indicate the termination of the table ("end") is set.

[Monitor ID pointer address searching process]

Here, a monitor ID pointer address searching process according to the present embodiment is the same as the process in the foregoing first embodiment described in conjunction with FIG. 13. Therefore, the description thereof will be omitted.

[$\gamma$ correction preparatory process (FIG. 48 to FIG. 50)]

Here, with reference to flowcharts shown in FIG. 48 to FIG. 50, the description will be made of a $\gamma$ correction preparatory process according to the present embodiment.

(1) Outline of the $\gamma$ preparatory process (FIG. 48)

Subsequent to the processes in the steps S140 and S141, there is fetched in step S192 the $\gamma$ correction value (converted value) $\gamma$ (n) (n=0 to 255) indicated by the pointer addressed at either one of the monitor model information in the color correction coefficient table #2 (FIG. 47). Then, in step S193, the $\gamma$ correction value (converted value) $\gamma$ (n) (n=0 to 255) thus fetched is set in the parameters of the $\gamma$ correction command (FIG. 44) to cause the printer driver 113 to issue the command to the printer controller 120.

Then, subsequent to the processes in steps S144 to 146, a process is executed in step S197 to store the transferred $\gamma$ correction value (converted value) $\gamma$ (n) (n=0 to 255) in the $\gamma$ correction table #3 (FIG. 45). This storing process will be described later in detail with reference to FIG. 49. Also, in step S198, a process is executed to store the $\gamma$ correction value (converted value) $\gamma$ (n) (n=0 to 255) where $\gamma$=1.0 in the $\gamma$ correction table #3 (FIG. 45). This process will be described later in detail with reference to FIG. 50. Lastly, in step S199, the pointer is set at the head address of the $\gamma$ correction table #3; hence terminating the process.

In this way, when the $\gamma$ correction command is issued from the printer driver 113 of the host 110 to the printer controller 120, the $\gamma$ correction command is analyzed in the printer controller 120 to store the γ correction value (converted value) γ (n) (n=0 to 255) in the table (γ correction table #3) for modifying γ correction values. Then, it is made possible to access such γ correction value.

Figure 49:
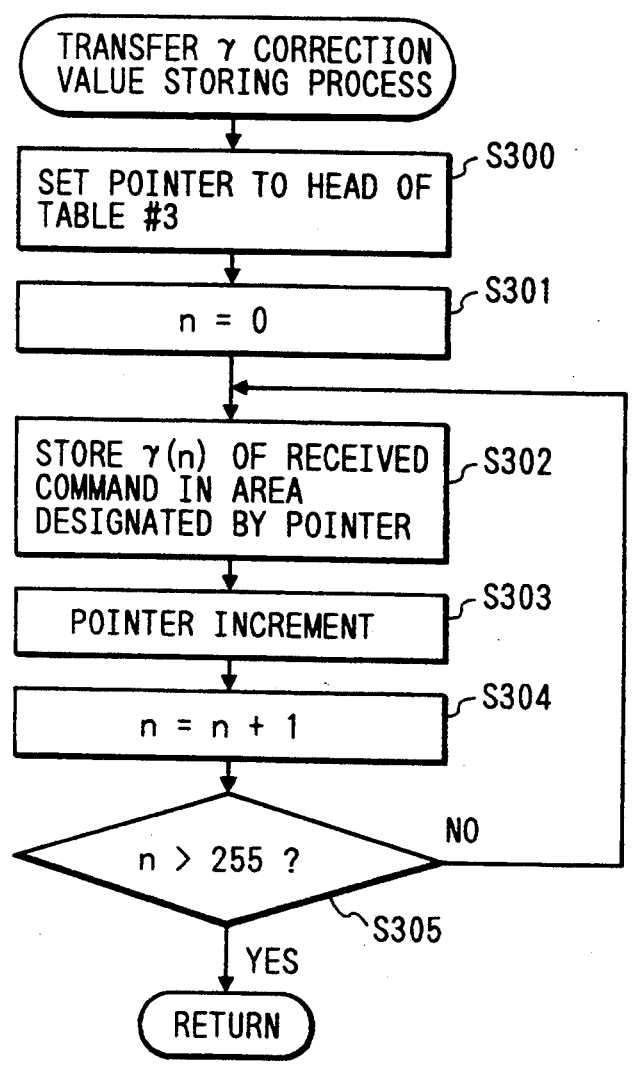
FIG. 49 is a flowchart showing a transfer γ correction value storing process according to the third embodiment.

(2) γ correction value storing process (FIG. 49)

Here, with reference to a flowchart shown in FIG. 49, the description will be made of a process to store in the γ correction table #3 the γ correction value (converted value) transferred from the host 110 by the γ correction command executed in the 197.

At first, in step S300, the pointer is set at the head of the γ correction table #3 to be stored in the γ correction table storing unit 102c of the printer controller 120. In step S201, zero is assigned to the loop variable (n).

In step S302, the γ (n) in the parameters of the γ correction command (FIG. 44) analyzed in the step S145 is fetched to store it in an area indicated by the pointer. In step S303, the pointer is incremented. In step S304, one is added to the value of the loop variable (n).

In step S305, the value of the loop variable (n) is examined. Here, if n≦255, the proceed will return to the step S302. If n>255, the process is terminated.

Thus, it is possible to store the γ correction value in the parameters of the γ correction command received by the printer controller 120 in the γ correction table #3.

Figure 50:
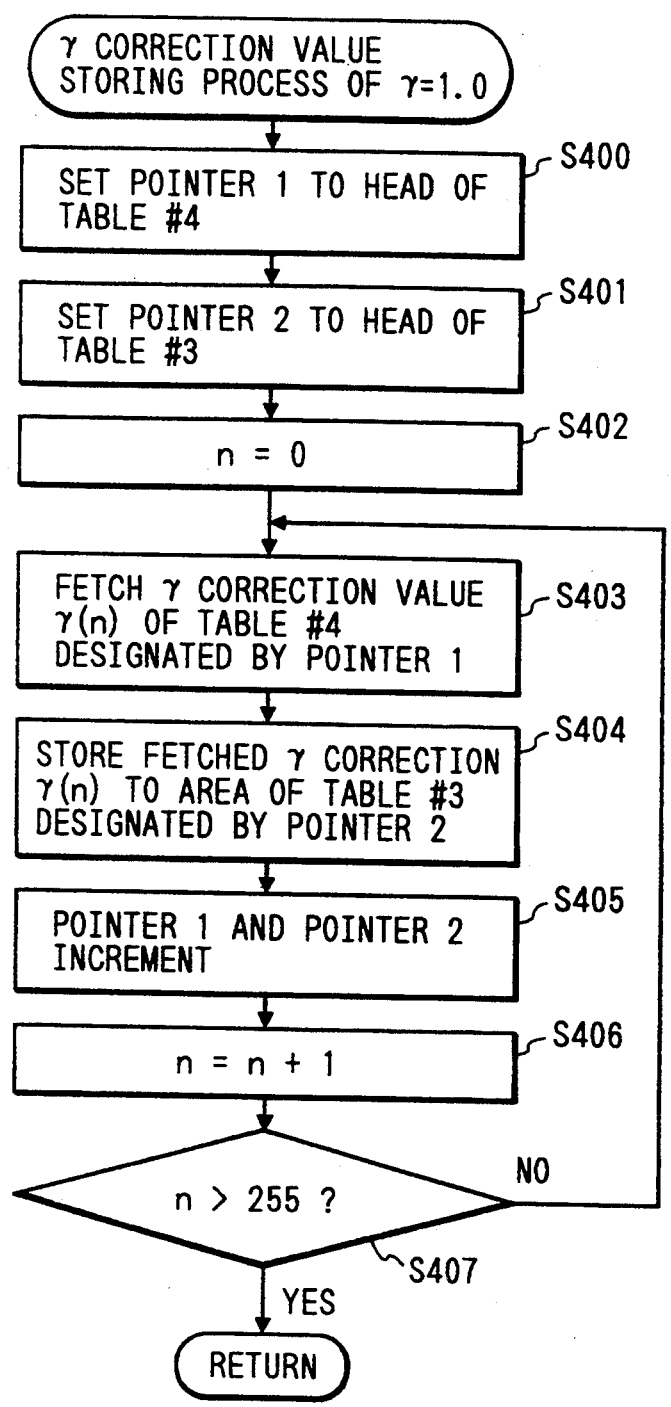
FIG. 50 is a flowchart showing a correction value storing process at γ=1.0 according to the third embodiment.

(3) γ correction value storing process (FIG. 50)

Here, with reference to a flowchart shown in FIG. 50, the description will be made of a process to store in the γ correction table #3 the γ correction value (converted value) where γ=1.0 to be executed in the step S198.

At first in step S400, the pointer 1 is set at the head of the γ correction table #4 to be stored in the γ correction table storing unit 102c of the printer controller 120. In step S401, the pointer 2 is set at the head of the γ correction table #3 to be stored in the γ correction table storing unit 102c of the printer controller 120. Also, in step S402, zero is assigned to the loop variable (n).

Then, in step S403, the γ (n) of the γ correction value (converted value) where γ=1.0 is fetched from the γ correction table #4 indicated by the pointer 1. In step S404, the γ (n) thus fetched is stored in an area in the table #3 indicated by the pointer 2. In step S405, the pointers 1 and 2 are incremented. In step S406, one is added to the value of the loop variable (n).

In step S407, the value of the loop variable (n) is examined. Here, if n≦255, the process will return to the step S403. If n>255, the process is terminated.

In this way, the γ correction value of γ=1.0 can be stored in the γ correction table #3.

[γ correction process (FIG. 51)]

Here, with reference to a flowchart shown in FIG. 40, the description will be made of a γ correction process according to the present embodiment.

However, table #3 is used instead of table #2 in steps S62 and S65 of FIG. 40 in this embodiment.

Subsequent to having fetched the correction value of an R component by the processes in the steps S160 and S161, the pointer is reset at the head of the γ correction table #3 (FIG. 45) in step S162 for the preparation of the next process.

Then, subsequent to having fetched the correction value of a G component by the processes in the steps S163 and S164, the pointer is reset at the head of the γ correction table #3 (FIG. 45) in step S165 for the preparation of the next process. Lastly, in steps S166 and S167, the correction value of a B component is fetched.

Thus, regarding one pixel of the image data, it is possible to obtain the corrected values of RGB to which the γ correction processes are given.

Therefore, according to the present embodiment, the γ correction value is supplied from the host 110 to the printer controller 120 per input of the image data; hence making it possible to modify the γ correction characteristics arbitrarily.

<Fourth Embodiment>

In the present embodiment, the description will be made of an example wherein a color correction process is executed by outputting the color characteristic information of a monitor to a printer controller in accordance with the monitor model information which has been obtained.

In the present embodiment, too, it is assumed that the same system for the first embodiment is used, and the description will be made using the same apparatus reference numerals for the parts which are shared by the first embodiment. Here, only the parts characteristic of the present embodiment will be described. Also, regarding the flowcharts in conjunction with the present embodiment, the same step reference numerals are given to the processing steps shared by the first embodiment, and the description thereof will be omitted. Here, only the processing steps characteristic of the present embodiment will be described.

[Description of the structure of a color printing system (FIG. 51 and FIG. 52)]

Figure 51:
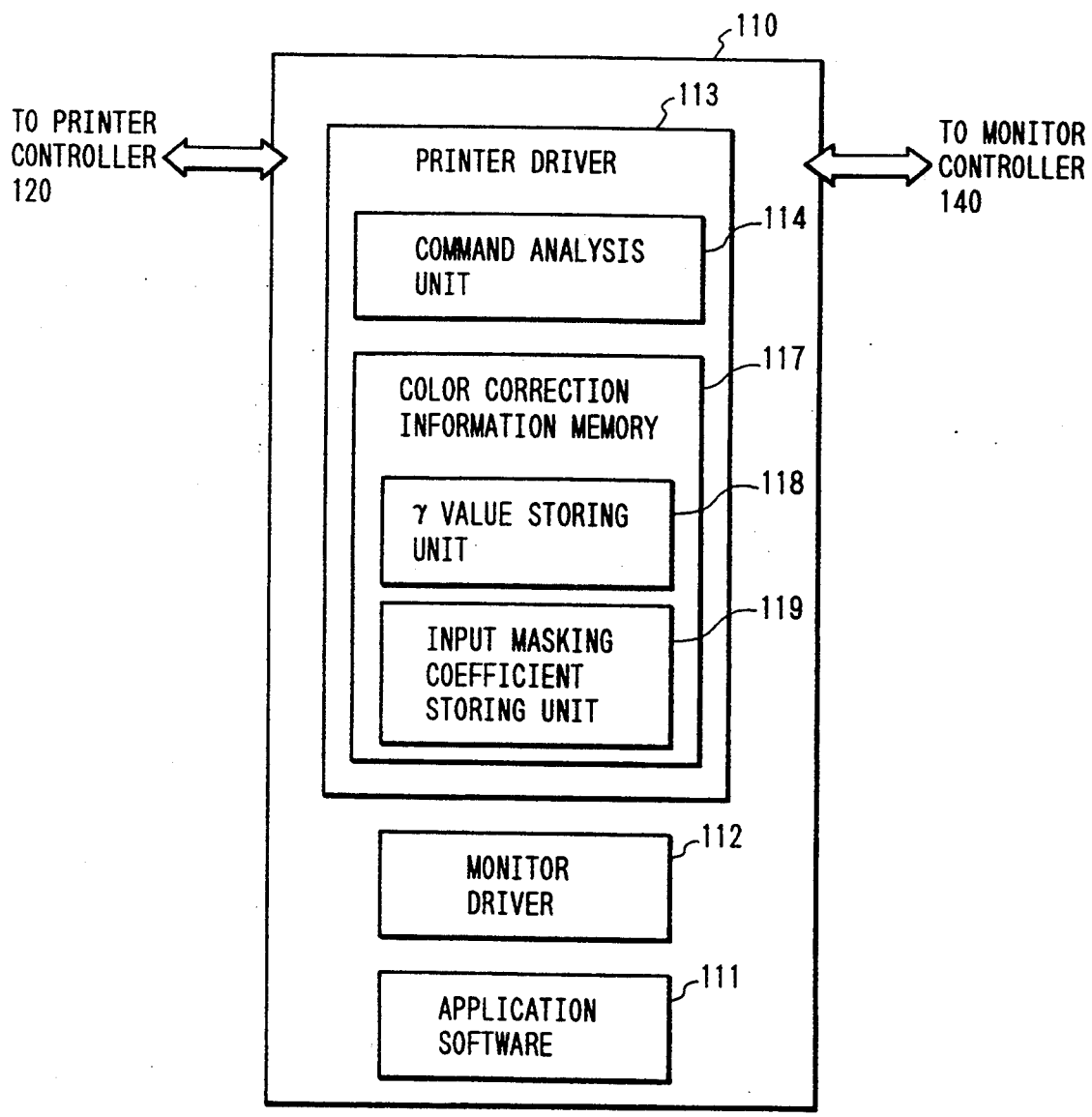
FIG. 51 is a block diagram showing the structure of a host computer 10 according to a fourth embodiment.

FIG. 51 is a block diagram showing the detailed structure of a host 110 according to the present embodiment. As shown in FIG. 51, a printer driver 113 is provided with a color correction information memory 117 having a γ value storing unit 118 to store γ values in accordance with the characteristics of monitors 50 and an input masking coefficient storing unit 119 to store input masking coefficients.

Figure 52:
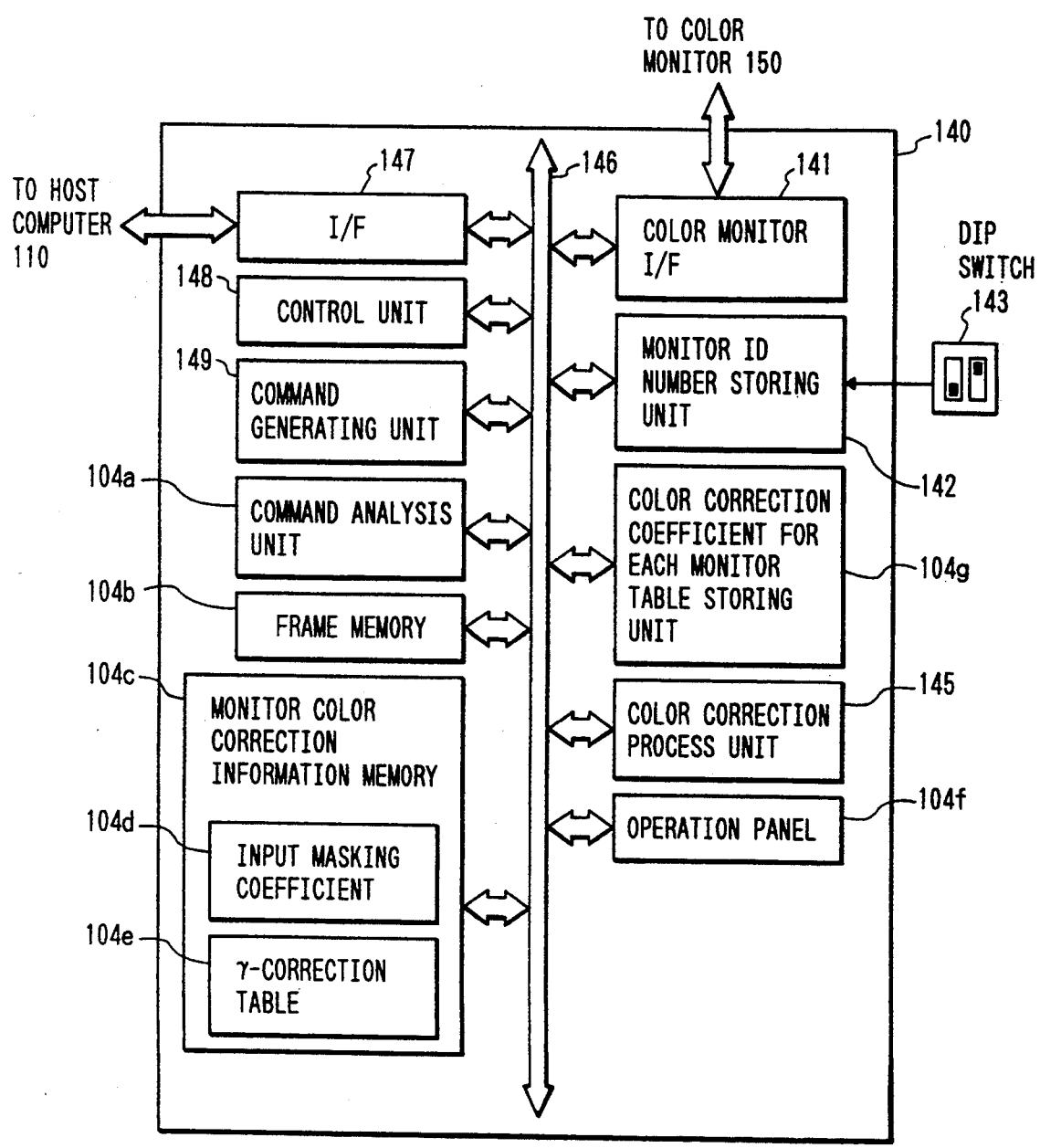
FIG. 52 is a block diagram showing the structure of a monitor controller 140 according to the fourth embodiment.

FIG. 52 is a block diagram showing the detailed structure of a monitor controller 140 according to the present embodiment. As shown in FIG. 52, the monitor controller 140 is provided with a color correction coefficient table storing unit 104g for each monitor to store the color correction coefficient table for each monitor in accordance with the characteristics of monitors.

[Description of commands (FIG. 53)]

Here, with reference to FIG. 53, the description will be made of the commands to be issued by the system of the above structure according to the present embodiment.

FIG. 53 is a view showing the structure of the monitor information returning command to be issued by the command issuing unit 149 of the monitor controller 140. As shown in FIG. 53, the command consists of a command number to discriminate such a command from others, γ value and input masking coefficient parameters.

[Description of a table (FIG. 54)]

Here, the description will be made of the table which is used by the system structured as above according to the present embodiment.

FIG. 54 is a view showing the structure of the color correction coefficient table #1 for each monitor to be stored in the storing unit 144 for the color correction coefficient table for each monitor of the monitor controller 140. As shown in FIG. 54, the color correction coefficient table #1 for each monitor ID stores the γ values and input masking coefficients with which to enable the color correction to be performed for a printer in accordance with the characteristics of the respective motor models. In the present embodiment, there are stored the information regarding a monitor ID0 at the head of the table, and then, the monitor ID character sequences, γ values, and input masking coefficients for a monitor ID1, monitor ID2, . . . , and monitor IDn in that order corresponding to the respective monitor models for the number of the models (n+1).

Of these, regarding the color correction coefficient of the monitor ID0 to be stored at the head of the table, the γ value=1.0, and each of the input masking coefficients is assumed to be $a0_{11}=1$, $a0_{12}=0$, $a0_{13}=0$, $a0_{21}=0$, $a0_{22}=1$, $a0_{23}=0$, $a0_{31}=0$, $a0_{32}=0$, and $a0_{33}=1$ as shown in FIG. 54. In other words, the values requiring no color correction process set to the monitor ID0. Also, the values corresponding to the characteristics of each monitor are set to γ values and input masking coefficients of the remaining monitor ID1 to IDn.

[Description of the color image output process (FIG. 55 to FIG. 59)]

Hereinafter, with reference to flowcharts shown in FIG. 55 to FIG. 59, the description will be made of a color image output process to be executed by a system structured above according to the present embodiment.

Figure 55:
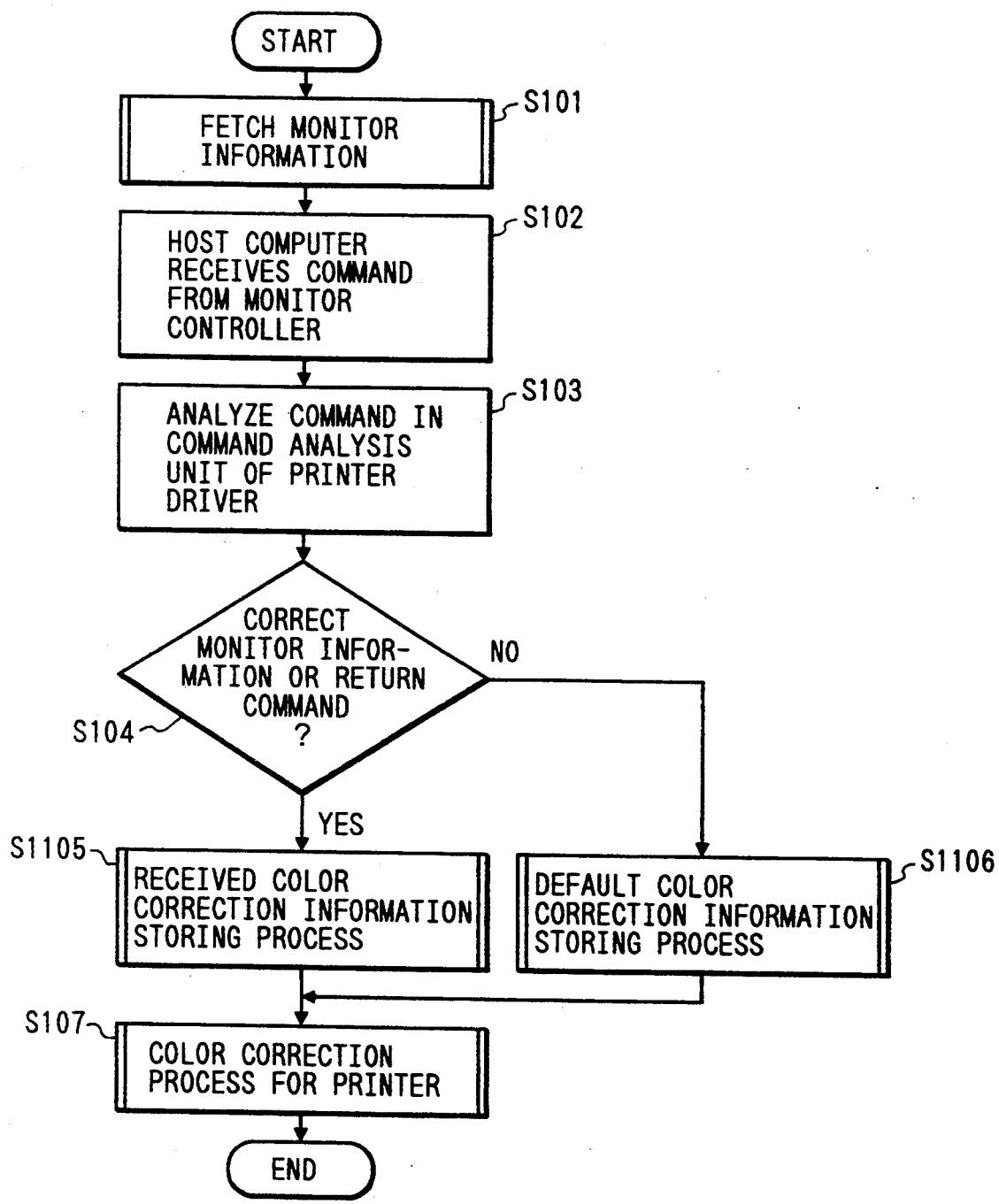
FIG. 55 is a flowchart showing the outline of a color printer output process to match the monitor characteristics according to the fourth embodiment.
Figure 56:
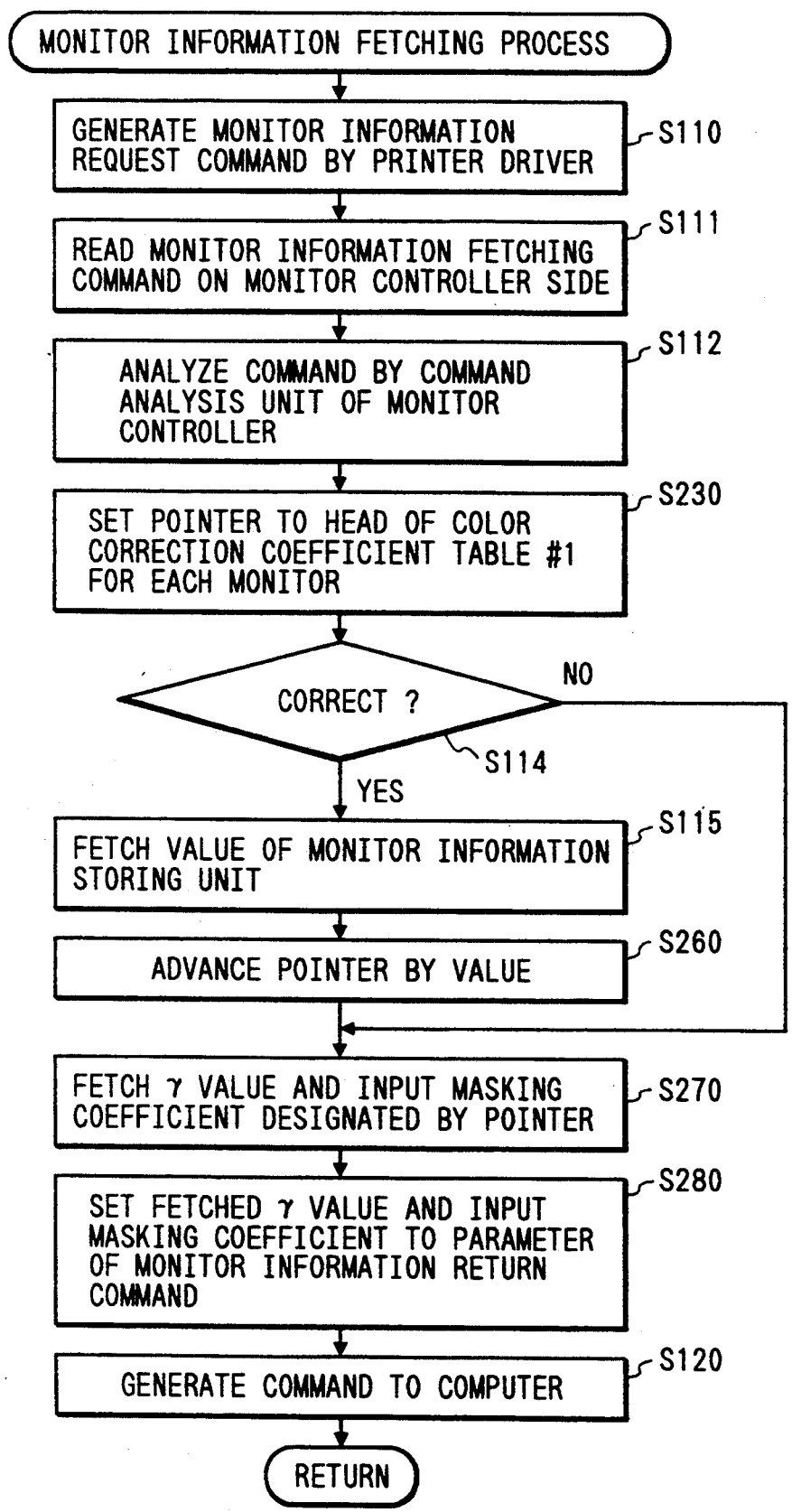
FIG. 56 is a flowchart showing a monitor information fetch process according to the fourth embodiment.

(1) Outline of the color image output process (FIG. 55)

FIG. 55 is a flowchart showing the outline of a process to execute a color printing output to a printer in response to the apparatus characteristics of a monitor on the basis of the model information of the monitor 150 connected to the monitor controller 140.

At first, in step S101, a color correction information of a monitor is fetched. After processes in steps S102 to S104, if it is found that an analyzed command is not a correct monitor information returning command to which parameters are excessively added, for example, the process will proceed to a step S1106. If the analyzed command is found to be a correct one, the process will proceed to step S1105. In this respect, the process to fetch the color correction information for the monitor in the step S101 will be described in detail with reference to a flowchart shown in FIG. 56.

In the step S1105, a process to store the received color correction information in the color correction information memory 115 is executed. In the step S1106, a process to store a default color correction information in the color correction information memory 115 is executed. Also, each process in the steps S1105 and S1106 will be described in detail with reference to the flowcharts shown in FIG. 57 and FIG. 58.

Lastly, in step S107, the color correction process is executed to output on a recording sheet an image which matches the color characteristics of the monitor.

In this way, it is possible to execute a color correction process by outputting the color characteristic information of the monitor to the printer controller in accordance the monitor model information which has been obtained, and to print on a recording sheet the image which matches the color characteristics of the monitor.

Figure 57:
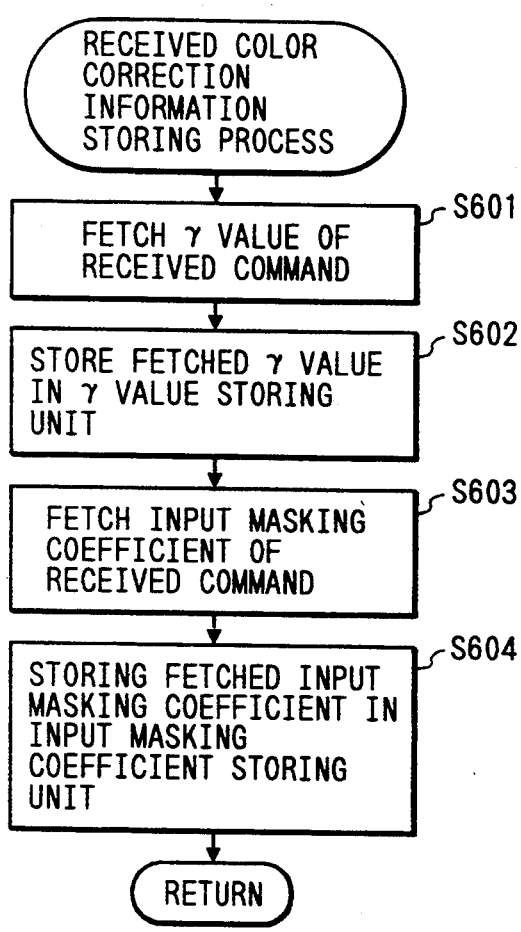
FIG. 57 is a flowchart showing a receiving color correction information storing process according to the fourth embodiment.

(2) Monitor information fetching process (FIG. 57)

Now, with reference to a flowchart shown in FIG. 57, the description will be made in detail of the monitor information fetching process to be executed in the step S101.

Further in step S230 after the processes in steps S110 to S112, the pointer is set at the head of the color correction coefficient table #1 for each monitor stored in the storing unit 144 for the monitor ID character sequence table for each monitor.

In step S114, whether the analyzed command is correct or not is examined. If the command is not a correct monitor information requesting command such as having excessive parameters, the process will proceed to a step S270. If the command is a correct monitor information requesting command, the process will proceed to step S115.

Now, in the step S115, the value in the monitor ID number storing unit 142 is fetched, and then, in step S260, the process causes the pointer to advance on the color correction coefficient table #1 for each monitor by the value thus fetched. Continuously in step S270, the γ value and input masking coefficient indicated by the pointer are fetched.

In step S280, the γ value and input masking coefficient fetched in the step S270 are set in the parameters of the monitor information returning command shown in FIG. 53. Lastly, in step S120, the process issues the prepared monitor information returning command to the host 110; hence terminating the process.

In this way, the printer driver 113 of the host 110 issues a monitor information requesting command to the monitor controller 140. The monitor controller 140 which has read the monitor information requesting command sets in the parameters of the monitor information returning command the γ value and input masking coefficient corresponding to the monitor 150 connected thereto. The command issuing process for the host 110 is again performed; hence making it possible for the printer driver 113 of the host 110 to obtain the γ value and input masking coefficient which serve as the characteristic information of the monitor connected to the monitor controller 140.

(3) Received color correction information storing process (FIG. 57)

Here, with reference to a flowchart shown in FIG. 57, the description will be made in detail of the received color correction information storing process to be executed in the step S1105.

At first, in the step S601, the γ value is fetched from the parameters of the monitor information returning command (FIG. 53) analyzed in the step S103. Then, in step S602, the γ value thus fetched is stored in the γ value storing unit 118 of the color correction information memory 117 of the printer driver 113. In step S603, the input masking coefficient is fetched from the monitor information returning command (FIG. 53). In step S604, the input masking coefficient thus fetched is stored in the input masking coefficient storing unit 119 in the color correction information memory 117 of the printer driver 113.

In this way, the γ value and masking coefficient set in the parameters of the received monitor information returning command are stored in the color correction information memory 117.

Figure 58:
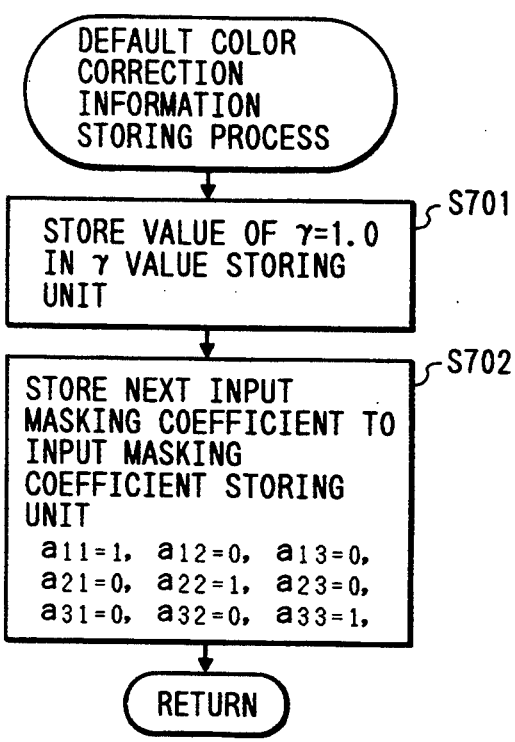
FIG. 58 is a flowchart showing a default color correction information storing process according to the fourth embodiment.

(4) Default color correction information storing process (FIG. 58)

Here, with reference to a flowchart shown in FIG. 58, the description will be made in detail of the default color correction storing process to be executed in the step S1106.

At first, in step S701, γ=1.0 is set in the γ value storing unit 118 of the color correction information memory 117. In step S702, the input masking coefficients each having the value $a_{11}=1$, $a_{12}=0$, $a_{13}=0$, $a_{21}=0$, $a_{22}=1$, $a_{23}=0$, $a_{31}=0$, $a_{32}=0$, and $a_{33}=1$ are stored in the input masking coefficient storing unit 119 of the color correction information memory 117.

In this way, the default color correction information (the γ value and input masking coefficients for no color correction) is stored in the color correction information memory 117.

Figure 59:
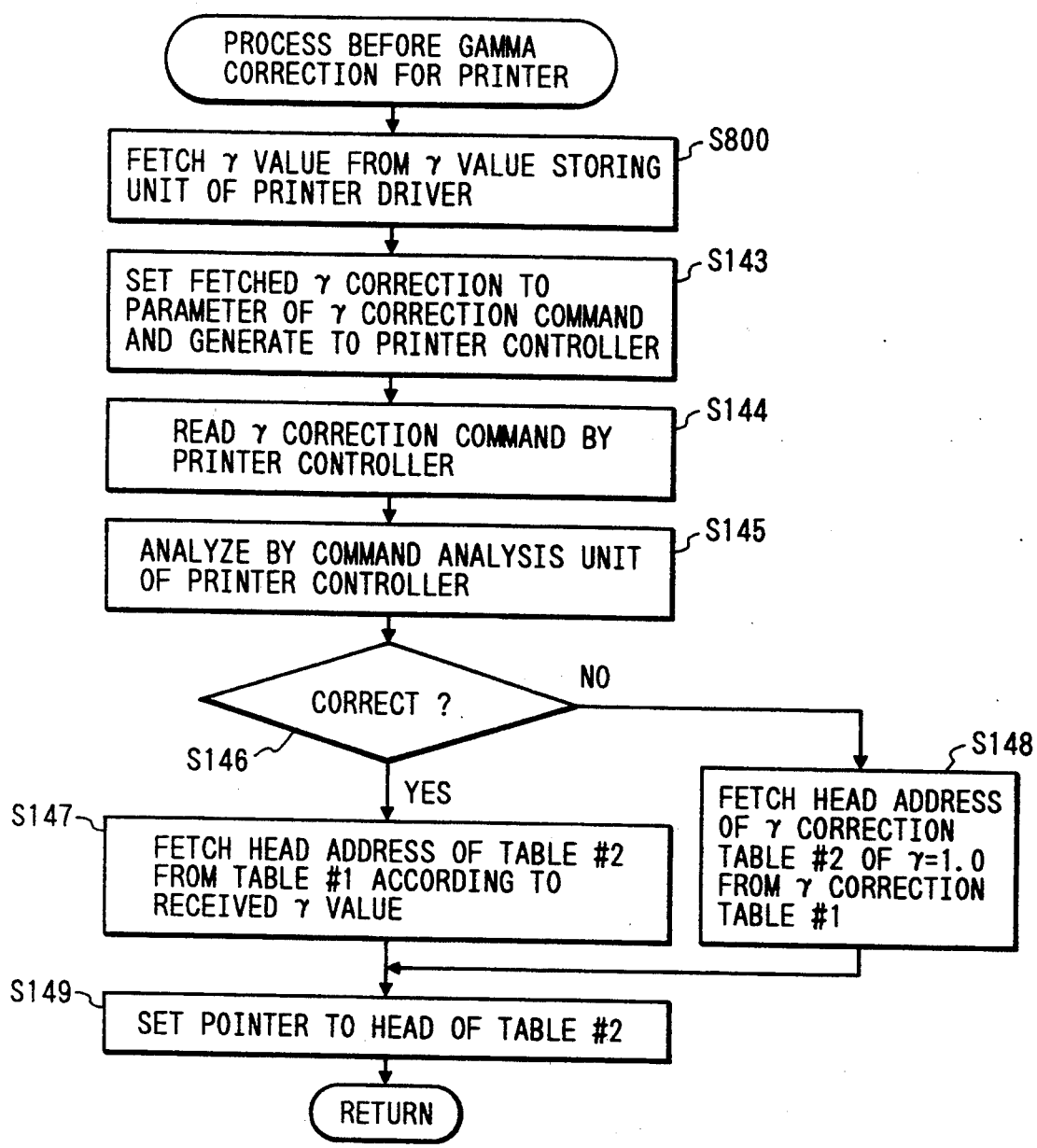
FIG. 59 is a flowchart showing the preparatory process for a Gamma correction for a printer according to the fourth embodiment.
Figure 60:
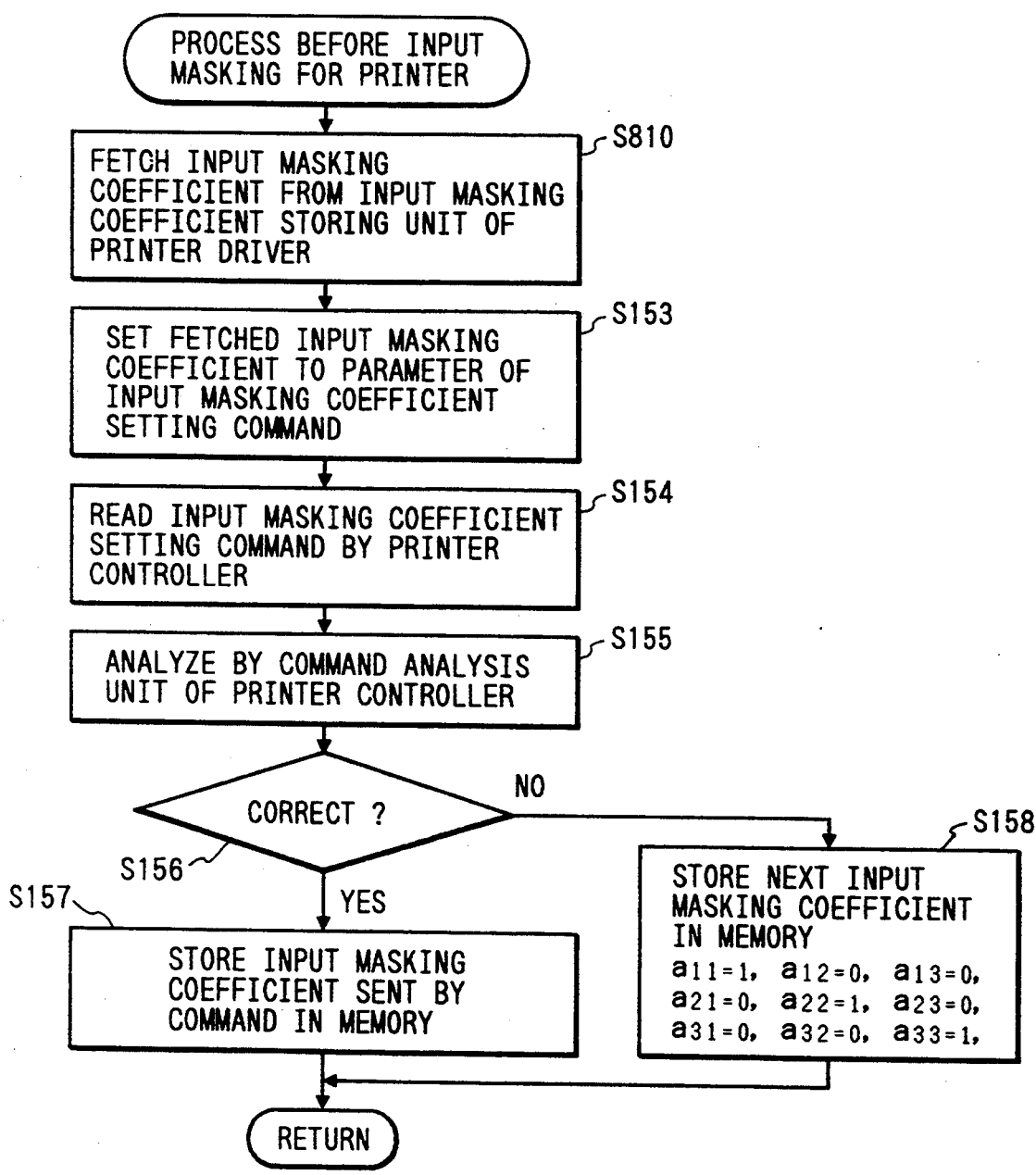
FIG. 60 is a flowchart showing the preparatory process for an input masking for a printer according to the fourth embodiment.

(5) Color correction process for a printer (FIG. 59 and FIG. 60)

Here, with reference to flowcharts shown in FIG. 59 and FIG. 60, the further description will be made of a process characteristics of the present embodiment with respect to the detailed color correction process for a printer to be executed in the step S7.

[Outline of the color correction process]

As already described in the first embodiment, the color correction process consists of a γ correction preparatory process for a printer and an input masking preparatory process for a printer, and a γ correction process for a printer and input masking process for a printer for the entire pixels which are the processing object. The γ correction process for a printer and the input masking process for a printer according to the present embodiment are also the processes common to those described in the first embodiment. Here, therefore, the description will be made only of the γ correction preparatory process for a printer and input masking preparatory process for a printer.

The γ correction process and input masking process are given by the color correction process to the luster image data of an RGB luminance type to enable a printer to output a color image.

[γ correction preparatory process (FIG. 59)]

Here, with reference to a flowchart shown in FIG. 59, the γ correction preparatory process will be described in detail.

At first, in step S800, the γ value is fetched from the γ value storing unit 118 of the color correction information memory 117 of the printer driver 113. After this, the same processes in the steps S143 to S149 of the flowchart shown in FIG. 16 described in the first embodiment will be executed.

Thus, the γ correction command is issued from the printer driver 113 of the host 110 to the printer controller 120. The γ correction command is analyzed in the printer controller 120; hence making it possible to access the table for the modification of the γ correction.

[Input masking preparatory process (FIG. 60)]

Here, with reference to a flowchart shown in FIG. 60, the input masking preparatory process will be described.

At first, in step S810, the input masking coefficient is fetched from the input masking coefficient storing unit 119 of the color correction information memory 117 of the printer driver 113. After this, the same processes in the steps S53 to S58 of the flowchart shown in FIG. 39 described in the first embodiment will be executed.

Thus, the input masking coefficient set up command is issued from the printer driver 113 of the host 110 to the printer controller 120, The input masking coefficient set up command is analyzed in the printer controller 120 to store the input masking coefficient in the input masking coefficient storing unit 102b.

Therefore, according to the present embodiment, it is possible to output the color characteristic information of a monitor (γ value and input masking coefficient) to the printer controller in accordance with the obtained monitor model information for the execution of the color correction process, and to perform the printing output of an image which matches the color characteristics of the monitor.

<Fifth Embodiment>

In the present embodiment, the description will be made of an example wherein the characteristics of the γ correction can be modified arbitrarily by enabling the host 110 to control the γ correction value to be supplied from the monitor controller 140 to the printer controller 120 so that it corresponds to the inputted value of the image data to be inputted.

Here, in the present embodiment, too, it is assumed that the same system as in the first embodiment is used. The parts shared by the first embodiment will, therefore, be described using the same apparatus reference numerals. Here, the description will be made only of the parts genuine to the present embodiment. Also, regarding the flowcharts described in the present embodiment, the same step reference numbers are given to the processing steps shared by the first embodiment, and here, the description will be made only of the processing steps characteristic of the present embodiment.

[Description of a command (FIG. 61)]

Here, with reference to FIG. 61, the description will be made of a command issued by the system structured as above according to the present embodiment.

Figure 61:
FIG. 61 is a view showing the format for a monitor information returning command according to a fifth embodiment.

FIG. 61 is a view illustrating the structure of a monitor information returning command issued by the command issuing unit 149 of the monitor controller 140. As shown in FIG. 61, the command consists of a command number to discriminate it from the others, γ correction value (converted value) {γ (n) (n=0 to 255)}, and parameters of input masking coefficients.

[Description of various tables (FIG. 62 to FIG. 64)]

Here, the description will be made of various tables used by the system structured as above according to the present embodiment.

Figure 62:
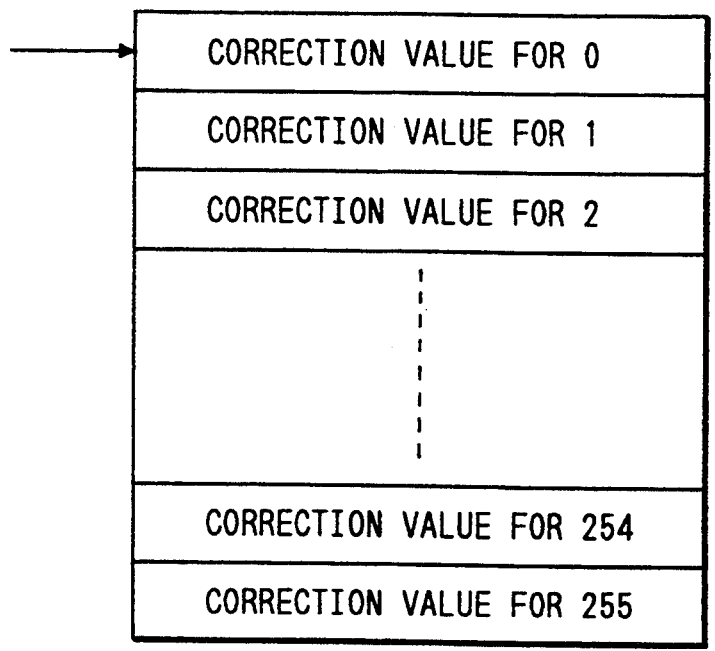
FIG. 62 is a view showing the inner structure of a γ correction value tentative storage table according to the fifth embodiment.

FIG. 62 is a view illustrating the inner structure of the γ correction value provisional storage table to be stored in the color correction information memory 117 of the printer driver 113. In the table, the γ correction value (converted value) {γ (n) (n=0 to 255)} set in the monitor information returning command is stored.

Figure 63:
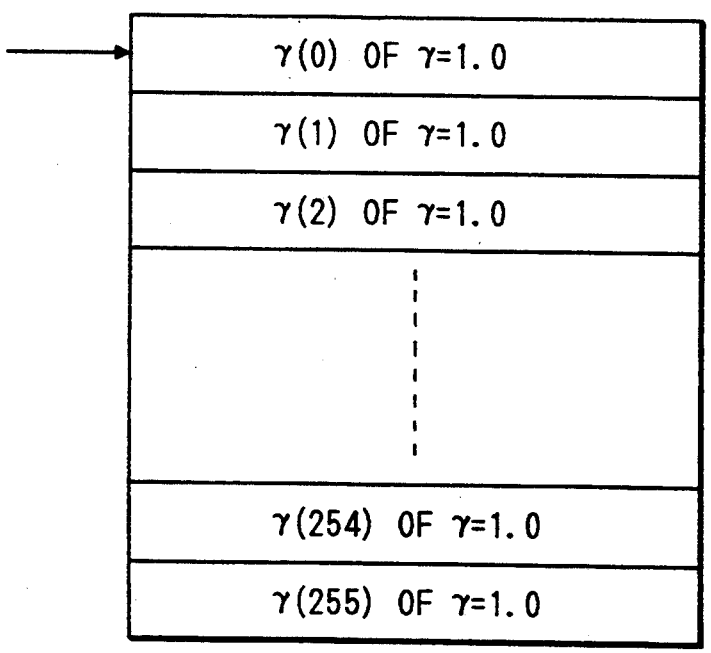
FIG. 63 is a view showing the inner structure of a default γ correction value table according to the fifth embodiment.

FIG. 63 is a view illustrating the inner structure of the default γ correction value table stored in the color correction information memory 117 of the printer driver 113. As shown in FIG. 63, the γ correction value (converted value) {γ (n) (n=0 to 255)} where γ=1.0 is stored.

FIG. 64 is a view illustrating the structure of the color correction coefficient table #2 for each monitor to be stored in the storing unit 144 of the monitor controller 140 for the color correction coefficient for each monitor. As shown in FIG. 64, there are stored in the color correction coefficient table #2 for each monitor ID, the γ correction value (converted value) {γ (n) (n=0 to 255)} and input masking coefficient with which to cause a printer to perform the color correction in accordance with the respective characteristics of the monitor models. In the present embodiment, at the head of the table, the information of a monitor ID0 is stored, and then, the monitor ID character sequences, γ values (converted values) {γ (n) (n=0 to 255)}, and input masking coefficients are stored for a monitor ID1, monitor ID2, . . . , and monitor IDn in that order for the number of models (n+1).

Of these, regarding the γ correction value (converted value) {γ (n) (n=0 to 255)} of the monitor ID0 to be stored at the head of the table, the correction value of $\gamma=1.0$, and the values of the input masking coefficient are each assumed to be set at $a0_{11}=1$, $a0_{12}=0$, $a0_{13}=0$, $a0_{21}=0$, $a0_{22}=1$, $a0_{23}=0$, $a0_{31}=0$, $a0_{32}=0$, and $a0_{33}=1$ as shown in FIG. 64. In other words, regarding the monitor ID0, the values at which no color correction will be executed are set. Also, at the $\gamma$ correction values (converted values) $\{\gamma(n) (n=0$ to $255)\}$, and input masking coefficients for the remaining monitors ID1 to IDn, the values are set in accordance with the characteristics of each monitor. Description of the color image outputting process (FIG. 65 to FIG. 68).

Hereinafter, with reference to flowcharts shown in FIG. 65 to FIG. 68, the description will be made of the color image outputting process by the system as structured above according to the present embodiment.

With this process, the color correction process is executed by outputting the color characteristics information of the monitor to the printer controller on the basis of the obtained monitor model information; hence printing on a recording sheet an image which matches the color characteristics of the monitor.

(1) Monitor information fetching process (FIG. 65)

Now, with reference to a flowchart shown in FIG. 65, the description will be made in detail of the monitor information fetching process to be executed in step S110.

After the processes in the steps S110 to S112, further in step S231, the pointer is set at the head of the color correction coefficient table #2 for each monitor to be stored in the monitor ID character sequence table storing unit 144.

In step S114, whether the analyzed command is correct or not is examined. If the command is not a correct monitor information requesting command, such as having excessive parameters, the process will proceed to step S271. If the command is a correct monitor information requesting command, the process will proceed to step S115.

Now, after the processes in the steps S115 and S260, in the subsequent step S271, the $\gamma$ value (converted value) $\{\gamma(n) (n=0$ to $255)\}$ and input masking coefficient indicated by the pointer are fetched. In step S281, the fetched $\gamma$ correction value (converted value) $\{\gamma(n) (n=0$ to $255)\}$ and input masking coefficient are set in the parameters of the monitor information returning command shown in FIG. 61. Lastly, the process issues the prepared monitor information returning command to the host 110 in step S120 to terminate the process.

In this way, a monitor information requesting command is issued from the printer driver 133 of the host 110 to the monitor controller 140. The $\gamma$ correction value (converted value) $\{\gamma(n) (n=0$ to $255))$ and input masking coefficient corresponding to the monitor 150 to the monitor controller 140 having read the monitor information requesting command is connected are set in the parameters of the monitor information returning command. Then, the issuing process for the host 110 will be performed again; hence making it possible for the printer driver 113 of the host 110 to obtain the $\gamma$ correction value (converted value) $\{\gamma(n) (n=0$ to $255))$ and input masking coefficient which serve as the characteristic information of the monitor which is connected to the monitor controller 140.

Figure 66:
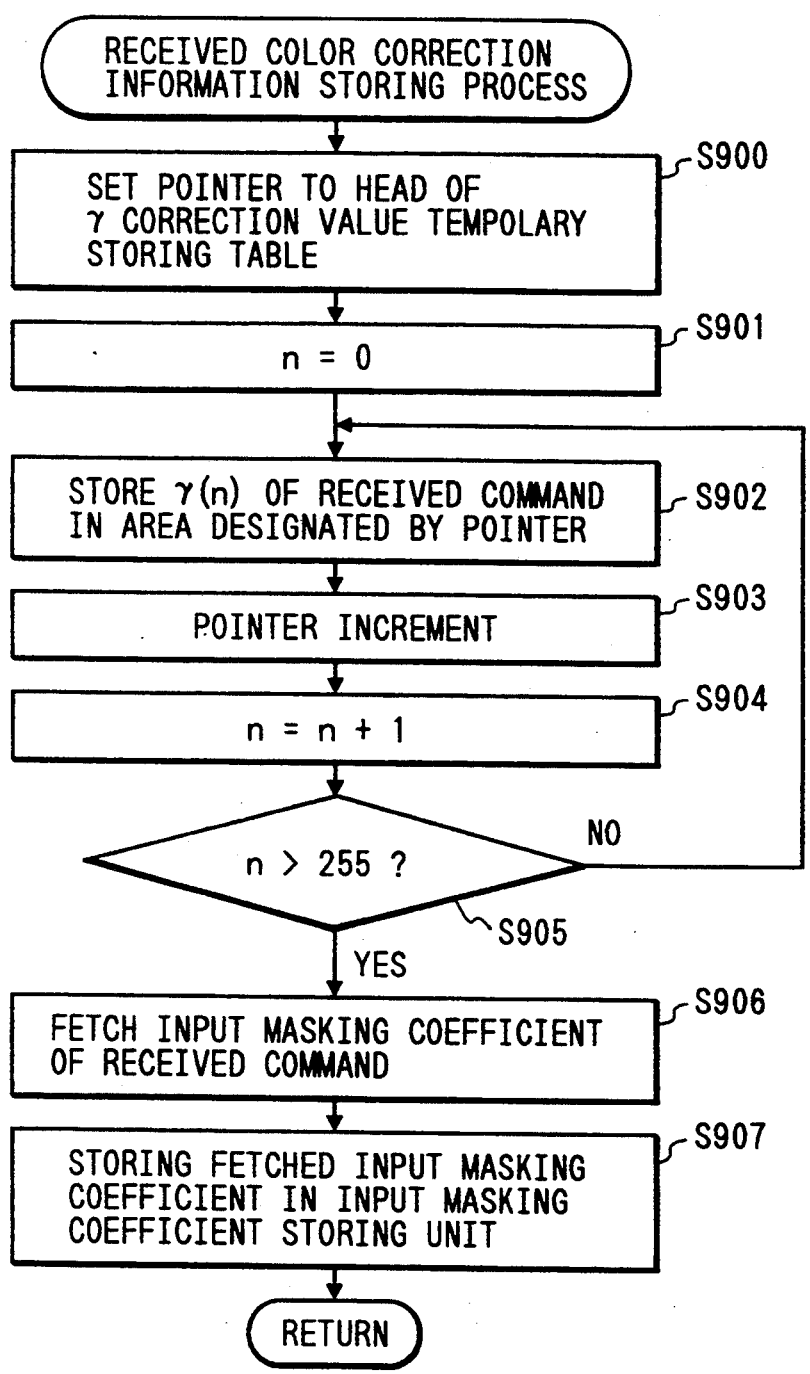
FIG. 66 is a flowchart showing a receiving color correction information storing process according to the fifth embodiment.

(2) Received color correction information storing process (FIG. 66)

Here, with reference to a flowchart shown in FIG. 66, the description will be made in detail of the received color correction information storing process according to the present embodiment.

At first, in step S900, the pointer is set at the head of the $\gamma$ correction value provisional storage table to be stored in the color correction information memory 117 of the printer driver 113. In step S801, zero is assigned to the loop variable (n).

In step S902, the $\gamma$ correction value (converted value) $\{\gamma(n) (n=0$ to $255)\}$ is fetched from the monitor information returning command analyzed in the step S113 (FIG. 61) to store it in an area indicated by the pointer. In step S903, the pointer is incremented. In step S904, one is added to the loop variable (n). In step S905, the value of the loop variable (n) is examined. Here, if $n \leq 255$, the process will return to the step S903. If $n > 255$, the process will proceed to step S906.

In the step S906, the input masking coefficient is fetched from the monitor information returning command analyzed in the step S113 (FIG. 61). Then, in step S807, the fetched input masking coefficient is stored in the input masking coefficient storing unit 119 of the color correction information memory 117 of the printer driver 113.

In this way, the $\gamma$ correction value (converted value) $\{\gamma(n) (n=0$ to $255))$ and input masking coefficient which are the color correction information set in the parameters of the received monitor information returning command are stored in the color correction information memory 117.

Figure 67:
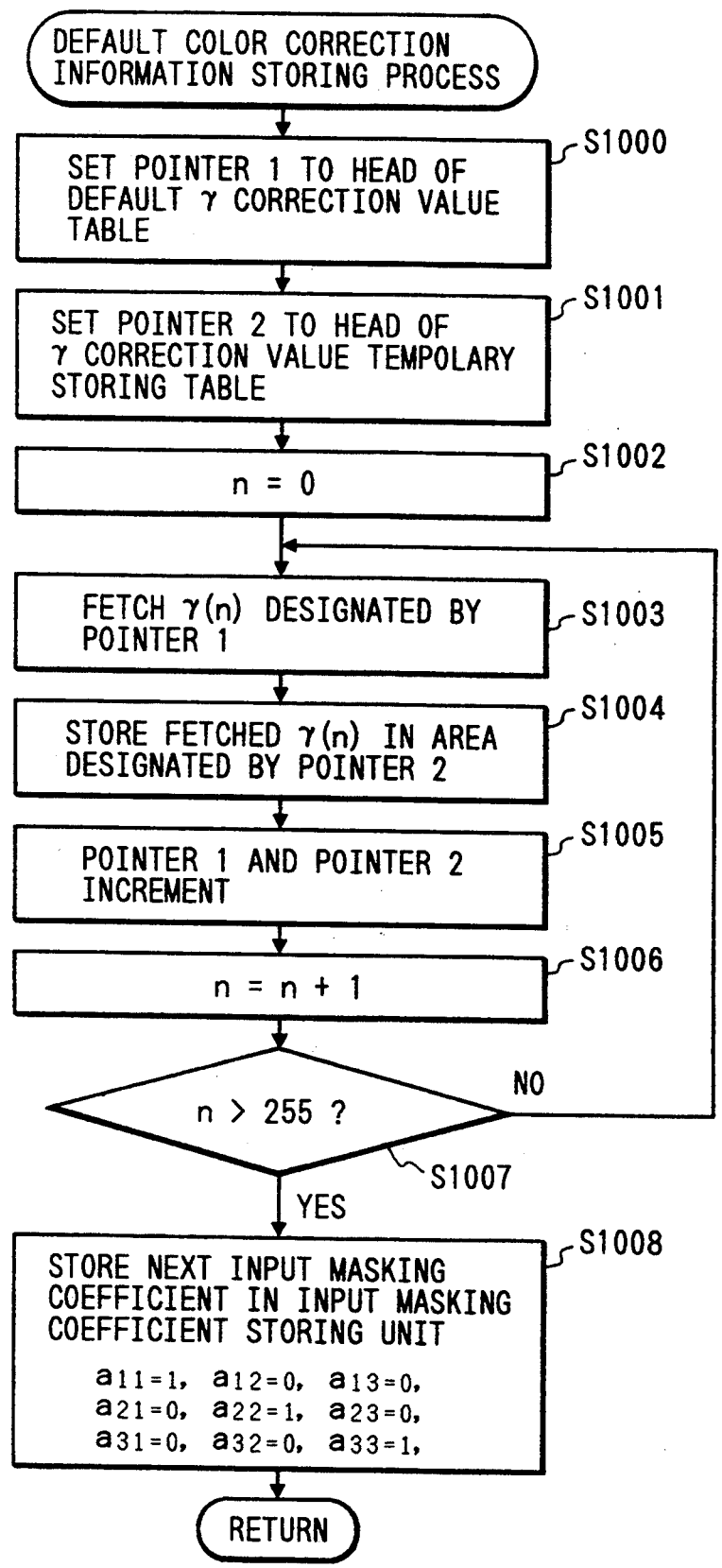
FIG. 67 is a flowchart showing a default color correction information storing process according to the fifth embodiment.

(3) Default color correction information storing process (FIG. 67)

Here, with reference to a flowchart shown in FIG. 67, the description will be made in detail of the default color correction information process according to the present embodiment.

At first, in step S1000, the pointer 1 is set at the head of the default $\gamma$ correction value table stored in the color correction information memory 117 of the printer driver 113. In step S901, the pointer 2 is set at the head of the $\gamma$ value provisional storage table to be stored in the color correction information memory 117 of the printer driver 113. Also, in step S1002, zero is assigned to the loop variable (n).

Subsequently, in step S1003, the $\gamma(n)$ of the $\gamma$ correction value (converted value) is fetched from the default $\gamma$ correction value table indicated by the pointer 1. In step S1004, the $\gamma(n)$ value thus fetched is stored in an area in the $\gamma$ correction value provisional storage table indicated by the pointer 2. In step S1005, the pointers 1 and 2 are incremented. In step S1006, one is added to the value of the loop variable (n).

In step S1007, the value of the loop variable (n) is examined. Here, if $n \leq 255$, the process will return to the step S1003. If $n > 255$, the process will proceed to step S1008. In the step S1008, the values $a_{11}=1$, $a_{12}=0$, $a_{13}=0$, $a_{21}=0$, $a_{22}=1$, $a_{23}=0$, $a_{31}=0$, $a_{32}=0$, and $a_{33}=1$ are set in the respective coefficients of the input masking coefficients to store them in the input masking coefficient storing unit 119 of the color correction information memory 117.

In this way, the default color correction information is stored in the color correction information memory 117.

Figure 68:
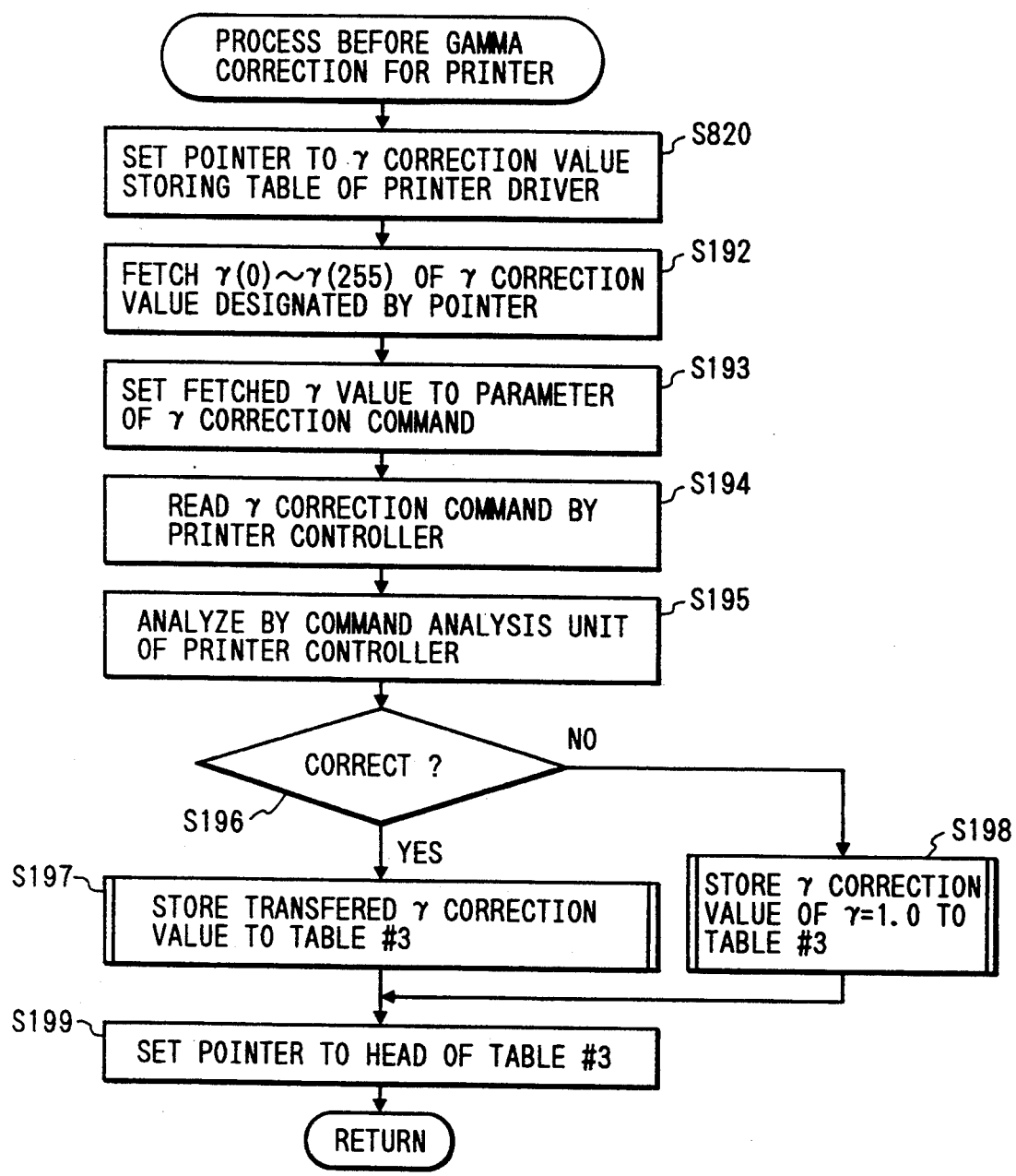
FIG. 68 is a flowchart showing the preparatory process for a Gamma correction for a printer according to the fifth embodiment.

(4) Color correction process for a printer (FIG. 68)

Here, with reference to a flowchart shown in FIG. 63, the description will be made further of the $\gamma$ correction preparatory process which is a process particularly characteristic of the present embodiment with respect to the detailed color correction process for a printer to be executed in the step S117. By this color correction process, the γ correction process and input masking process are given to the luster image data of an RGB luminance type; thus making it possible for the printer to output a color image.

γ correction preparatory process (FIG. 68)

Here, with reference to a flowchart shown in FIG. 68, the γ correction preparatory process will be described in detail.

At first, in step S820, the pointer is set at the γ correction value provisional storage table of the color correction information memory 117 of the printer driver 113. Thereafter, the same processes in the steps S192 to S199 in the flowchart shown in FIG. 27 described in conjunction with the second embodiment.

In this way, the γ correction command is issued from the printer driver 113 of the host 110 to the printer controller 120. Then, the γ correction command is analyzed in the printer controller 120. The γ correction value (converted value) {γ (n) (n=0 to 255)} is stored in the table for the modification of the γ correction; thus making its access possible.

Therefore, according to the present embodiment, the host 110 controls the γ correction value corresponding to the inputted value of the image data to be inputted so that it can be supplied from the monitor controller 140 to the printer controller 120, and causes the printer controller 120 to execute the color correction process by modifying the γ correction characteristics; hence making it possible to perform the printing output of an image which matches the color characteristics of the monitor.

In this respect, it may be possible to apply the present invention to a system comprising a plurality of equipment or an apparatus comprising a single equipment. Also, the present invention is applicable to a system or an apparatus which can be implemented by the provision of a program as a matter of course.

As described above, according to the embodiments of the present invention, the kinds of displaying means to be connected are specified. The information of displaying characteristics is searched in accordance with the kind thus specified. On the basis of the information of the displaying characteristics, the color correction is given to the color image data to output them to printing means. As a result, it is possible to dynamically reflect the displaying characteristics of the displaying means on the color image which is output to printing means. There is an effect that the color adjustment can be performed simply; hence making it easy to match the colors of a color image to be output to displaying means and printing means.

What is claimed is:

1. A color image processing apparatus comprising:
   a) first correction means for chromatically correcting inputted color signals in accordance with predetermined color correction parameters;
   b) second correction means for correcting the color signals chromatically corrected by said first color correction means in accordance with printing characteristics; and
   c) parameter setting means for selecting and modifying the color correction parameters to be used for said first correction means in accordance with external commands without selecting and modifying the color correction parameters to be used for said second correction means.

2. A color image processing apparatus according to claim 1, wherein
   said external commands are commands from a host computer.

3. A color image processing apparatus according to claim 1, wherein
   said first correction means is for γ corrections.

4. A color image processing apparatus according to claim 1, wherein
   said first correction means is for masking corrections.

5. A printer driver for a color printer having a first correction means to chromatically correct inputted color signals in accordance with predetermined correction parameters, and a second correction means to correct the color signals chromatically corrected by said first color correction means in accordance with printing characteristics, comprising:
   command outputting means for selecting and modifying the color correction parameters to be used for said first correction means without selecting and modifying the color correction parameters to be used for said second correction means.

6. A printer driver according to claim 5, wherein
   said command is a command to select desired parameters from a plurality of predetermined color correction parameters.

7. A printer driver according to claim 5, wherein
   said first correction means is for γ corrections.

8. A printer driver according to claim 5, wherein
   said first correction means is for masking corrections.

9. A color image processing apparatus according to claim 1, further comprising:
   color image formation means for forming an image in correspondence with the color signals inputted from said second correction means.

10. A color image processing apparatus according to claim 9, wherein
    said color image formation means is a means to eject liquid droplets by thermal energy.

11. A color image processing apparatus for processing and outputting color image data to displaying means and printing means, comprising:
    setting means, connected through bi-directional communication with said displaying means, for setting up a model of said displaying means;
    generating means for generating display characteristic information of said displaying means in accordance with the model set up by said setting means;
    color correction means for automatically correcting the color image data on the basis of said display characteristic information; and
    outputting means for outputting said corrected color image data to said printing means.

12. A color image processing apparatus according to claim 11, wherein
    said displaying means is a color display apparatus, and said printing means is a color printing apparatus.

13. A color image processing apparatus according to claim 11, wherein
    said display characteristics include Gamma (γ) values for Gamma correction and input masking coefficients for input masking.

14. A color image processing apparatus according to claim 11, wherein
    said color correction includes the Gamma correction and input masking processes to be given to the entire pixels of the inputted color image data.

15. A color image processing apparatus according to claim 14, wherein
said inputted color image data are chromatically expressed by RGB components.

16. A color image processing apparatus according to claim 15, wherein
said displaying means has transmitting means to transmit the signals to represent the model of said displaying means to said setting means, and
said setting means has receiving means to receive the transmitted signals to represent said model.

17. A color image processing method for processing and providing an image signal, comprising the steps of:
displaying a color image on a display means, said color image comprising at least an image signal;
setting up a model of the display means through bi-directional communication with the display means;
generating color display characteristic information of the display means in accordance with the model;
color correcting the image signal based on the color display characteristic information; and
providing the color corrected image signal to a color printing means.

18. A color image processing method according to claim 17, wherein said display means is a color display apparatus, and said color printing means is a color printing apparatus.

19. A color image processing method according to claim 17, wherein said color display characteristic information includes gamma ($\gamma$) values for gamma correction and input masking coefficients for input masking.

20. A color image processing method according to claim 17, wherein said setting step further includes the step of outputting a display characteristic requesting command from the display means.

21. A color image processing method according to claim 17, wherein the image signal comprises plural color components, and wherein said color correcting step further includes the step of correcting each of the color components of the color image signal.

22. A color image processing method according to claim 17, wherein the image signal comprises plural color components, and wherein said color correcting step further includes the step of combining the image signal in units according to each of the color components of the color image signal.

* * * * *

UNITED STATES PATENT AND TRADEMARK OFFICE
CERTIFICATE OF CORRECTION

PATENT NO. : 5,408,342
DATED : April 18, 1995
INVENTOR(S) : Shuichi Kumada, et al.

It is certified that error appears in the above-identified patent and that said Letters Patent is hereby corrected as shown below:

COLUMN 12

Line 55, "(1.0 to $\gamma,\gamma$" should read --(1.0 to $\alpha,\alpha$--.

COLUMN 16

Line 26, "mat" should read --map--; and
Line 32, "image. $\gamma$" should read
--image.
$\gamma$--.

COLUMN 19

Line 55, " "255").[Descrip-" should read
--"255").   [Descrip- --.

Signed and Sealed this

Eleventh Day of July, 1995

Attest:

BRUCE LEHMAN

Attesting Officer          Commissioner of Patents and Trademarks